US012654183B2

(12) United States Patent
Penfold et al.

(10) Patent No.: US 12,654,183 B2
(45) Date of Patent: Jun. 16, 2026

(54) WATER OUTLET FITTING, E.G. TAP OR SHOWER HEAD, PRODUCING A COMBINED FLOW OF GAS AND WATER, AND POWER CONNECTOR THEREFOR

(71) Applicant: KELDA SHOWERS LIMITED, Eastleigh (GB)

(72) Inventors: William Penfold, Southampton (GB); John Scott Shrimpton, Salisbury (GB); Luis Blay Esteban, Barcelona (ES); Benjamin Doulis, Southampton (GB); Jaevan Burrell, Southampton (GB); Aaron Bourne, Poole (GB); Zsolt Bako-Biro, Reading (GB)

(73) Assignee: KELDA SHOWERS LIMITED, Eastleigh (GB)

( * ) Notice: Subject to any disclaimer, the term of this patent is extended or adjusted under 35 U.S.C. 154(b) by 686 days.

(21) Appl. No.: 17/922,622

(22) PCT Filed: May 7, 2021

(86) PCT No.: PCT/GB2021/051113
§ 371 (c)(1),
(2) Date: Nov. 1, 2022

(87) PCT Pub. No.: WO2021/224642
PCT Pub. Date: Nov. 11, 2021

(65) Prior Publication Data

US 2023/0158522 A1 May 25, 2023

Related U.S. Application Data

(60) Provisional application No. 63/021,664, filed on May 7, 2020.

(30) Foreign Application Priority Data

Mar. 3, 2021 (GB) ..................................... 2103024

(51) Int. Cl.
*B05B 7/06* (2006.01)

(52) U.S. Cl.
CPC .............. *B05B 7/065* (2013.01); *B05B 7/061* (2013.01)

(58) Field of Classification Search
CPC .. B05B 1/18; B05B 7/06; B05B 7/061; B05B 7/065
(Continued)

(56) References Cited

U.S. PATENT DOCUMENTS

| | | | | |
|---|---|---|---|---|
| 3,965,494 A * | 6/1976 | Baker | B05B 7/066 4/615 |
| 6,267,305 B1 | 7/2001 | Kondo | |

(Continued)

FOREIGN PATENT DOCUMENTS

| | | |
|---|---|---|
| CN | 203972169 U | 12/2014 |
| CN | 106269331 A | 1/2017 |

(Continued)

OTHER PUBLICATIONS

International Search Report for corresponding application PCT/GB2021/051113 filed May 7, 2021; Mail date Sep. 2, 2021.

(Continued)

*Primary Examiner* — Jason J Boeckmann
(74) *Attorney, Agent, or Firm* — CANTOR COLBURN LLP

(57) ABSTRACT

Water outlet fitting, e.g. tap or shower head, producing a combined flow of gas and water, and power connector therefor An apparatus produces bubbles of pure water from a flow emitter (11) comprising an annular water outlet (13) surrounding a gas outlet (12) and operating within a defined parameter space. One or more flow emitters may be incorporated into an emitter body (10) configured as a shower head or a tap. In another aspect, an apparatus produces
(Continued)

bubbles of water from coaxial, gas and annular water flowpaths. In another aspect, a magnetic power connector is arranged to supply electrical energy to a shower head.

20 Claims, 26 Drawing Sheets

(58) Field of Classification Search
USPC ...................................... 239/423, 424, 434.5
See application file for complete search history.

(56) References Cited

U.S. PATENT DOCUMENTS

| | | | | |
|---|---|---|---|---|
| 11,511,296 | B2 * | 11/2022 | Lehtonen | E03C 1/18 |
| 2002/0003312 | A1 | 1/2002 | Ganan-Galvo | |
| 2010/0252658 | A1 * | 10/2010 | Honeyands | B05B 7/045 239/398 |
| 2013/0320112 | A1 * | 12/2013 | Honeyands | B05B 7/045 239/424 |
| 2014/0110504 | A1 * | 4/2014 | Honeyands | B05B 7/0892 239/418 |
| 2019/0176173 | A1 * | 6/2019 | Honeyands | B05B 7/0087 |
| 2023/0124727 | A1 * | 4/2023 | Shrimpton | B05B 1/18 239/8 |

FOREIGN PATENT DOCUMENTS

| | | | |
|---|---|---|---|
| CN | 107374430 | A | 11/2017 |
| GB | 2492112 | A | 12/2021 |
| JP | 2002119435 | A | 4/2002 |
| JP | 2004089465 | A | 3/2004 |
| JP | 2004321405 | A | 11/2004 |
| WO | 2012110790 | A1 | 8/2012 |

OTHER PUBLICATIONS

Written Opinion for corresponding application PCT/GB2021/051113 filed May 7, 2021; Mail date Sep. 2, 2021.

* cited by examiner

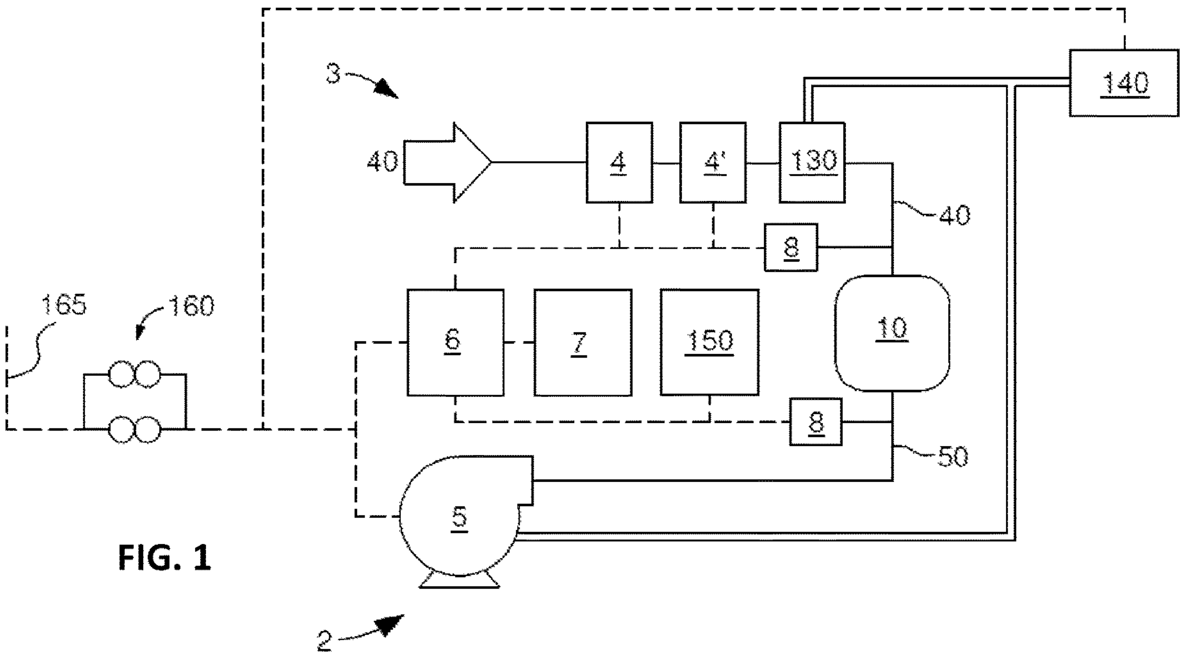
FIG. 1
FIG. 2
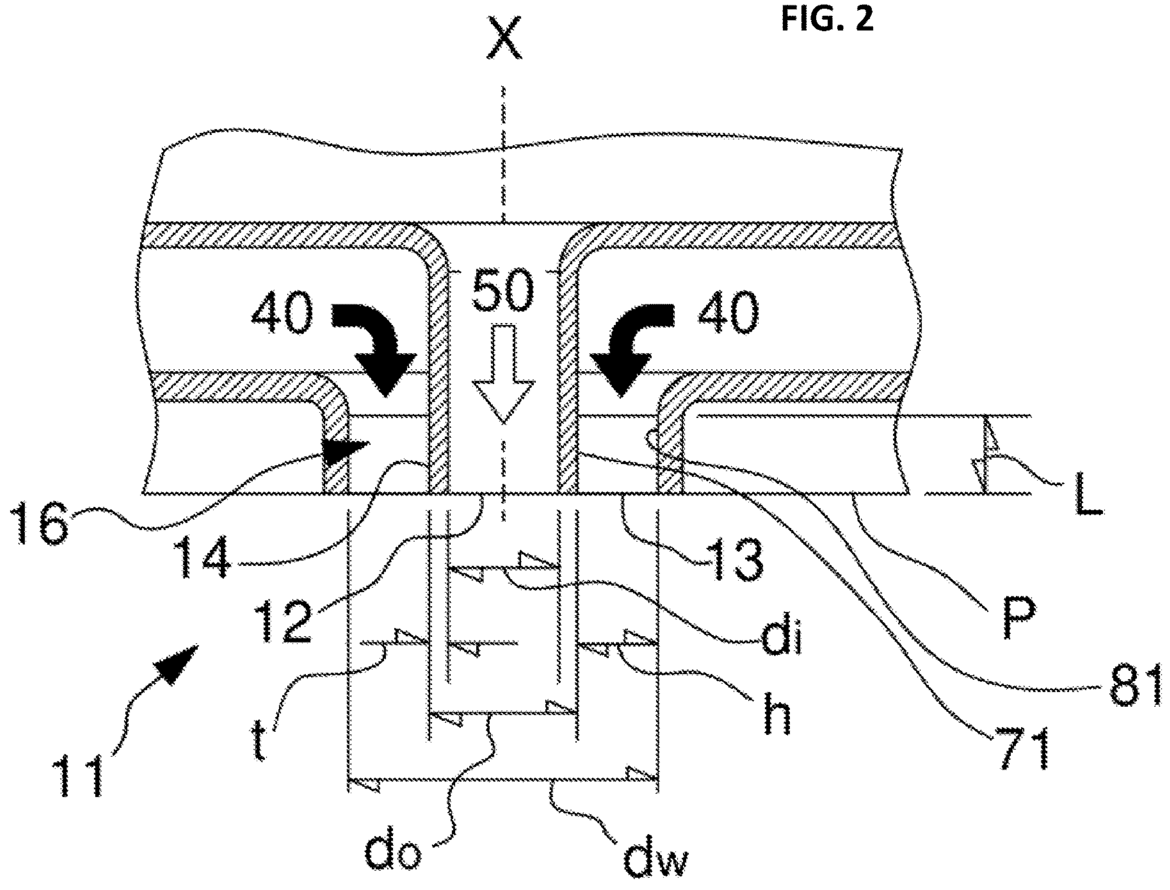

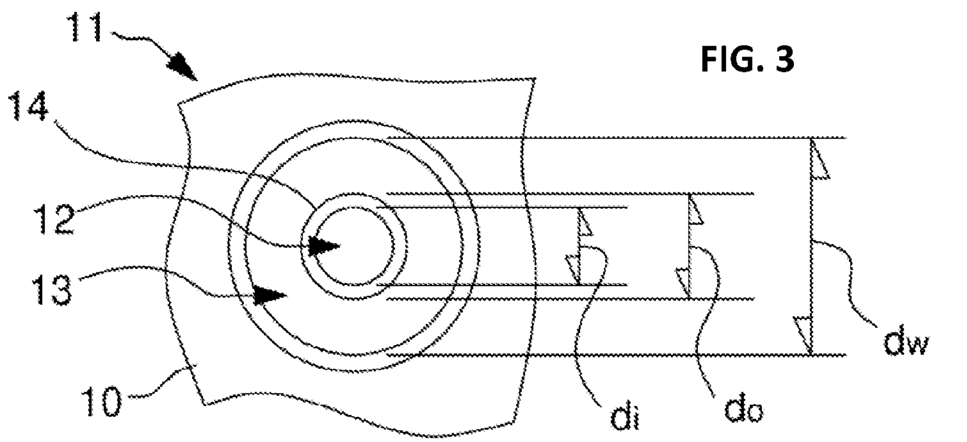
FIG. 3
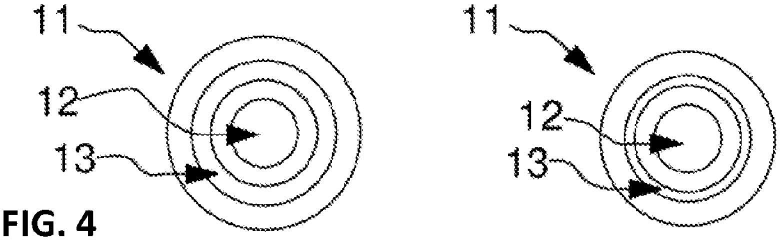
FIG. 4
FIG. 5
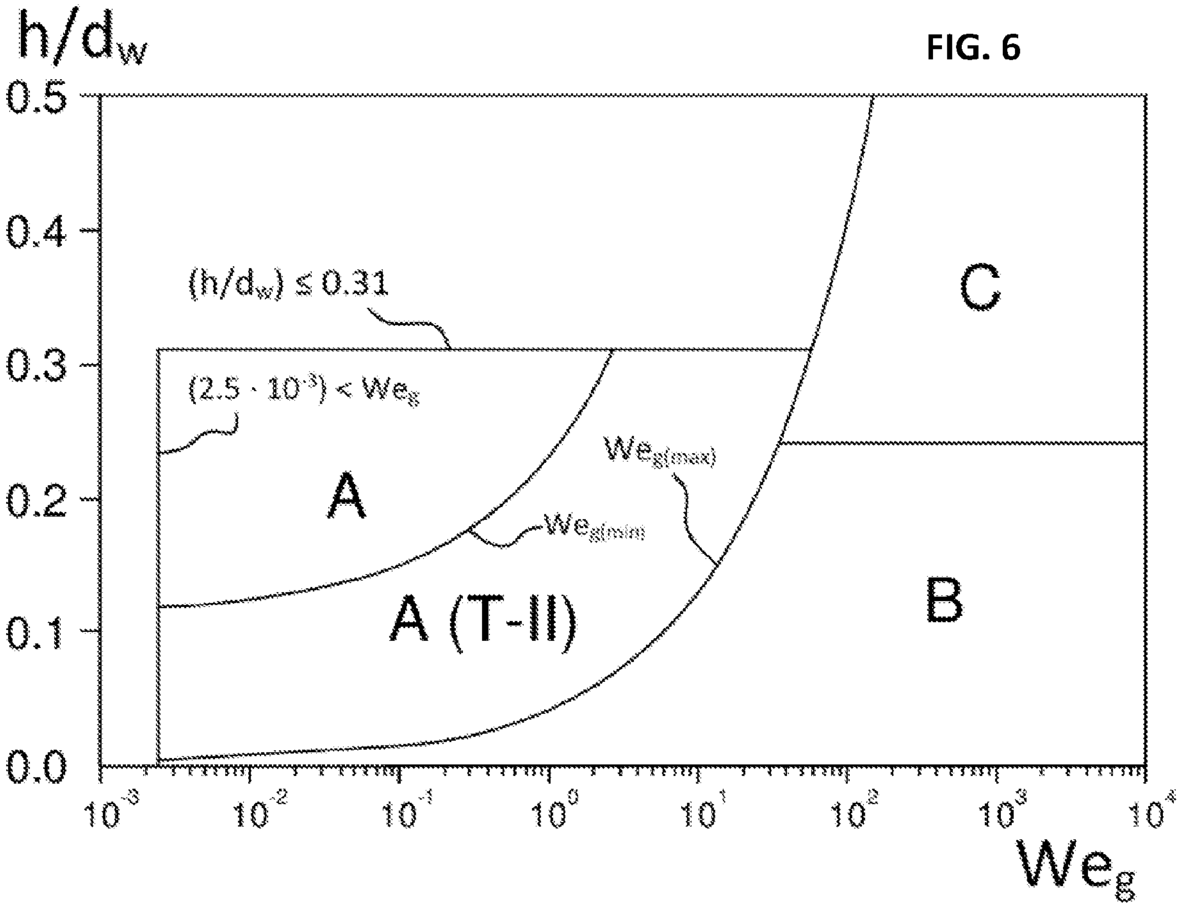
FIG. 6

T - I
$d_i$ = 3.5mm
$d_o$ = 5.5mm
$d_w$ = 6.5mm
$We_g$ = 0.02
$h/d_w$ = 0.08

T - II
$d_i$ = 3.5mm
$d_o$ = 5.5mm
$d_w$ = 7.5mm
$We_g$ = 0.26
$h/d_w$ = 0.13

T - III
$d_i$ = 3.5mm
$d_o$ = 5.5mm
$d_w$ = 7.5mm
$We_g$ = 1.2
$h/d_w$ = 0.13

T-II-A

T-II-A

T-II-B

T-II-C

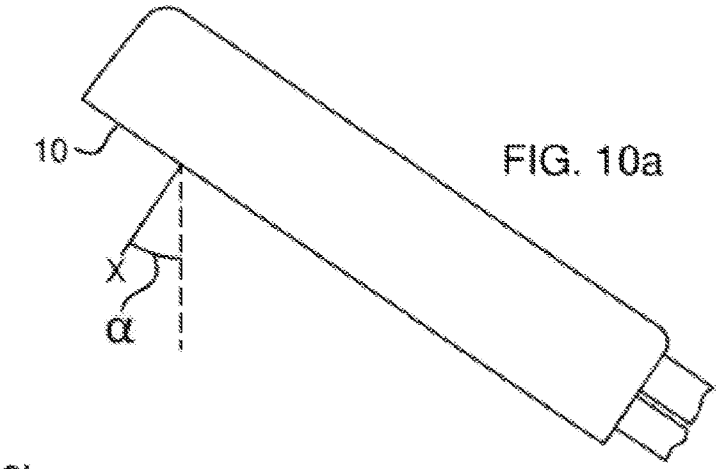
FIG. 10a
FIG. 10b
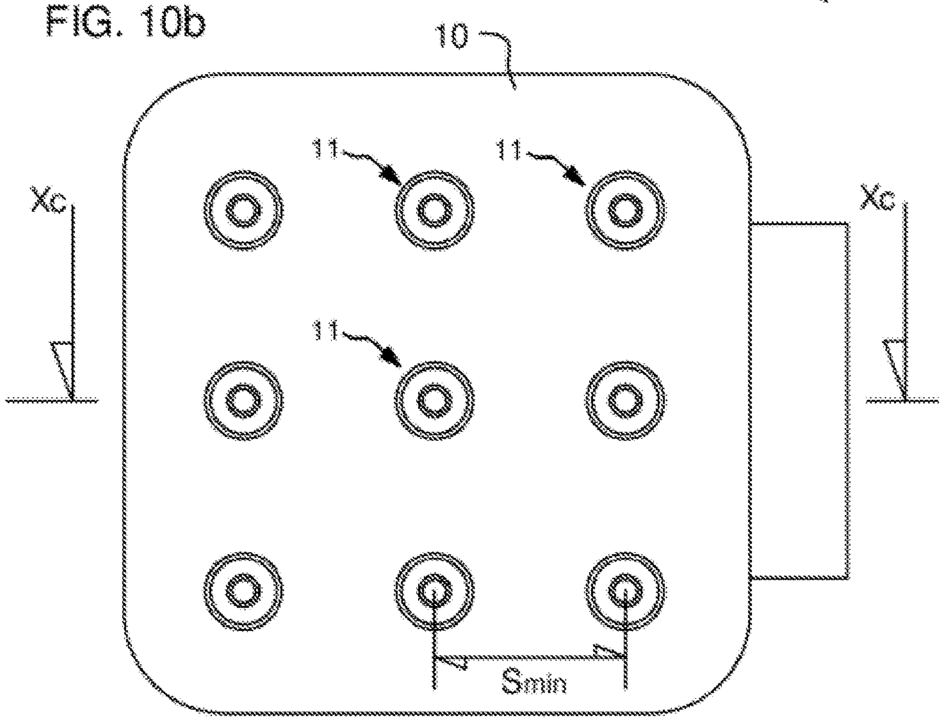
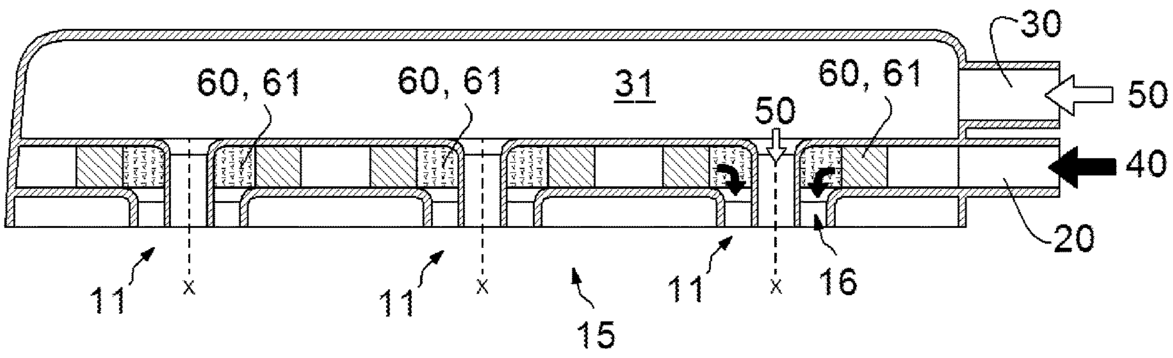
FIG. 10c

FIG. 11
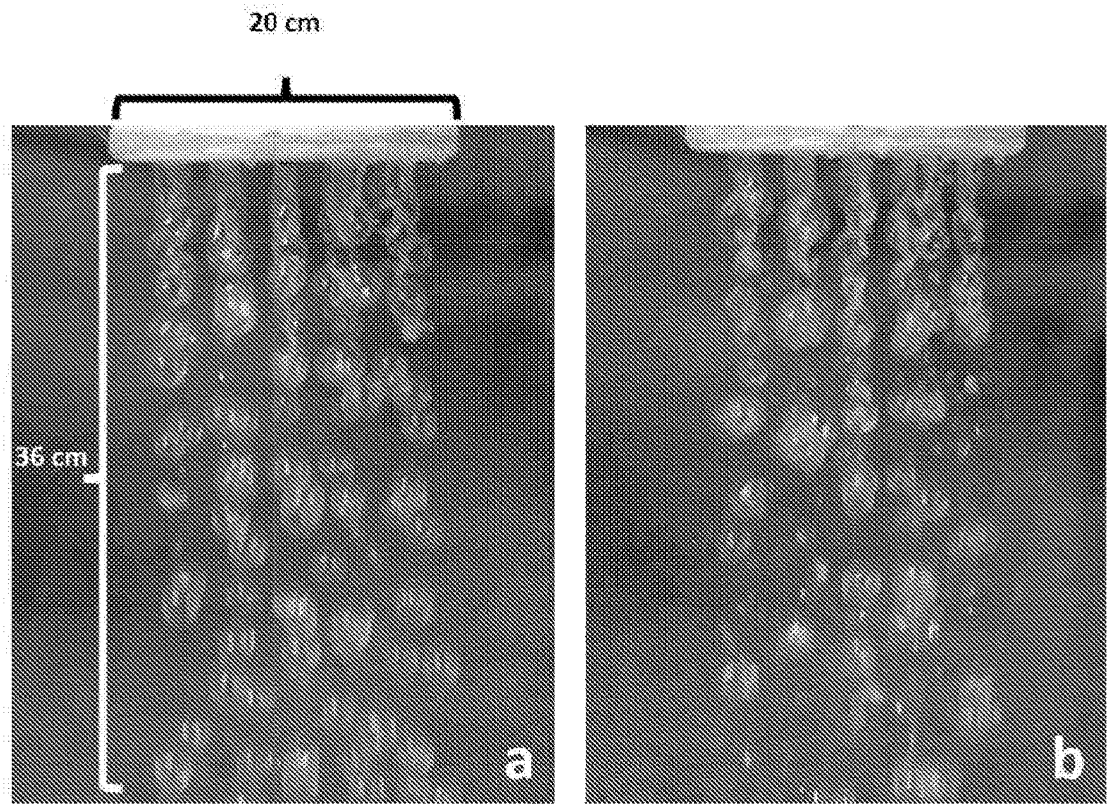
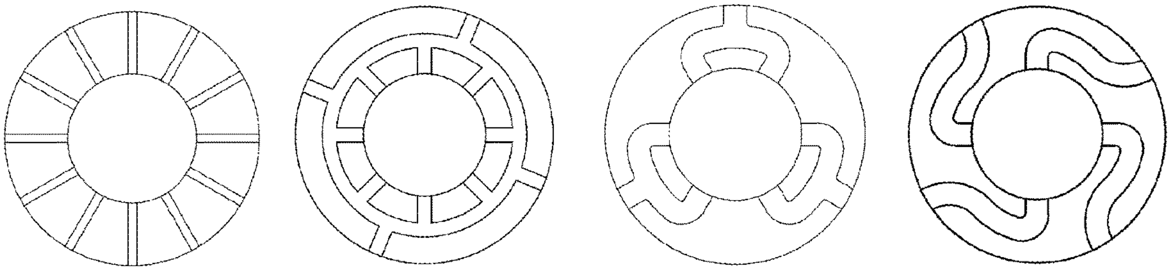
FIG. 12
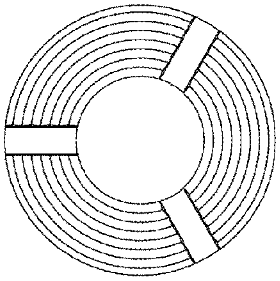
FIG. 13

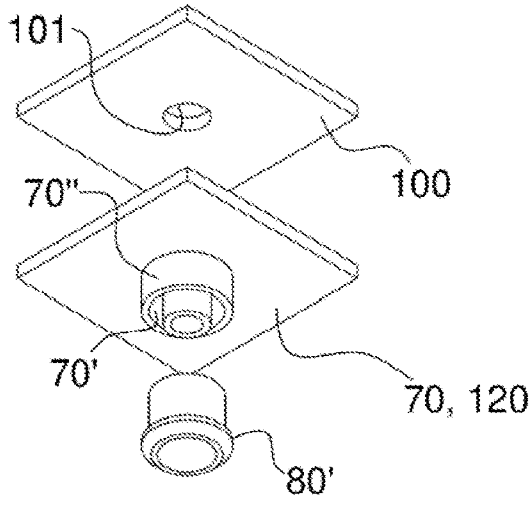
FIG. 32
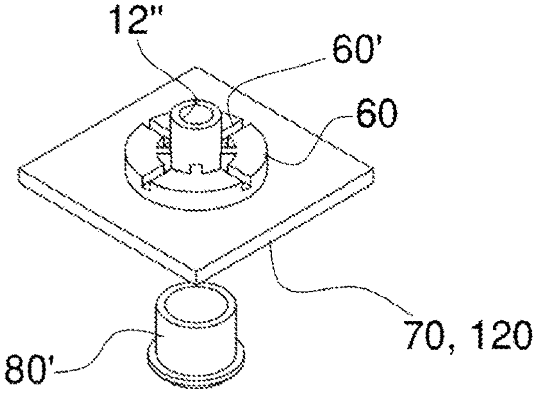
FIG. 33
FIG. 34
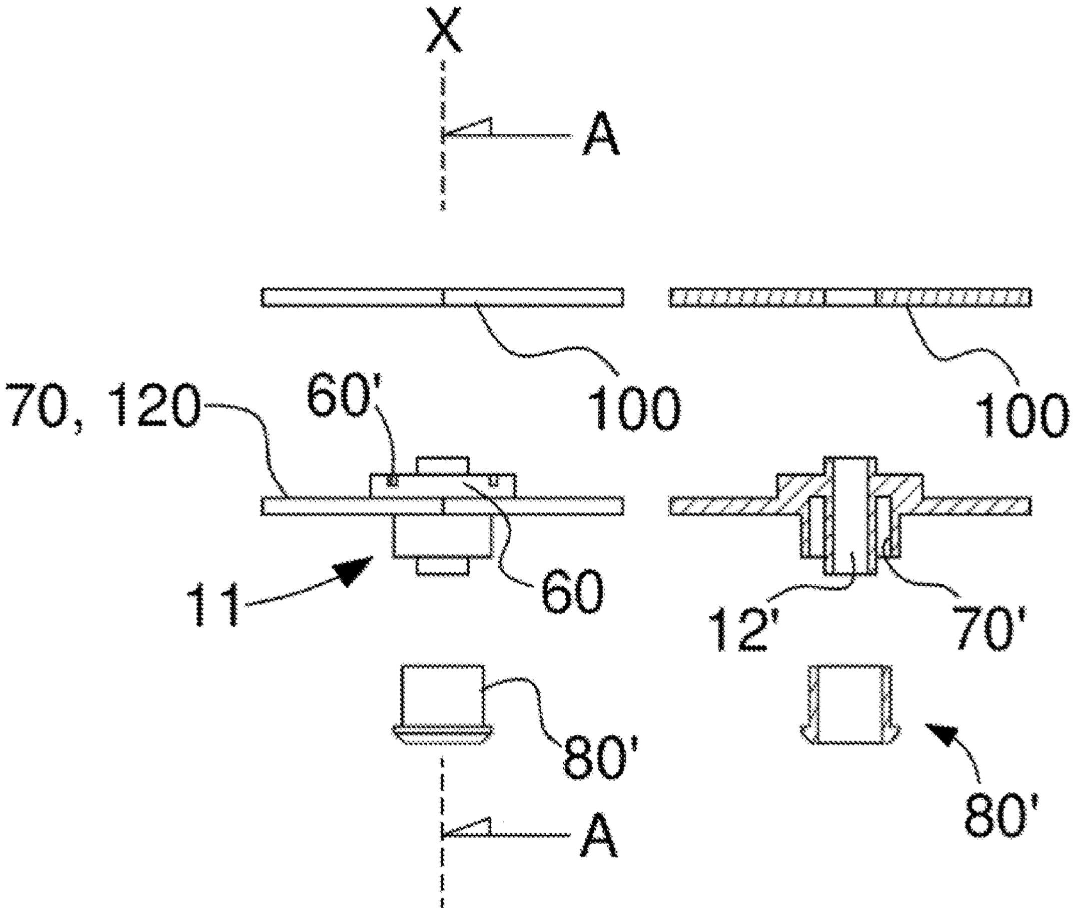

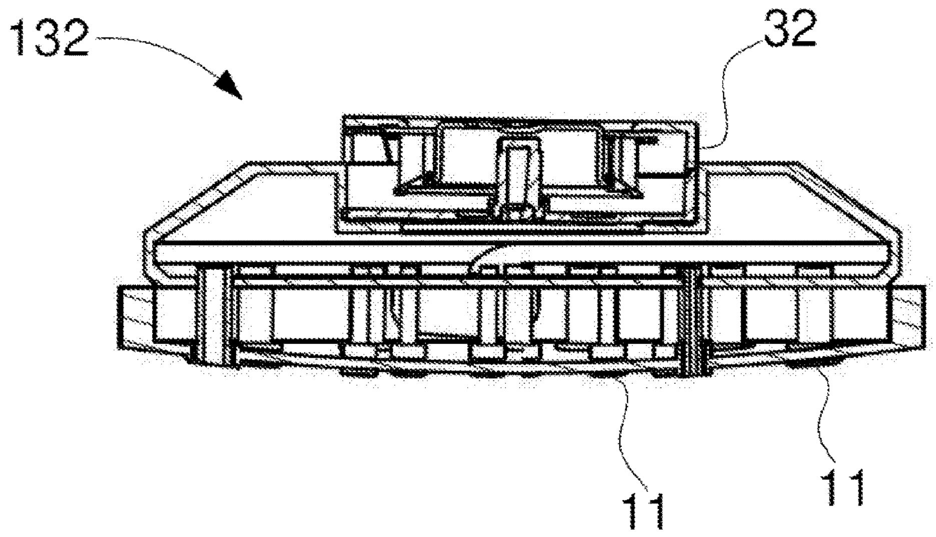
FIG. 42
FIG. 43
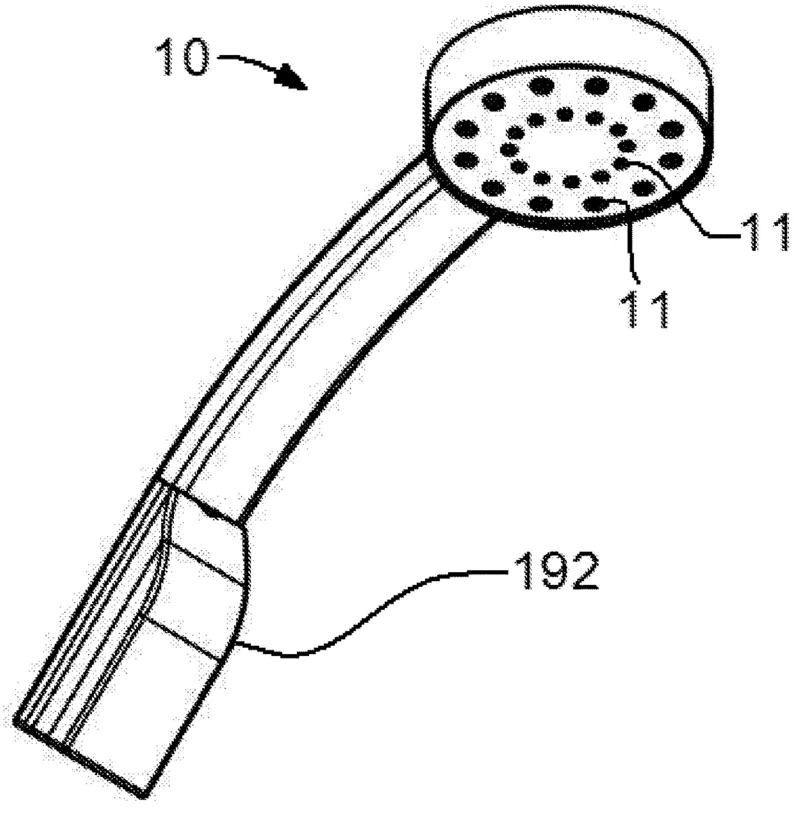

FIG. 50
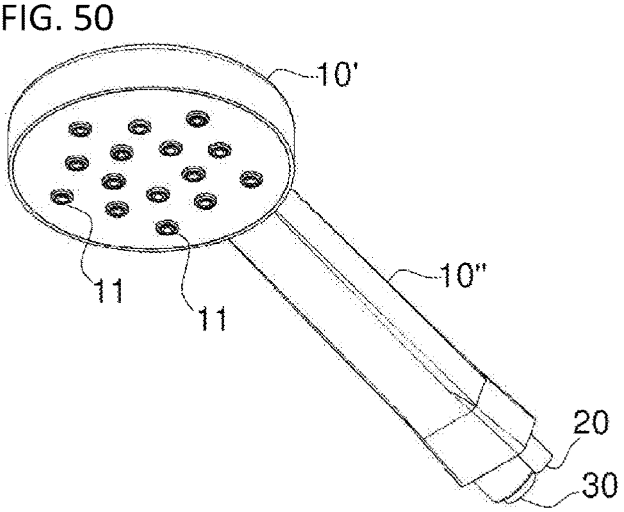
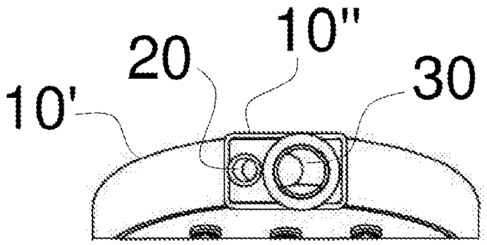
FIG. 52
FIG. 51
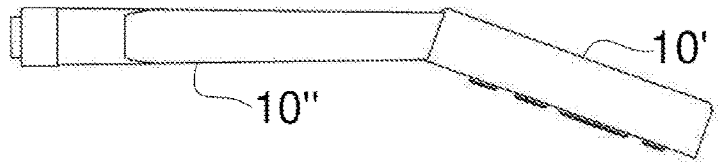
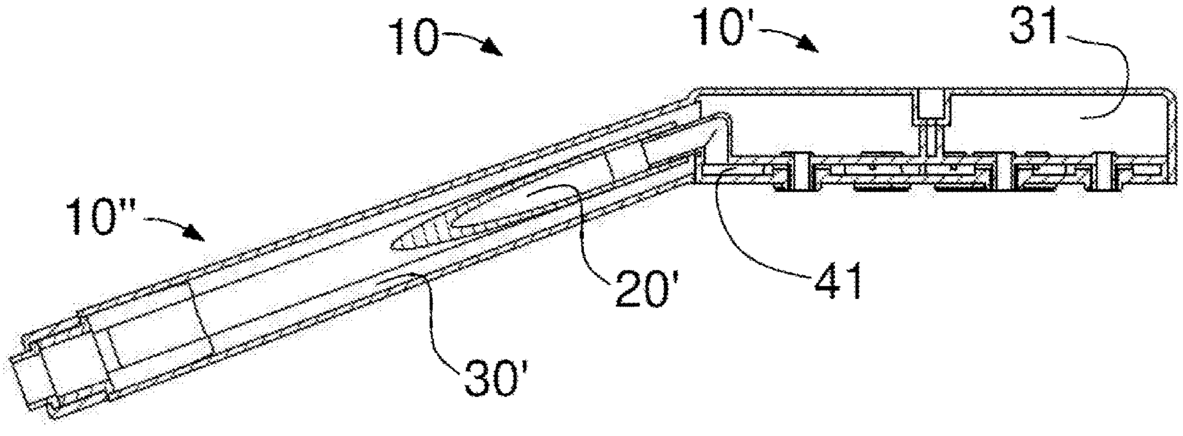
FIG. 53

WATER OUTLET FITTING, E.G. TAP OR SHOWER HEAD, PRODUCING A COMBINED FLOW OF GAS AND WATER, AND POWER CONNECTOR THEREFOR

This invention relates to water outlet fittings, for example, shower heads or taps, which combine a flow of water with a flow of pressurised air or other gas to produce a voluminous flow with reduced water consumption.

In one approach, exemplified by WO2012/110790 A1 to the present applicant, the flow of water is divided into droplets which are suspended in a moving airflow.

Another approach is to mix the air and water to produce a stream of aerated water, often referred to as a foam or bubble shower, for example, as taught by JP2002119435A. Showers of this type are arranged to deliver a stream of pure water (i.e. water without surfactants or other additives) which leaves the shower head as a continuous liquid phase in which the air is distributed in the form of small bubbles. The air can be delivered to the shower head via a hose from an air pump or blower, or from an air pump integrated into the shower head, as taught by CN203972169U.

The stream of aerated water from a foam or bubble shower generally does not produce a more effective cleaning action on the user's body, but rather, distributes the available volume of water over a larger surface area. It is known to produce much smaller bubbles (so-called "microbubbles" or "nanobubbles") by ultrasonic cavitation; generally however this is used for cleaning objects rather than for bathing the body.

It is also known, for example from CN107374430A, JP2004321405A and JP2004089465A to produce a stream of bubbles by adding surfactant to water and blowing an airflow through the solution. The bubbles are formed using very little water and may persist to form a raft that fills a bath or shower enclosure, which makes bathtime more fun and may also assist in cleansing the body.

The present invention recognises that a flow of water, without the addition of surfactants, may be divided into individual, relatively large, gas-filled bubbles as an interesting new way to distribute the water over a target surface as a more voluminous flow with enhanced appearance.

The enhanced appearance of the bubbles of pure water may be advantageous particularly in applications for bathing the whole or part of the body, which is both a visual and a tactile experience.

Accordingly, the invention provides: in a first aspect, an apparatus and a method operating within a defined parameter space to encapsulate gas in a series of bubbles; in a second aspect, an apparatus including an emitter body; and in a third aspect, a shower head including a power connector for supplying electrical energy from an external conductor to the shower head; all as defined in the claims.

In accordance with the first aspect of the invention, the apparatus includes a gas supply means, a water supply means, and an emitter body which includes at least one flow emitter. The flow emitter includes an gas outlet and a water outlet and defines an emitter axis extending centrally through the gas outlet.

The water outlet is annular and surrounds the gas outlet, and has an outer diameter $d_w$ and a radial width h. The gas supply means is arranged to supply a gas having a density $\rho_g$ to flow at a velocity $u_g$ from the gas outlet.

The water supply means is arranged for connection to a supply of water having a surface tension $\sigma_w$ to supply the water to flow at a velocity $u_w$ from the water outlet as an annular sheet of water surrounding the gas flowing from the gas outlet.

An aerodynamic Weber number (which is to say, a gaseous Weber number) is defined as $$We_g = \left(\rho_g \cdot (u_g - u_w)^2 \cdot h\right) / \sigma_w$$

The apparatus is arranged to operate within a parameter space defined by $h/d_w$ and $We_g$, wherein $$(h/d_w) \leq 0.31 \text{ and}$$

$$(2.5 \cdot 10^{-3}) < We_g \leq We_{g(max)}$$

$$\left(h/d_w = 0.04 \cdot We_g^{0.5}\right).$$

The apparatus is arranged and operated to encapsulate the gas flowing from the gas outlet in a series of bubbles formed by the water flowing from the water outlet.

In accordance with the second aspect of the invention, the apparatus includes an emitter body, the emitter body including a water inlet, a gas inlet, and at least one flow emitter. The flow emitter defines an emitter axis and includes a gas outlet in fluid communication with the gas inlet, an annular water outlet surrounding the gas outlet, and an annular water flowpath in fluid communication with the water inlet and terminating at the water outlet, the annular water flowpath being defined between radially inner and outer walls coaxial with the emitter axis. The emitter axis extends centrally through the gas outlet. The gas inlet is arranged to receive a supply of gas to flow in use from the gas outlet. The water inlet is arranged to receive a supply of water to flow in use from the water outlet as an annular sheet of water surrounding the gas flowing from the gas outlet, to encapsulate the gas flowing from the gas outlet in a series of bubbles formed by the water flowing from the water outlet.

In its third aspect, the invention provides a shower head including a power connector for supplying electrical energy from an external conductor to the shower head. The power connector includes first and second connector bodies having cooperating contacts for transmitting the electrical energy, at least one magnet for releasably holding together the first and second connector bodies, and at least one seal configured to exclude water from the contacts when the first and second connector bodies are held together by the at least one magnet.

Further features and advantages will be appreciated from illustrative embodiments of the invention which will now be described, purely by way of example and without limitation to the scope of the claims, and with reference to the accompanying drawings, in which:

FIG. 1 shows an apparatus including an emitter body in accordance with an embodiment of the invention.

FIG. 2 shows one flow emitter of the emitter body, in longitudinal section along the emitter axis.

FIG. 3 is an end view of the flow emitter of FIG. 2.

FIGS. 4 and 5 are end views of flow emitters with different dimensions.

FIG. 6 is a graph locating the target breakup regime in the parameter space defined by $h/d_w$ and $We_g$ by reference to Zhao et al (op. cit., below).

Figure 7A:
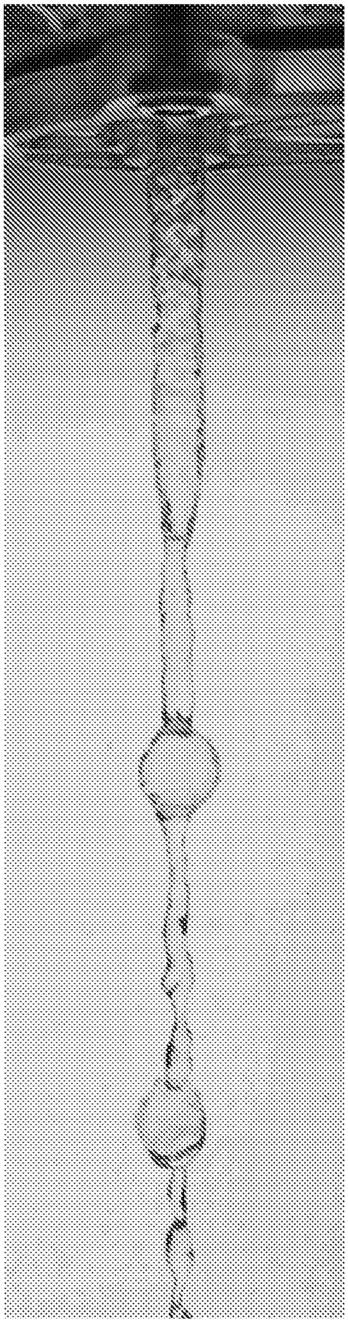
Figure 7B:
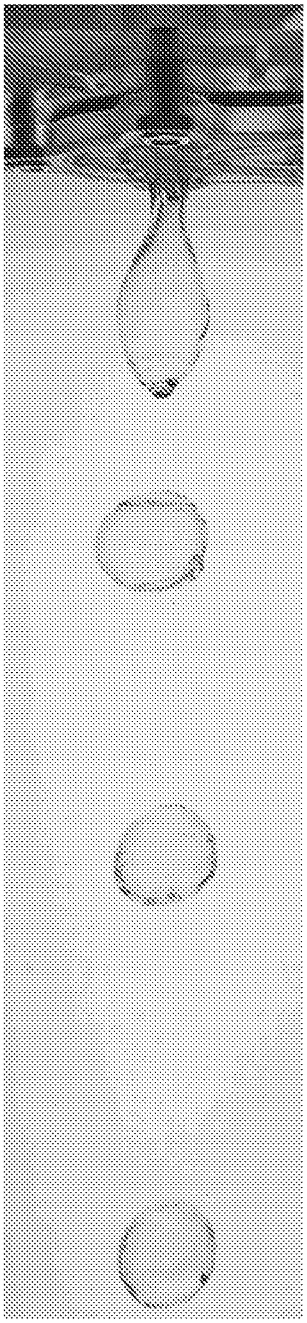
Figure 7C:
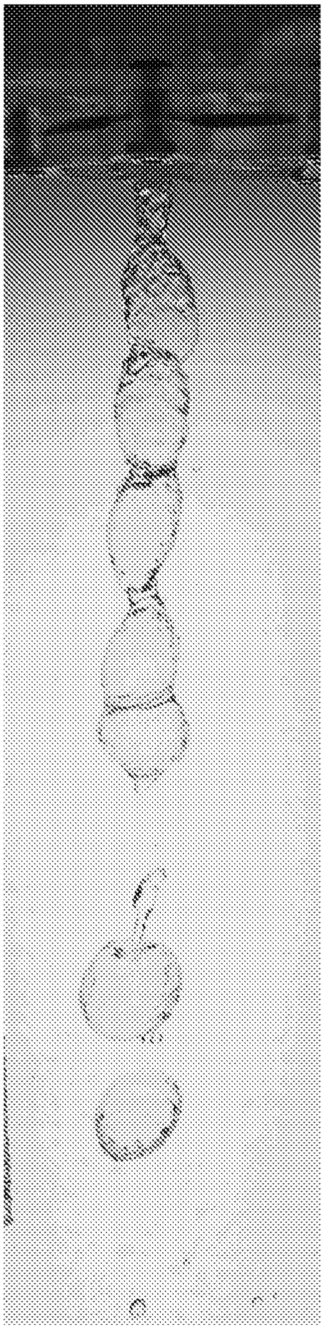

FIGS. 7*a*, 7*b* and 7*c* show a stream of bubbles produced from a flow emitter operating, respectively in the Type I, Type II and Type III breakup regime.

Figure 8A:
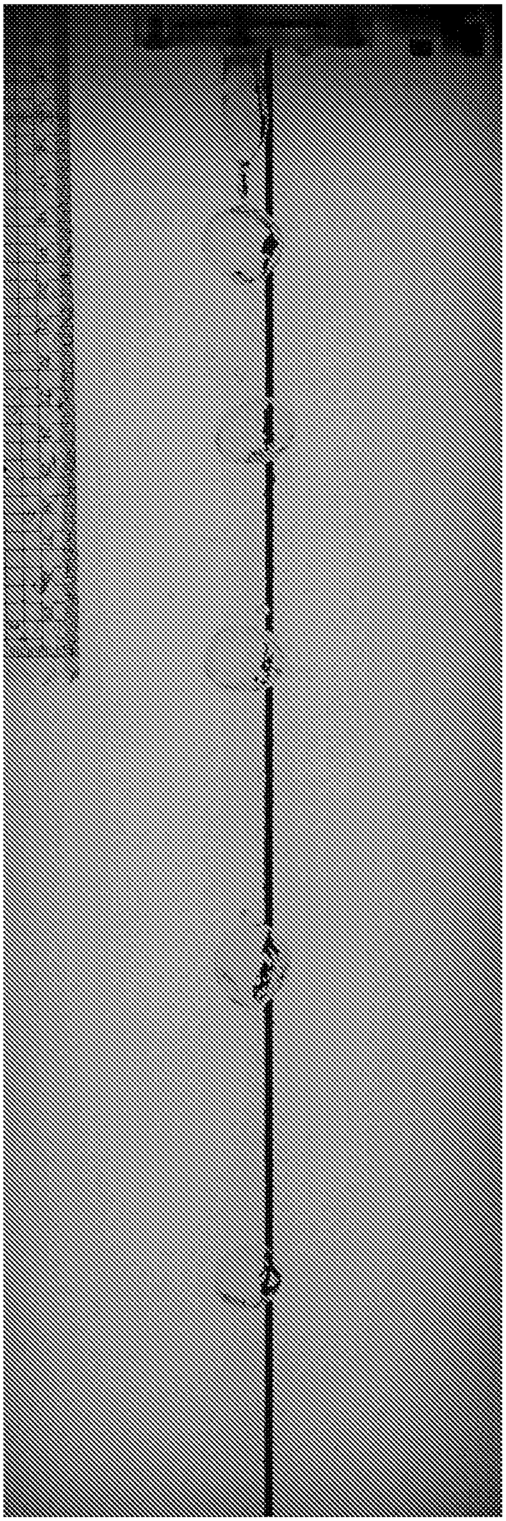
Figure 8B:
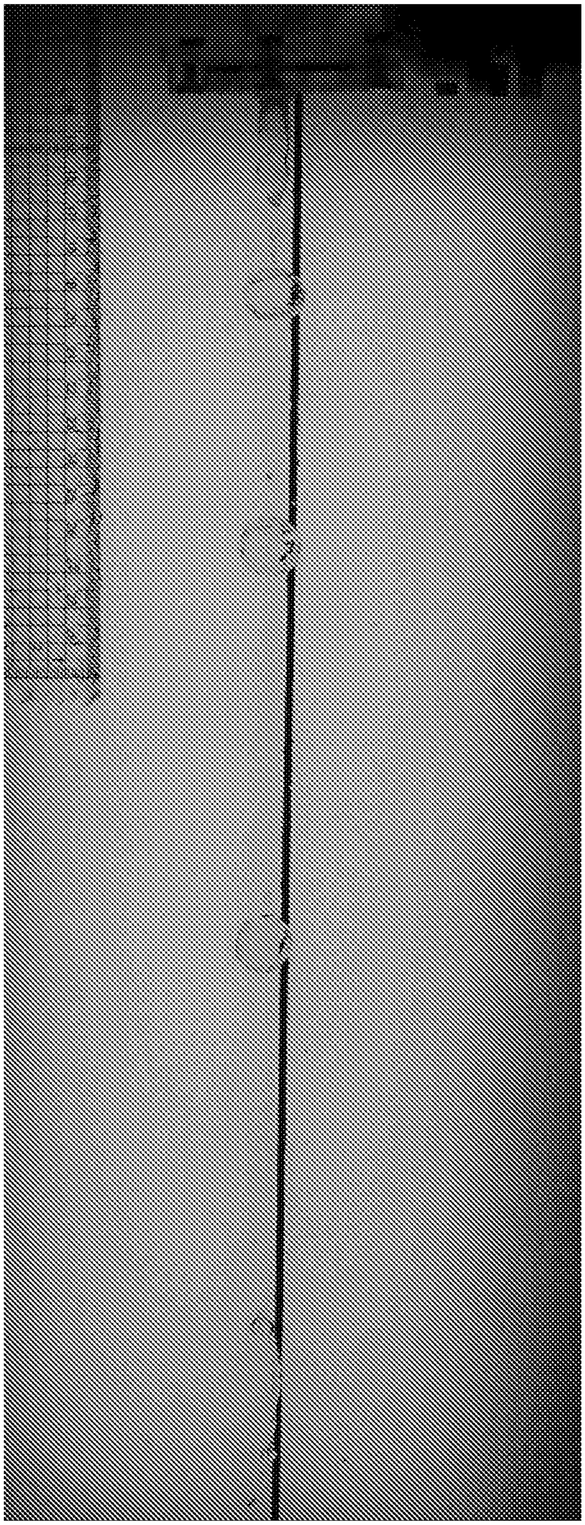
Figure 8C:
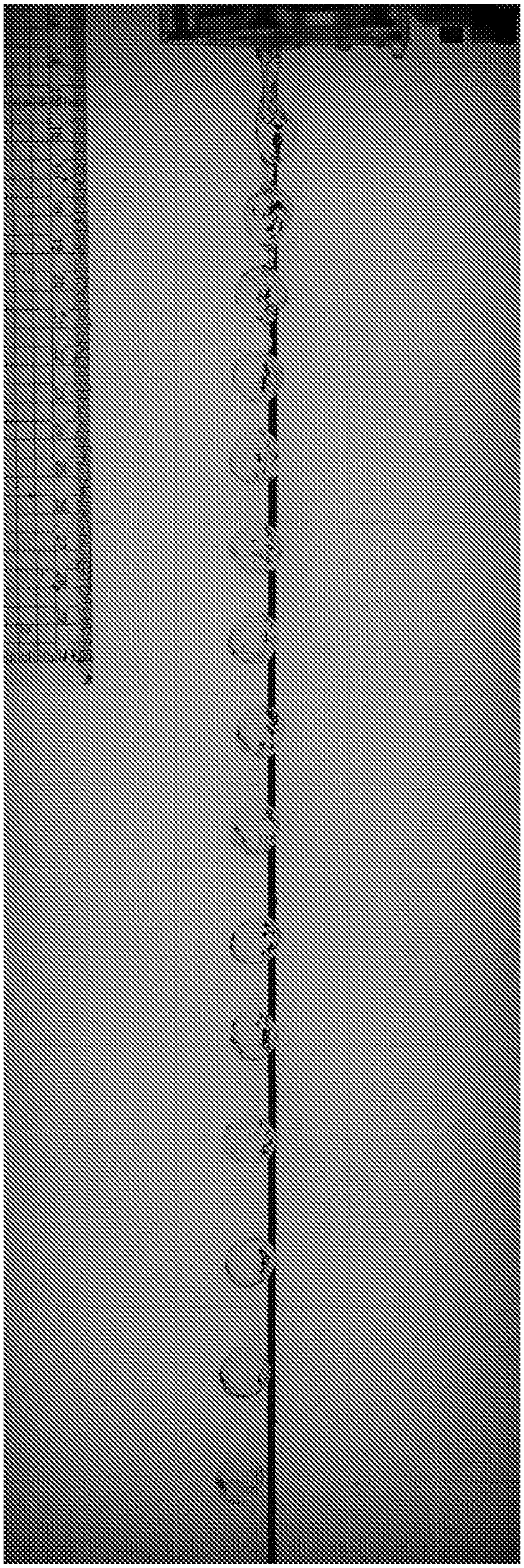
Figure 8D:
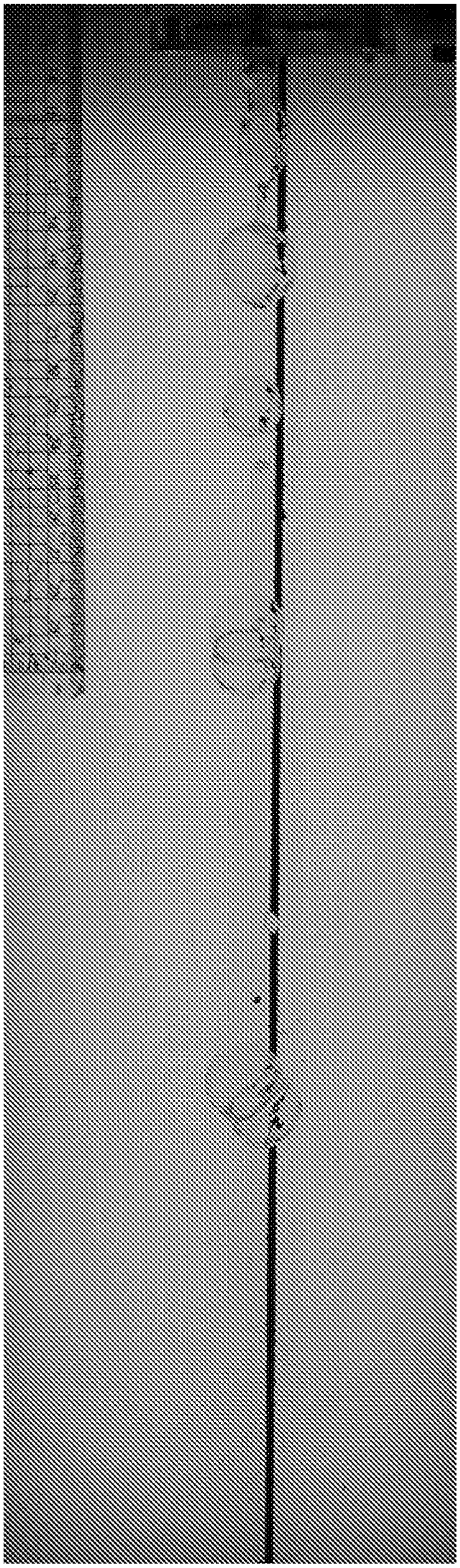

FIGS. 8*a*-8*d* show a stream of bubbles produced from a flow emitter operating, respectively in the Type II-A sub-regime (FIGS. 8*a* and 8*b*), in the Type II-B sub-regime (FIG. 8*c*), and in the Type II-C sub-regime (FIG. 8*d*).

Figure 9A:
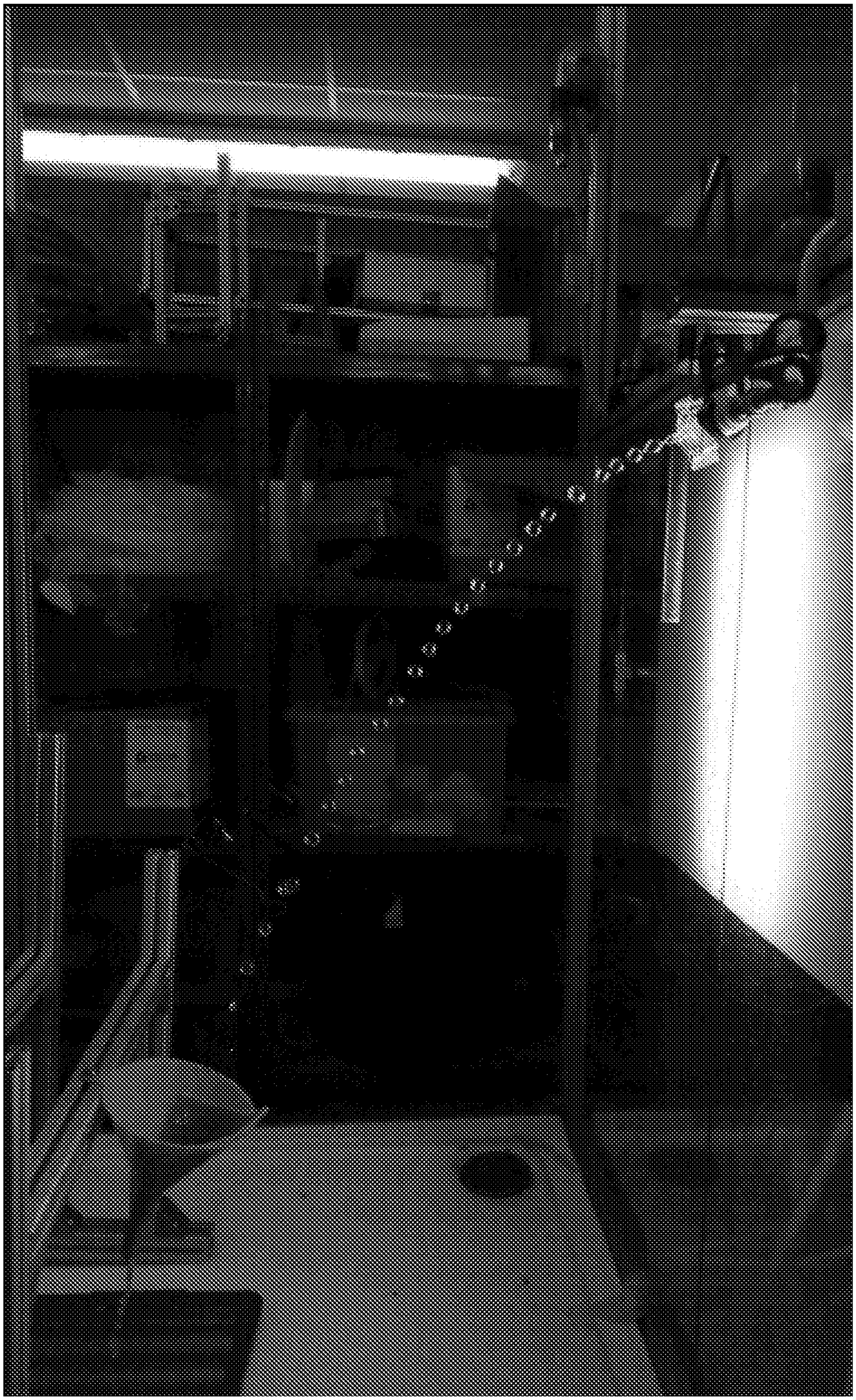

FIG. 9A shows a stream of bubbles produced from a flow emitter operating in the Type II regime with an inclined emitter axis.

Figure 9B:

FIG. 9B shows a stream of bubbles projected along an upward trajectory from a flow emitter operating in the Type II regime.

FIGS. 10*a* and 10*b* are respectively a peripheral side and a front (outlet) side view of an emitter body configured as a shower head for installation with an inclined emitter axis.

FIG. 10*c* is a section at Xc-Xc of FIG. 10*b*.

FIG. 11 shows a test shower head comprising a plurality of flow emitters operating at two different air flow rates.

FIG. 12 shows four flow resistors with differently patterned channels.

FIG. 13 shows another flow resistor with corrugated channels.

Figure 14:
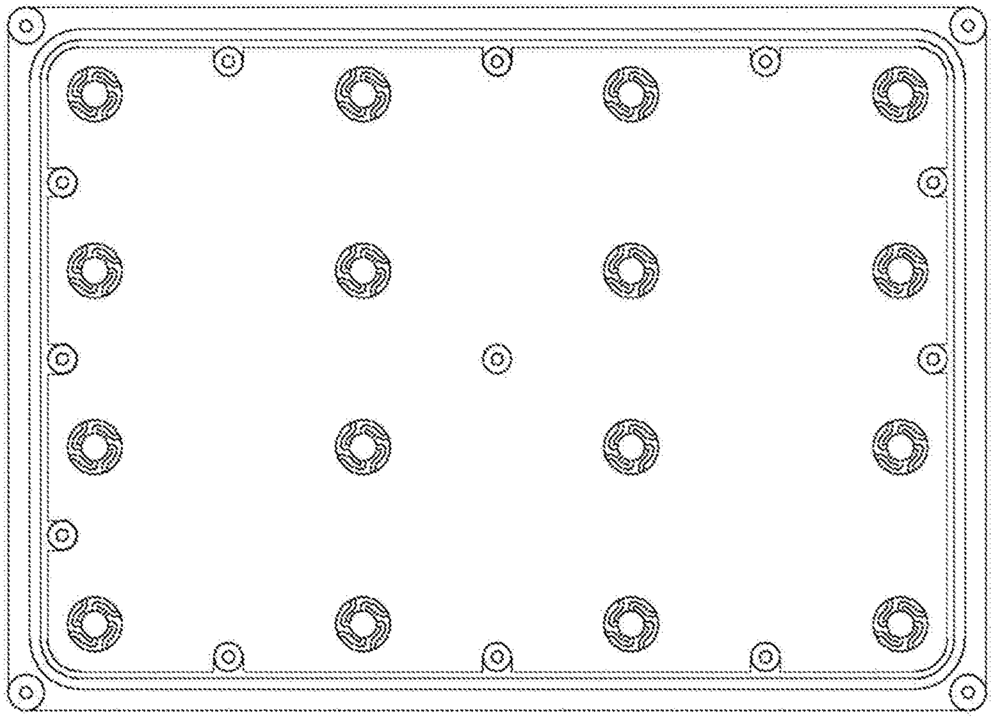

FIG. 14 shows a plate comprising an array of flow resistors.

FIG. 14 shows another plate comprising an array of flow resistors and shields for diverting higher velocity flows.

Figure 15:
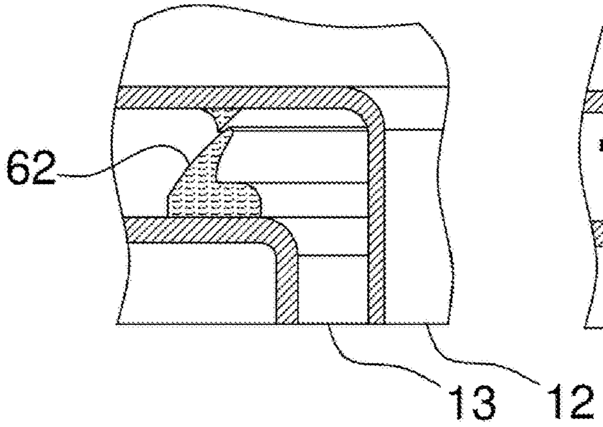
Figure 16:
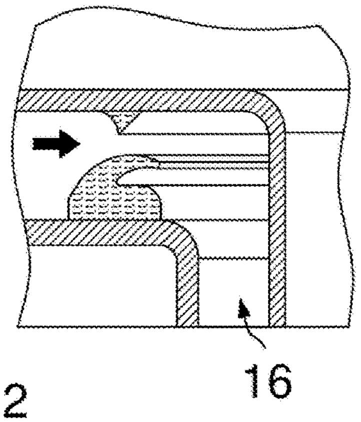

FIGS. 15 and 16 show another flow resistor comprising an annular valve element, respectively in a closed position and an open position.

Figure 17:
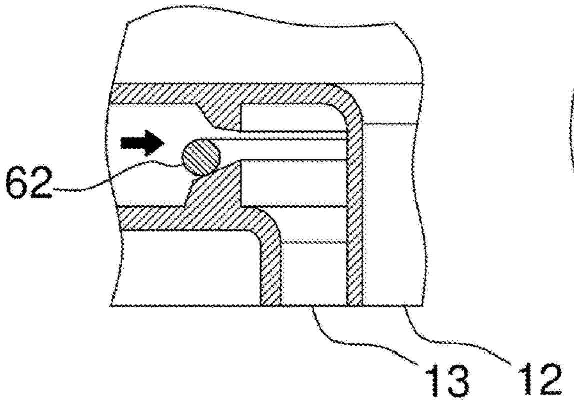
Figure 18:
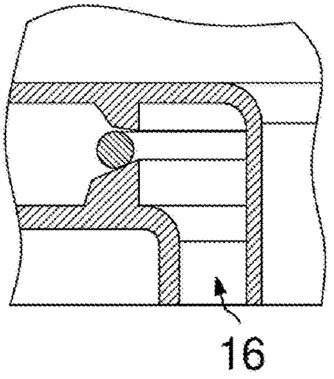

FIGS. 17 and 18 show another flow resistor comprising an annular valve element, respectively in an open position and a partially closed position.

Figure 19:
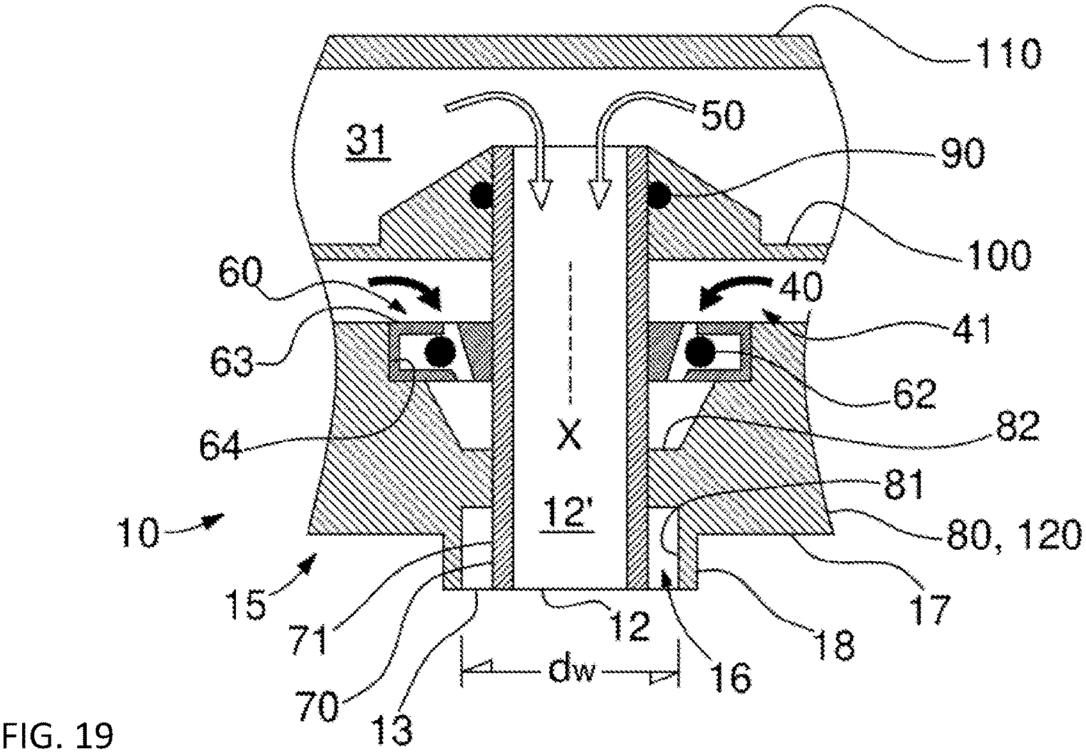

FIG. 19 is a longitudinal section through one flow emitter showing another flow resistor.

Figure 20:
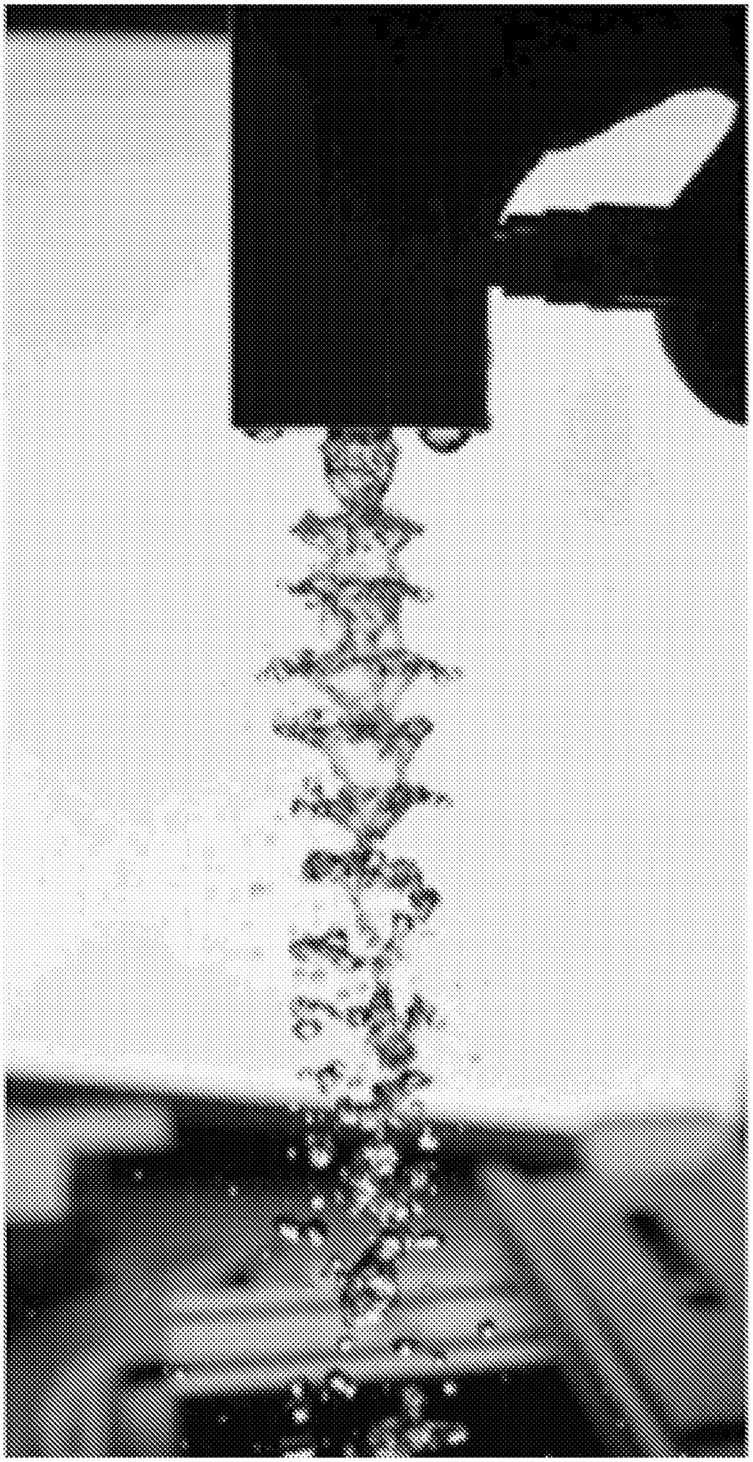

FIG. 20 shows a flow emitter in accordance with an embodiment of the invention, operating in the alternative Christmas tree regime.

Figure 21:
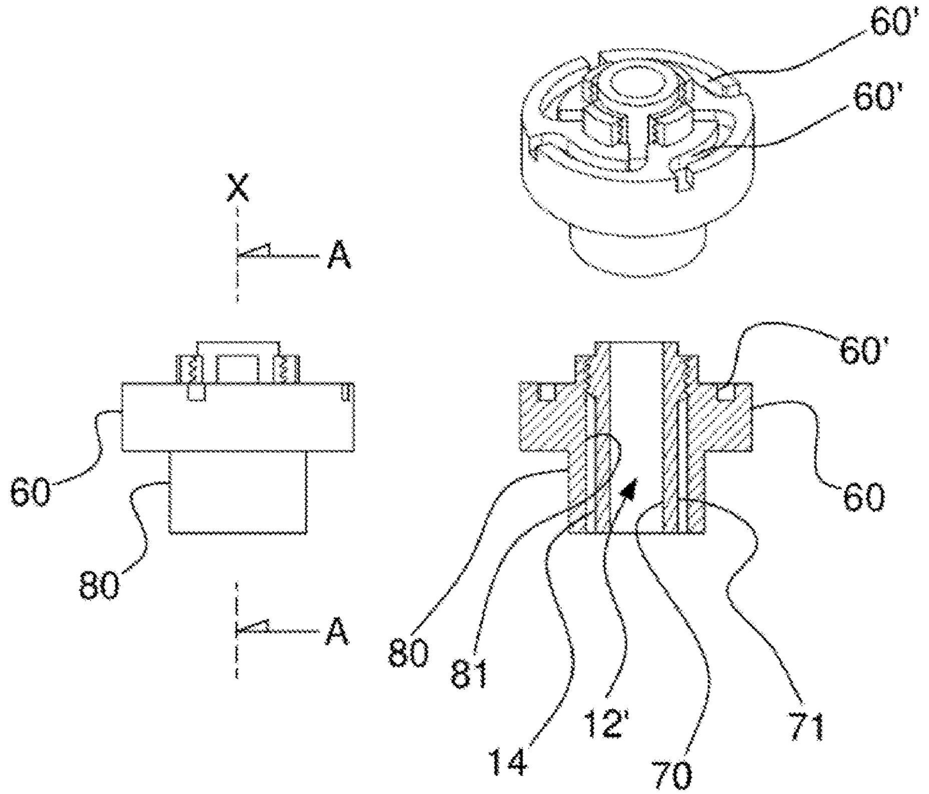

FIG. 21 shows another flow emitter in various views, including a section at A-A in the same figure, having a tubular insert separating the gas and water flowpaths and threadedly engaged in a flow resistor.

Figure 22:
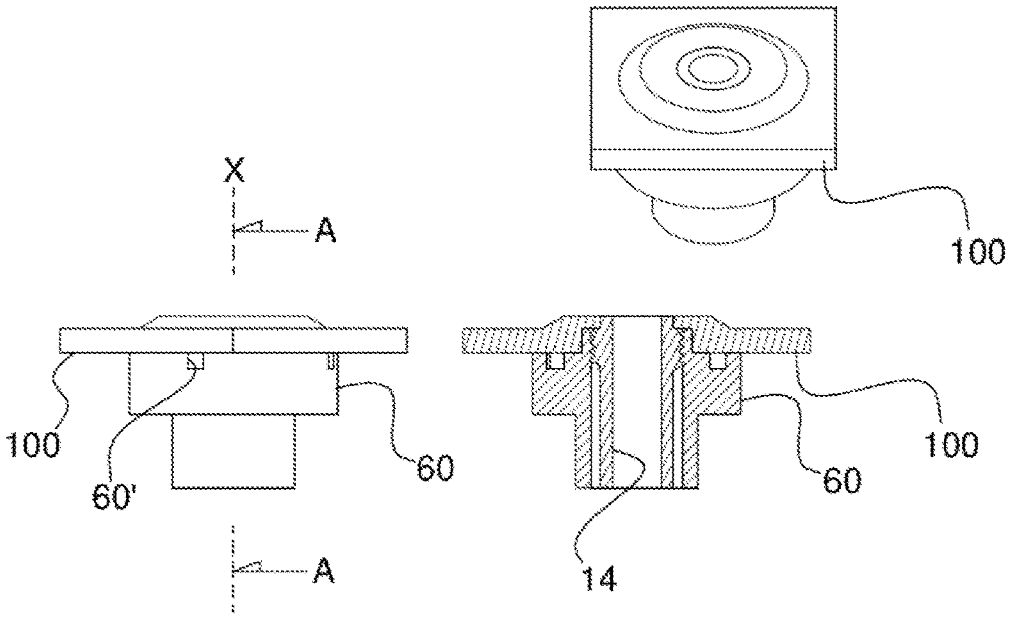

FIG. 22 shows further views of the flow emitter of FIG. 21, assembled to a separator plate of the emitter body.

Figure 23:
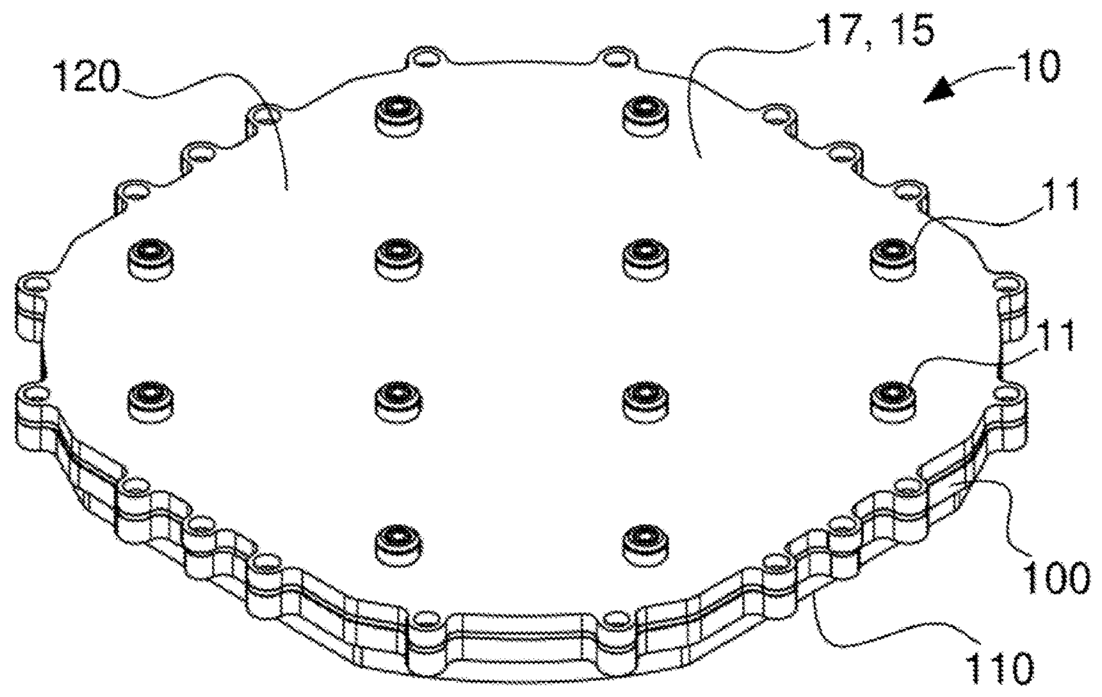
Figure 24:
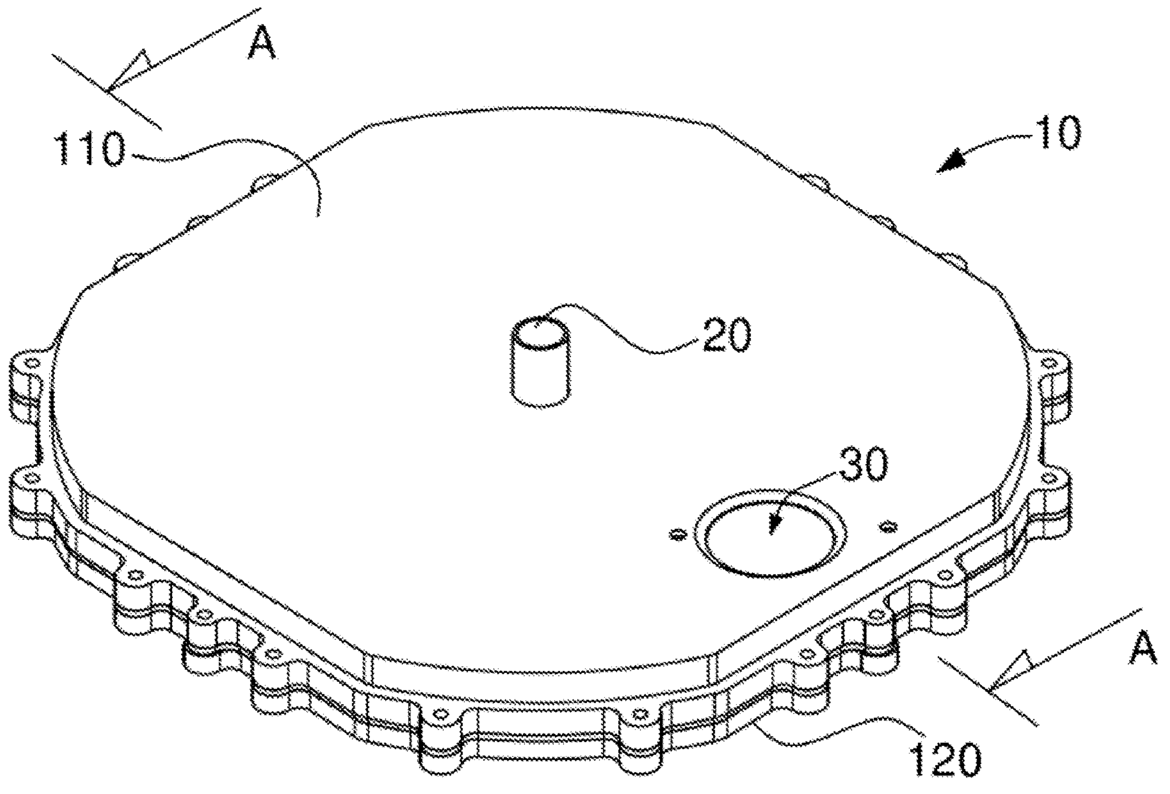
Figure 25:
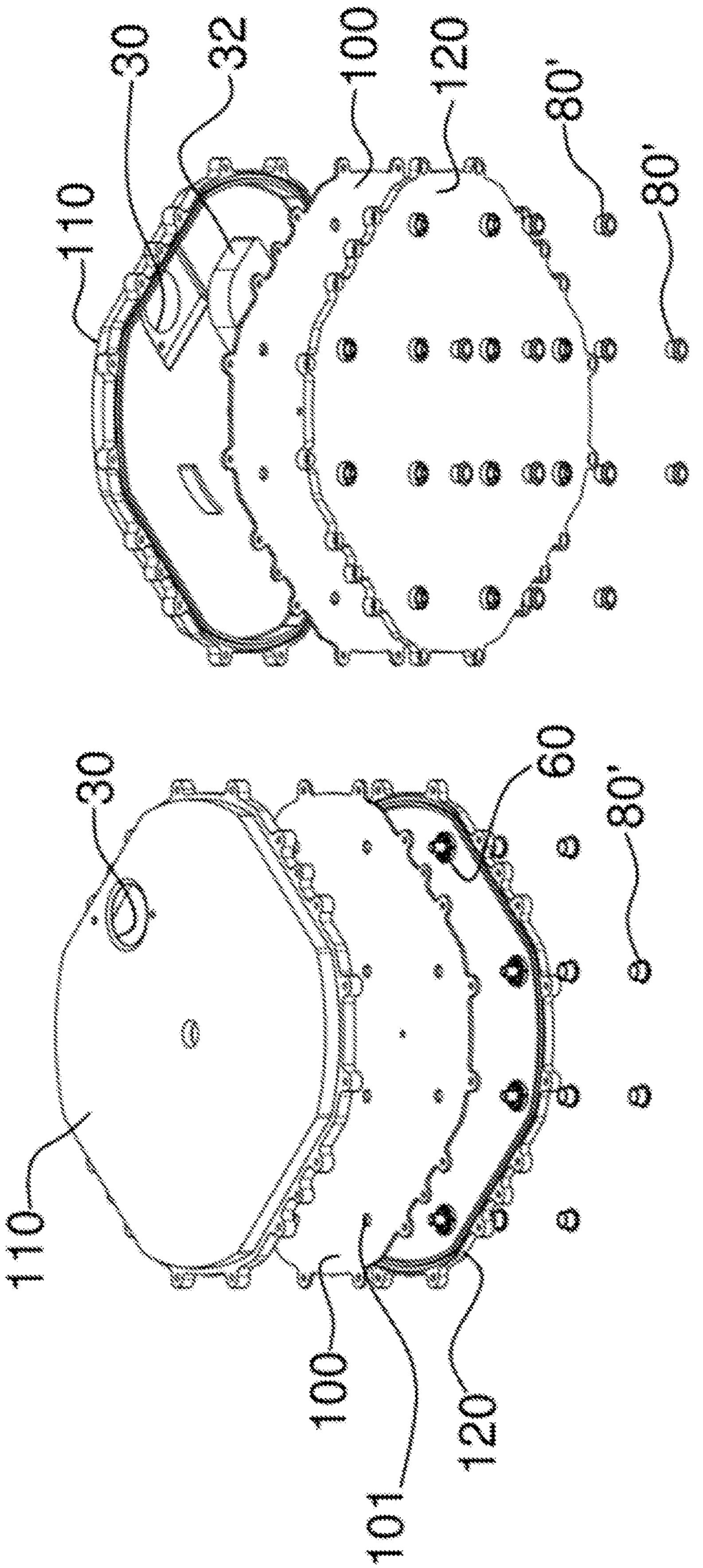

FIGS. 23-25 show another emitter body, respectively in front view (FIG. 23), rear view (FIG. 24), and exploded view (FIG. 25).

Figure 26:
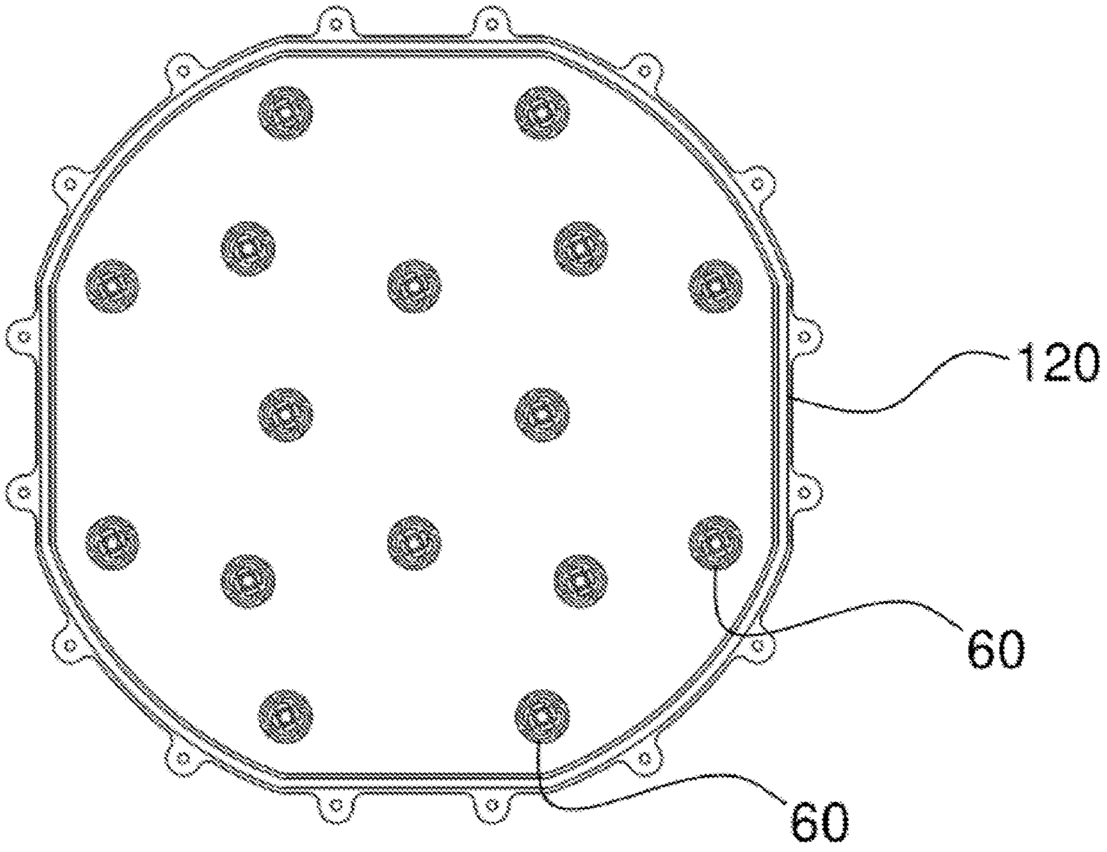
Figure 27:
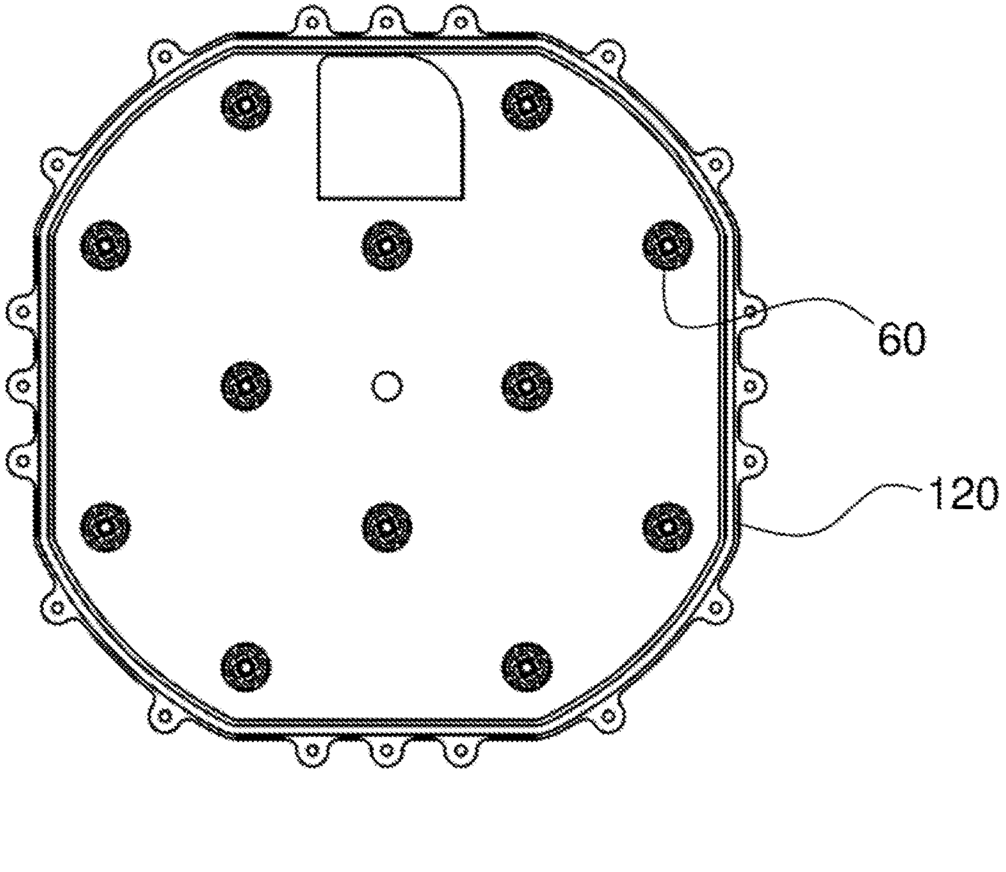

FIGS. 26 and 27 show two alternative front plates of the emitter body of FIGS. 23-25, each including an array of flow resistors.

Figure 28:
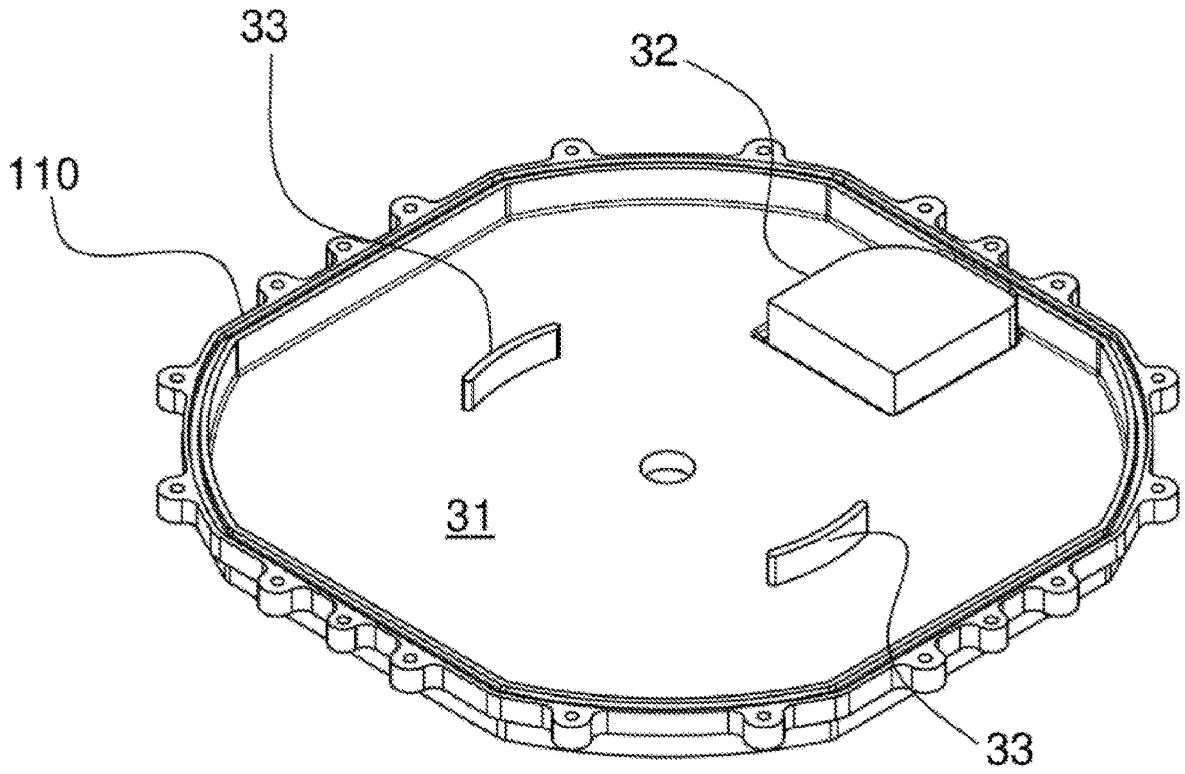

FIG. 28 shows the rear plate of the emitter body of FIGS. 23-25.

Figure 29:
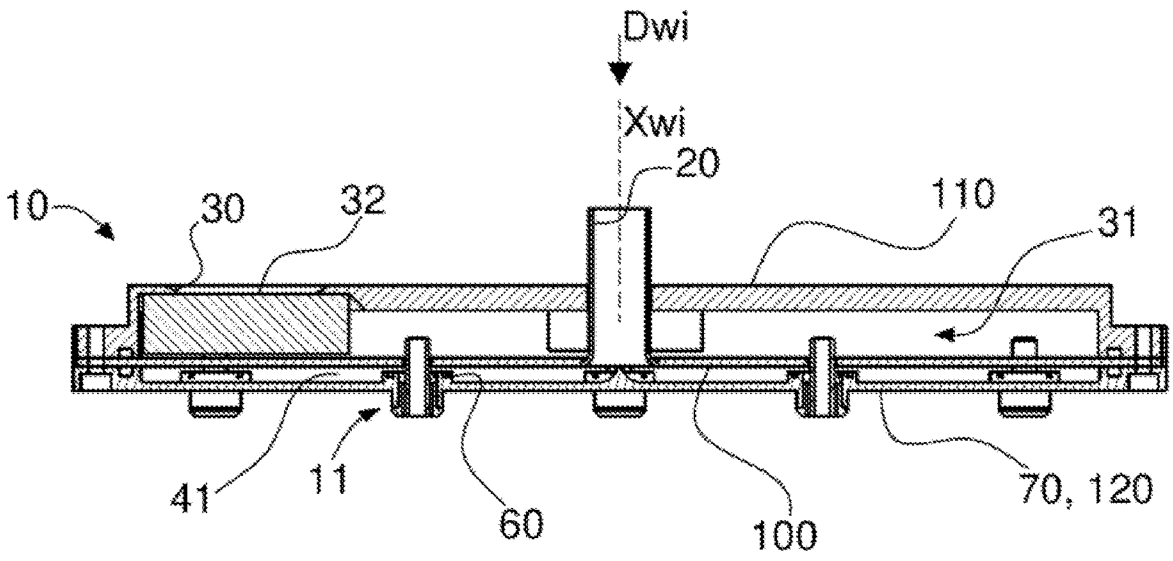

FIG. 29 is a section taken through the emitter body at A-A of FIG. 24.

Figure 30:
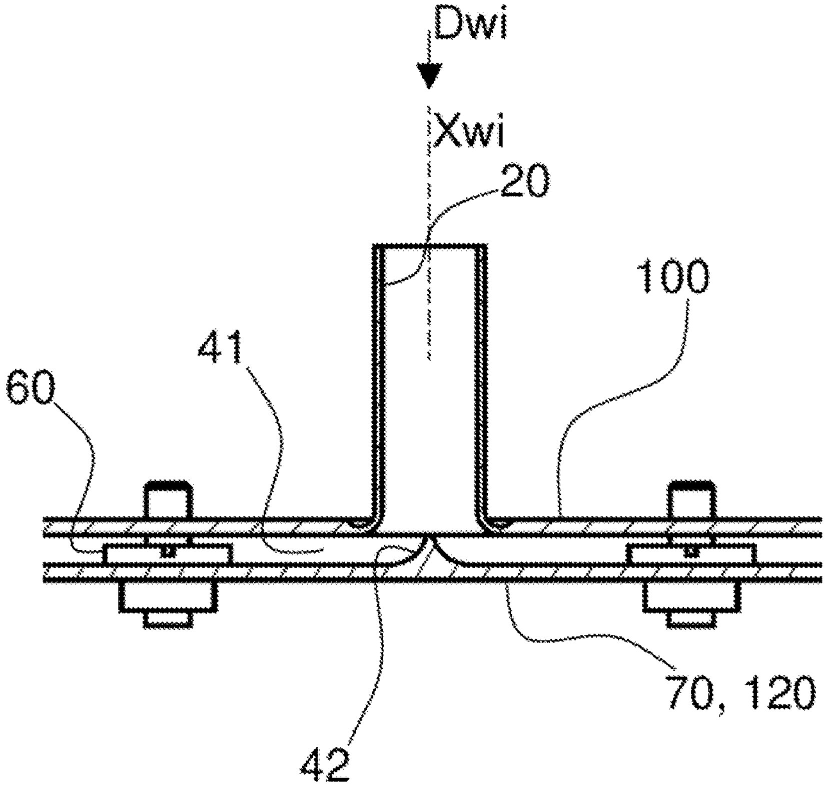

FIG. 30 is an enlarged view of part of the section of FIG. 29.

Figure 31:
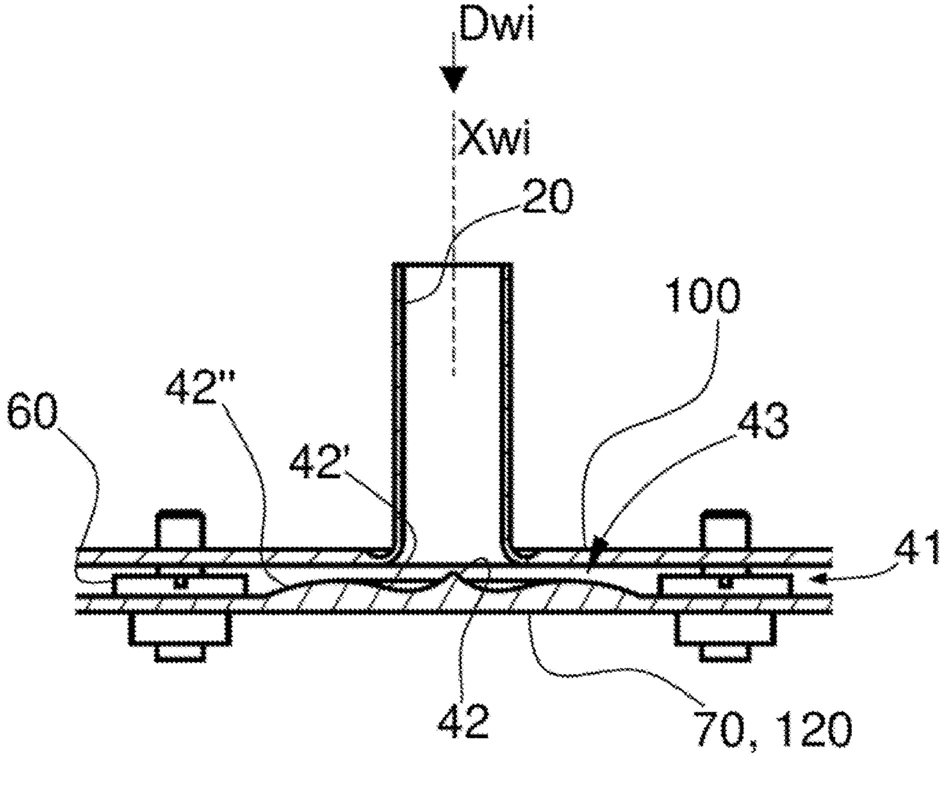

FIG. 31 is the same view as FIG. 30, in a development.

FIG. 32 is an exploded view of the first (partial) and second parts forming one of the flow emitters of the emitter body of FIGS. 23-25.

FIG. 33 shows the same two parts as FIG. 32, seen from behind the separator plate.

FIG. 34 shows the same parts as FIG. 32, respectively in side view and in section taken at A-A in the same figure.

Figure 35:
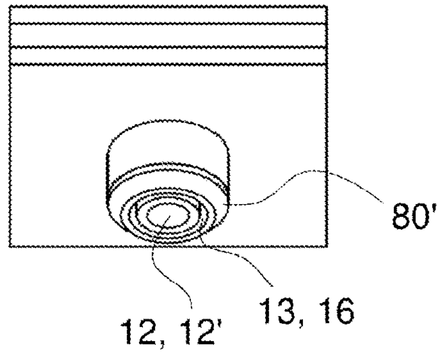

FIG. 35 shows the same parts as FIG. 32, after assembly.

Figure 36:
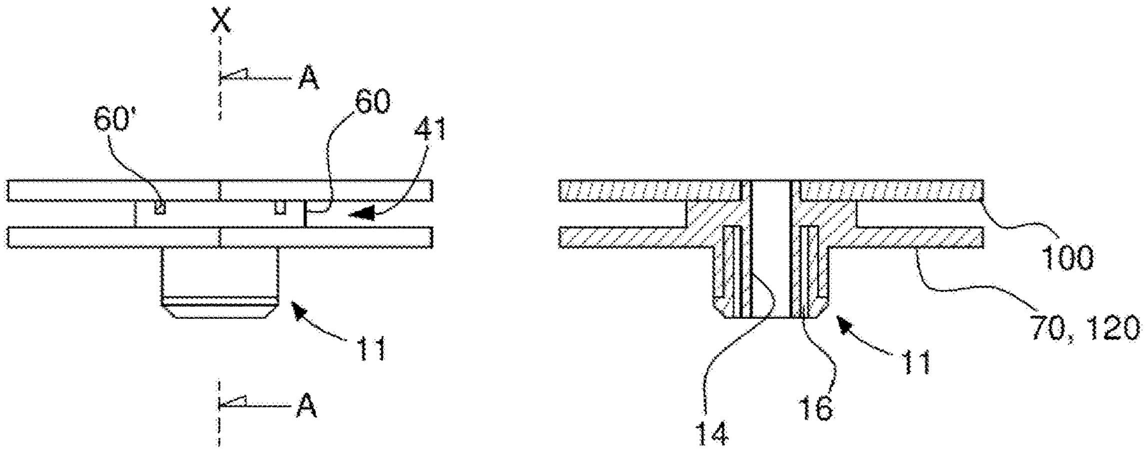

FIG. 36 shows the same assembled parts as FIG. 35, respectively in side view and in section taken at A-A in the same figure.

Figure 37:
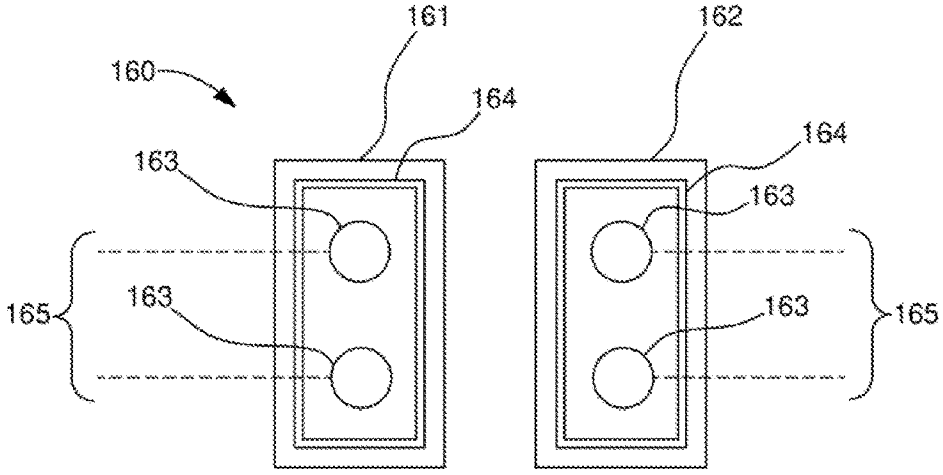

FIG. 37 shows a magnetic power connector with a seal.

Figure 38:
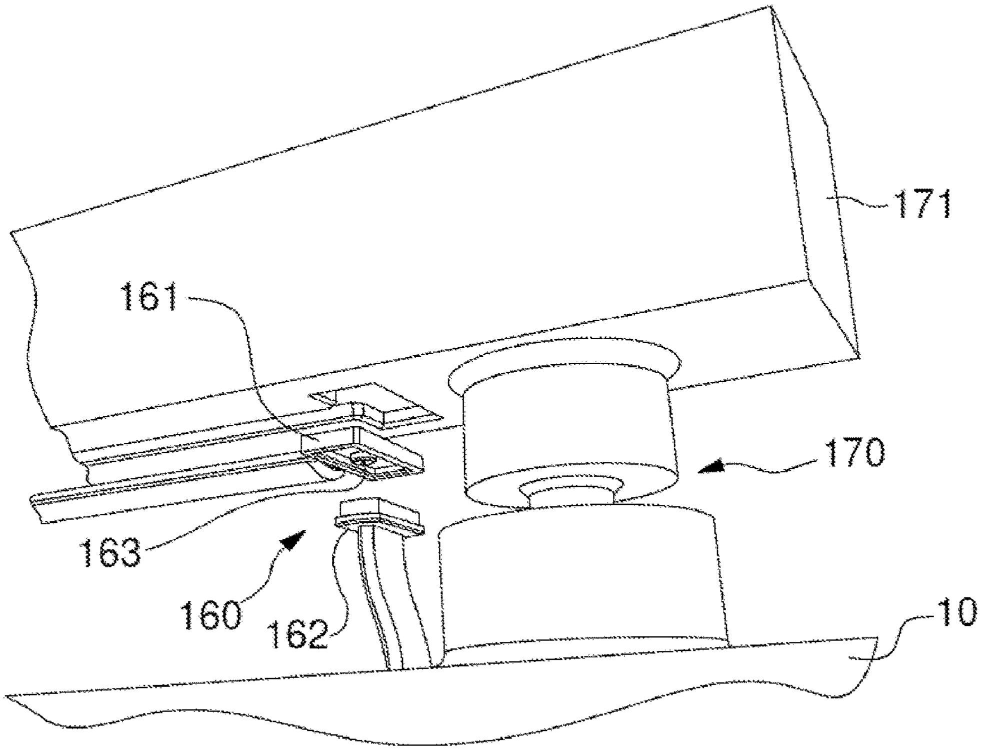

FIG. 38 shows a magnetic power connector arranged to conduct power to an emitter body configured as a showerhead and mounted on a support arm via a releasable ball joint.

Figure 39:
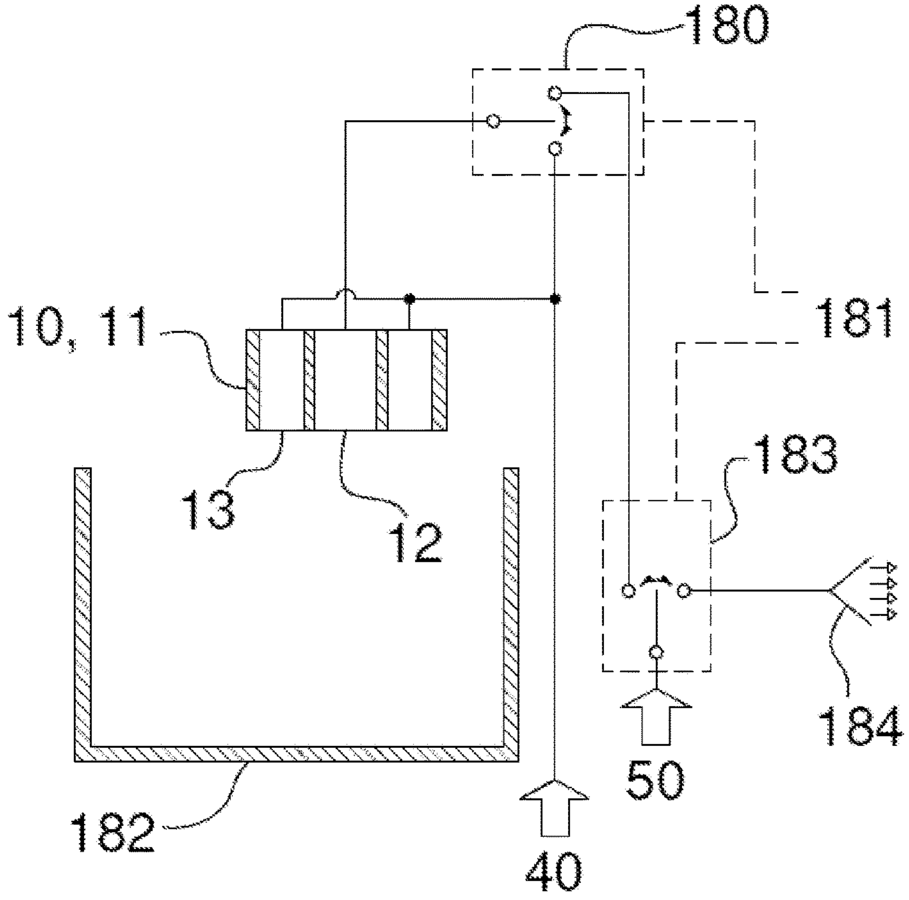

FIG. 39 illustrates schematically a flow emitter with a fill mode control and a drying control and configured as a tap discharging into a sink or basin.

Figure 40:
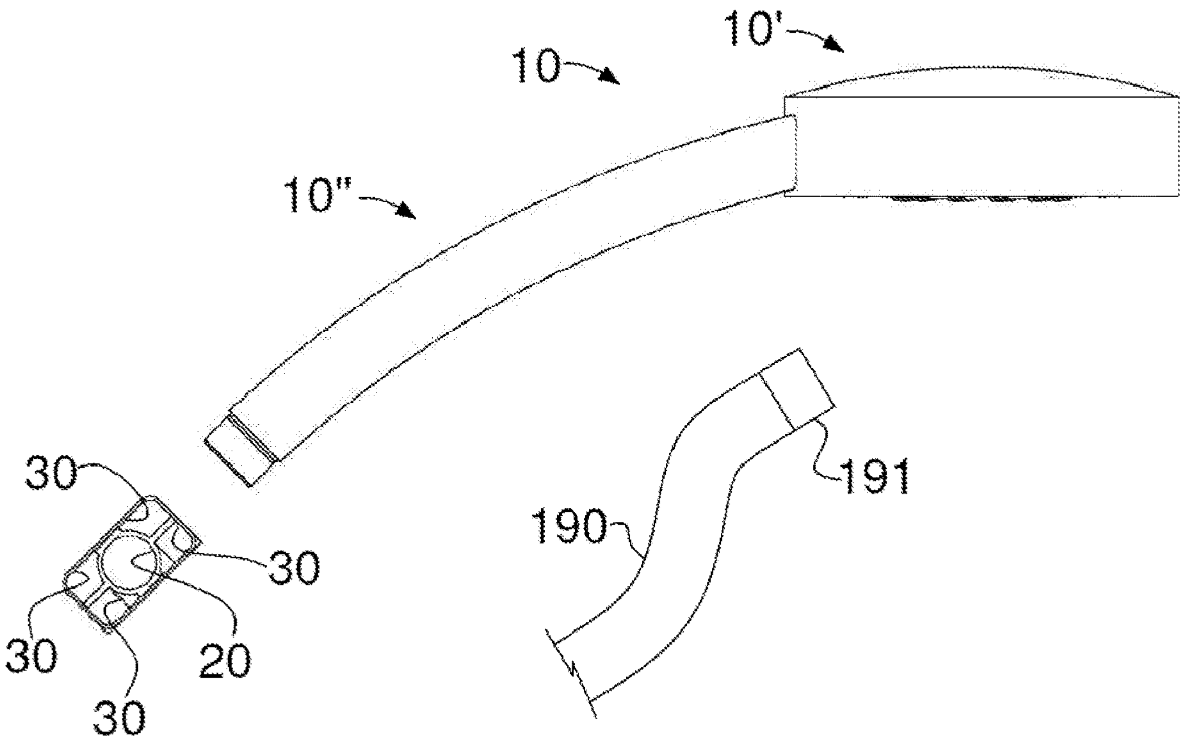
Figure 41:
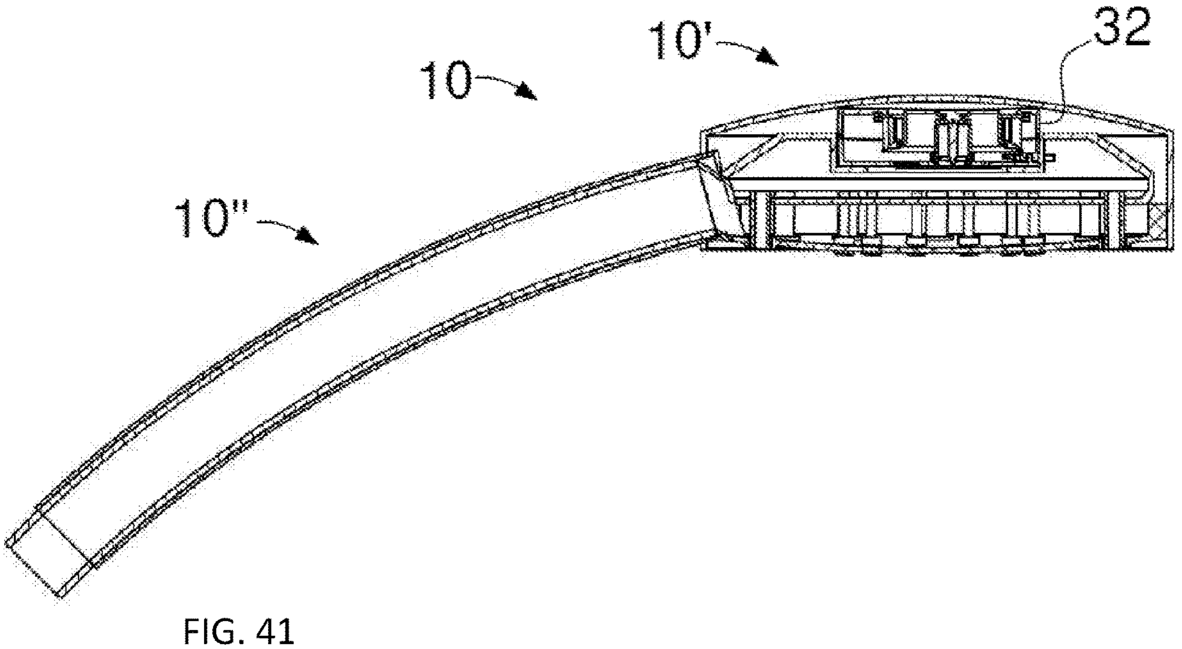

FIGS. 40-43 show an emitter body configured as a handset with an integral air pump, wherein:

FIG. 40 shows the handset and flexible water supply hose;

FIG. 41 is a longitudinal section through the handset;

FIG. 42 shows the air pump cartridge; and

FIG. 43 shows a battery pack attached to the handset.

Figure 44:
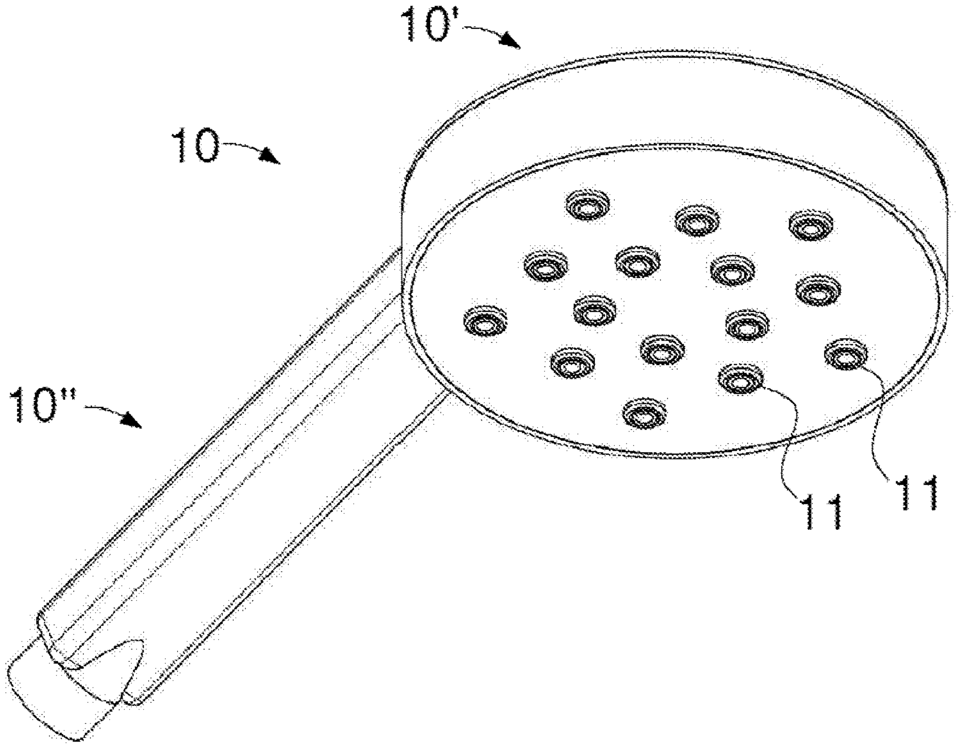
Figure 45:
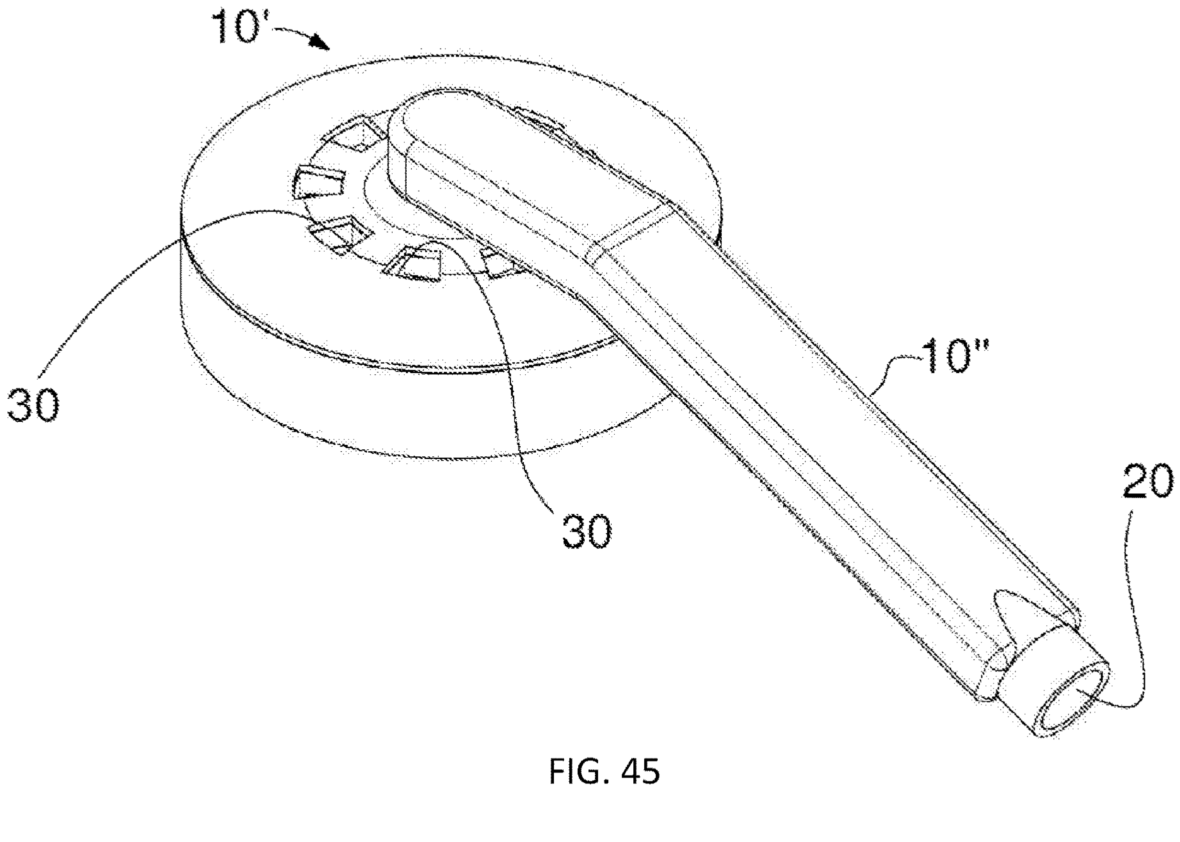
Figure 46:
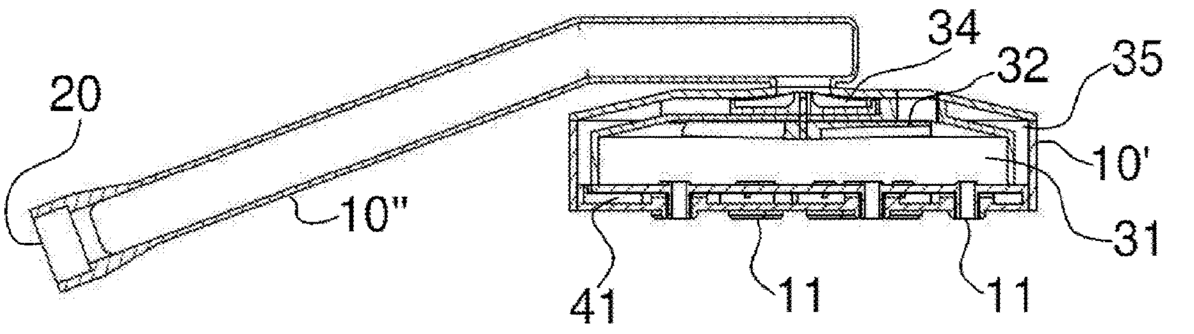

FIGS. 44-46 show an emitter body configured as a handset with an integral air pump, respectively in front view (FIG. 44), rear view (FIG. 45), and longitudinal section (FIG. 46).

Figure 47:
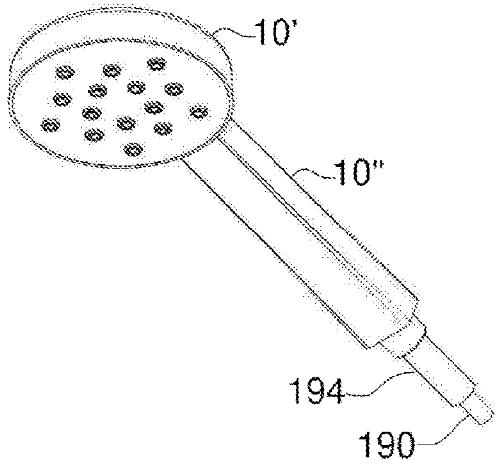
Figure 48:
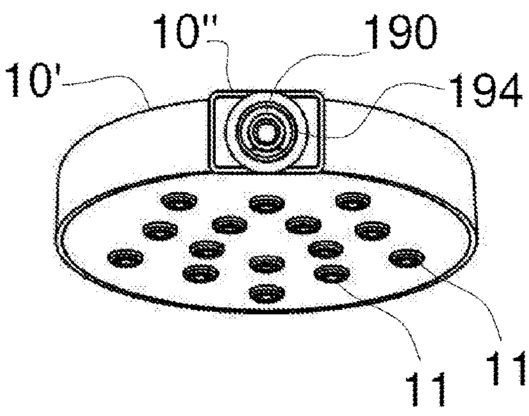
Figure 49:
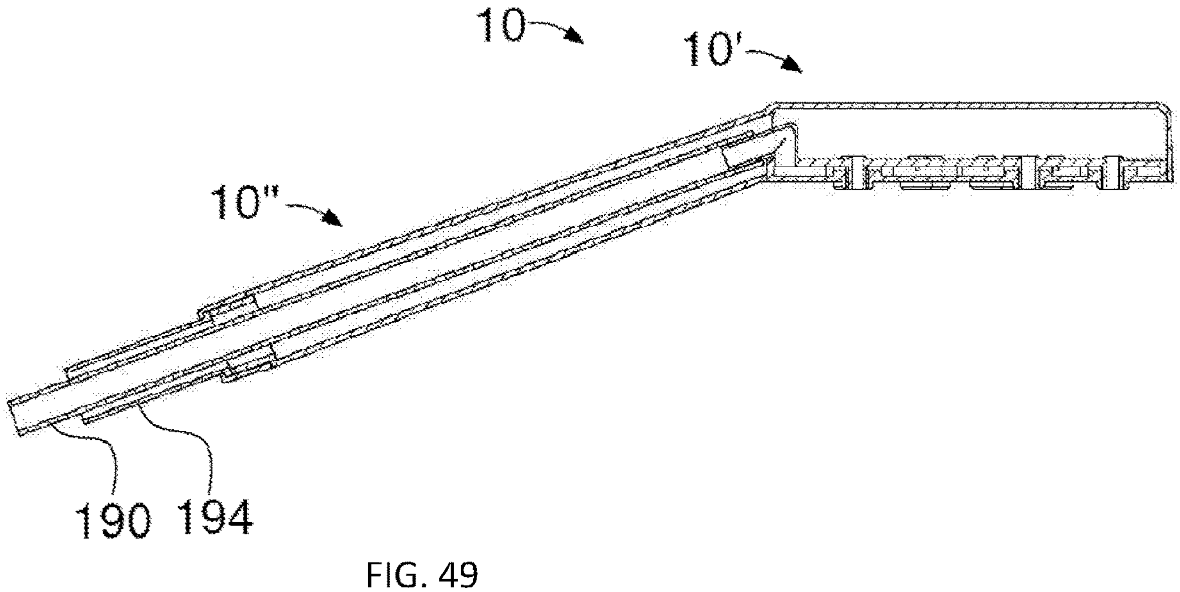

FIGS. 47-49 show another emitter body configured as a handset and supplied with air and water via concentric flexible hoses, respectively in front view (FIG. 47), end view (FIG. 48), and longitudinal section (FIG. 49).

FIGS. 50-53 show another emitter body configured as a handset and supplied with air and water via flexible hoses arranged in parallel (juxtaposed) relation, respectively in front view (FIG. 50), side view (FIG. 51), partial end view (FIG. 52), and longitudinal section (FIG. 53).

Reference numerals and characters appearing in more than one of the figures indicate the same or corresponding elements in each of them.

Referring to FIG. 1 and FIG. 2, an apparatus 1 includes a gas supply means 2, a water supply means 3, and an emitter body 10 which includes at least one flow emitter 11.

The emitter body 10 has a gas inlet 30 and a water inlet 20. The or each flow emitter includes a respective gas outlet 12 in fluid communication with the gas inlet 30, an annular water outlet 13 surrounding the gas outlet 12, and an annular water flowpath 16 in fluid communication with the water inlet 20 and terminating at the water outlet 13. The annular water flowpath 16 is defined between radially inner and outer walls 71, 81 (which is to say, wall surfaces) coaxial with the emitter axis X, which extends centrally through the gas outlet.

The apparatus may further include a controller 6 for controlling the operation of the apparatus responsive to input from user controls 7. The controller 6 may include a processor configured to execute instructions stored in non-transient memory, for example, to regulate either or both of the water flow and the gas flow responsive to user input and/or changes in the water flow or pressure.

The gas supply means 2 is arranged to supply a gas 50 having a density $\rho_g$ to flow at a velocity $u_g$ from the or each gas outlet 12.

The gas 50 may be air, and the gas supply means 2 may include an air pump, e.g. a fan or blower 5. In this specification, the terms "fan", "blower", and "air pump" are synonymous. The air pump 5 may ingest ambient air and supply it under a small positive pressure to the gas outlet of each flow emitter 11, or to the main gas inlet 30 of the emitter body 10 (best seen in FIG. 10*c*) which may supply the gas 50 to a plenum chamber 31 from which it is distributed at constant pressure and flow rate to the individual gas outlets 13. Alternatively the air pump may be configured as a fan 32 which is incorporated into the emitter body to draw in ambient air from the gas inlet 30 of the emitter body and supply it to the plenum chamber.

Generally in this specification it is assumed that the gas is air, and the density of the gas $\rho_g$ is taken to be the density of air. Gas density $\rho_g$ is taken to be a fixed value at the selected temperature and pressure, which may be determined by the pressure/flow rate profile of the air pump 5. As an approximation, where the gas is air, the gas density $\rho_g$ may be taken to be the nominal value of 1.225 $kgm^{-3}$ at 1 atmosphere and 20° C.

Alternatively however, since the gas is encapsulated within each bubble, the gas 50 may include or consist of a gas other than air, and the novel apparatus may be used to deliver that gas to the target surface, e.g. to the surface of the user's body when showering or washing the hands. The calculations presented herein may be adapted mutatis mutandis to accommodate the use of gases other than ambient air.

By way of example, the gas 50 could be air enhanced with one or more additives such as airborne scents, ionised air, oxygen, ozone, carbon dioxide or any desired gas or vaporised compound, which could be introduced and mixed into ambient air upstream or downstream of the air pump 5. Oxygen or other gases, e.g. as mentioned above, could be used instead of air.

Alternatively or additionally, the water 40 may be similarly enhanced with one or more additives such as scents or any other desired substance which may be dissolved or dispersed in the water. Such additives may include surfactants.

For this purpose the apparatus may include at least one additive dispenser 8 which is or are arranged to dispense the at least one additive into at least one of the water and the gas. As shown, one or more additive dispensers 8 may be arranged to dispense additives into both the water and the gas. Where an additive dispenser is arranged to dispense an additive into the gas, the additive will be encapsulated within each bubble and so released on impact with the user's body; this effectively concentrates an airborne fragrance or other additive in a local area, enhancing its effect even in small volumes. The or each dispenser 8 may be arranged in the shower head or other emitter body, or upstream of the emitter body, and may be either upstream or (as shown) downstream of some or all of the other components of the apparatus. The dispenser 8 may include a reservoir to hold the additive or may be configured to generate the additive, for example by ionization. The dispenser may be controlled by the user, optionally via the controller 6, to selectively dispense the or a variety of additives.

The gas velocity $u_g$ may be controlled, e.g. by the controller 6, to a required value by controlling the power supply to the air pump 5. The fan curve or other operating parameters may be stored in memory in the controller 6 which can exercise control over the air pump 5 and hence the gas velocity $u_g$. The control may be open loop, e.g. by adjusting power depending on the stored fan curve, or closed loop, e.g. by adjusting power responsive to input from a sensor (not shown) that senses gas pressure or flow rate. The target value for the gas velocity may be determined by the controller based on stored (e.g. mapped) water and gas velocity parameter values and/or sensor input and/or user control input via user controls 7.

The fan or blower 5 may be an inexpensive model operating at relatively low pressure. The gas supply means 2 may further include a heater for heating the air or other gas, a filter, UV sterilization and/or any other means for controlling gas flow parameters as known in the art.

The water supply means 3 may include any arrangement for receiving water 40 from a water supply and conducting it to the water outlet 13 of each flow emitter 11 or to the main water inlet 20 of the emitter body 10 (best seen in FIG. 10*c*) from which the water 40 is distributed to the water outlets 13 of the individual flow emitters 11. In a very simple form, the water supply means 3 may include merely a connector for connecting a flowpath of the emitter body 10 to a water supply at suitable pressure. The water supply means 3 may further one or more control or sensing elements 4, e.g. a water supply control valve, e.g. a solenoid actuated valve or motorised valve, a mixer valve, a heater and/or a thermostatic valve or other water temperature control arrangement, a water pump, and/or water flow rate or pressure sensors, and/or any other means for producing or regulating or monitoring the flow of water.

Water velocity $u_w$ depends on the water volume flow rate, which in turn depends on the water supply pressure. In order to obtain a known water velocity, the water supply means 3 may include a pressure or flow regulator 4 which is arranged to provide a fixed volume flow rate over a large range of variation in the upstream water supply pressure. The flow regulator may be adjustable or interchangeable to define a maximum water consumption of the apparatus.

The flow regulator 4 may be a simple, passive device as known in the art. Alternatively or additionally, the water supply means 3 may include an active water flow regulator 4, as known in the art, to maintain a constant water volume flow rate to the or all of the flow emitters in the emitter body, e.g. based on feedback from a flow sensor. Such active flow regulator may be adjustable by the controller 6.

Referring to FIGS. 2 and 3, the or each flow emitter 11 defines an emitter axis X and includes a gas outlet 12, and an annular water outlet 13 which surrounds the gas outlet 12. The emitter axis X extends centrally through the gas outlet 12. The water outlet 13 and gas outlet 12 may lie in a common outlet plane P.

The water outlet 13 may be circular as shown and has a radially outer diameter $d_w$ and inner diameter $d_o$. Conveniently, the gas outlet 12 may also be circular with a diameter $d_i$, so that the water outlet 13 is separated from the gas outlet 12 by a cylindrical wall 14 with a thickness t wherein $t=(d_o-d_i)/2$. Thus, the water outlet and air outlet are coaxial on the emitter axis X.

In alternative embodiments the water outlet 13 may be non-circular, in which case its outer diameter $d_w$ is defined as the diameter of a circle of equal section area—which is to say, equal in area to the section area of the water outlet, when considered in the plane P of the water outlet normal to the emitter axis X.

A non-circular water outlet may have straight sides defined by a polygon, e.g. a regular polygon, the straight sides preferably being connected together by curved portions to ensure that the bubble wall remains intact. The polygon could be a tessellating polygon such as a square, a hexagon, or an equilateral triangle, or could be for example an octagon, enabling multiple flow emitters to be tessellated in a regular pattern over the outlet side of the emitter body. The gas outlet may have a shape corresponding to that of the water outlet.

The radial width h of the water outlet is defined as the radial distance between its inner and outer walls, so $h=(d_w-d_o)/2$.

If the radial width dimension h, hence the thickness of the annular sheet of water, varies substantially around the emitter axis X then the bubble may burst; thus, for reliable performance, it is desirable for the radially outer and inner walls of the annular water outlet 13 to be as nearly concentric as possible within manufacturing tolerances. Preferably, the radial dimension h should not vary by more than about 10% (+1-5%) around the emitter axis X of the annular water outlet 13.

For ease of illustration, FIGS. 2 and 3 show a relatively large value of h. The radial width h of the water outlet 13 (which may also be the radial width h of the annular water flowpath 16) may be much smaller relative to the diameter of the air outlet 12 than shown in FIGS. 2 and 3, and may be, for example, as little as 1.0 mm or even 0.5 mm, as illustrated by the further examples of FIGS. 4 and 5 respectively. In order to avoid adverse effects of limescale and to provide more generous tolerances, it may be preferred to select a value of h of at least 0.5 mm. Where manufacturing tolerances are small, values of h below 0.5 mm are possible, for example, down to 0.4 mm or 0.3 mm or even less.

The water supply means is arranged for connection to a supply of water 40 having a surface tension $\sigma_w$ to supply the water 40 to flow at a velocity $u_w$ from the or each water outlet 13 as an annular sheet of water surrounding the gas 50 flowing from the gas outlet 12.

The rotational speed of the fan or blower 5 may be controlled by the controller 6 responsive to variations in water flow rate, to maintain a predefined ratio of gas pressure or volume flow rate to water pressure or volume flow rate at the selected point in the parameter space, which may be adjusted by the user or by the controller responsive to user control input, e.g. to select the desired frequency f at which bubbles are produced. This can compensate for fluctuations in water supply pressure due to varying demand from the different outlets in a typical water supply system.

The user may control one parameter, or two or more parameters via user controls 7, while the remaining parameters are controlled automatically based on the user selected parameter value. For example, the user could adjust the water flow rate, with the gas flow rate or power supply to the fan or blower 5 being adjusted automatically or simultaneously by the controller 6 to correspond to the selected water volume flow rate.

By way of example, in one control arrangement, an air pump 5 may be switched on responsive to detecting water flow at a water flow sensor 4', with a valve operable by the user (either manually or electrically) to start and stop the water flow. The power to the air pump 5 may be regulated by a control which is adjustable by the user to a selected value, either manually or via the controller 6. The selected value may be mapped to the selected or detected water flow rate so as to define a ratio of water flow to air flow, thus determining bubble frequency f as further discussed below. The selected value may persist after terminating operation of the apparatus, so that the next time the apparatus is started the air pump operates at the same setting relative to the water flow rate. This could be achieved by making the control a mechanically and manually adjustable element, e.g. a potentiometer, which remains in the selected position, or by arranging for the selected value to be stored in the memory of the controller 6 or user control 7.

In this or other ways, the user could control the gas flow to water flow ratio within a predefined range, e.g. by selecting a desired operating state via user controls 7, to adjust the frequency at which bubbles are produced to suit individual user preference. Where a plurality of flow emitters are provided, they may be divided into different groups, and more sophisticated controls may allow the user to select different combinations of flow parameters for different groups. The user controls may also allow the user to adjust the flow parameters to operate alternatively outside the bubble regime, for example, in the "Christmas tree" or cellular breakup regime parameter space B (FIG. 6). By way of example, FIG. 20 shows a single flow emitter in accordance with an embodiment of the invention, operating in the Christmas tree regime.

The user controls may allow the user to adjust the temperature of the gas or water or, for example, to select air (perhaps at an increased flow rate) without water for drying off after a shower. An airflow diverter valve could be provided to divert airflow to a separate outlet for this purpose, or the airflow could be provided via the air outlets 12.

For ease of reference, key dimensional and fluid parameters are set out in Table 1 below, including nominal values which may be used for the purpose of calculation.

TABLE 1

| Symbol | Parameter | Nominal value | Units |
|---|---|---|---|
| $\rho_g$ | Density of gas | 1.225 (for air) | $kgm^{-3}$ |
| $\rho_w$ | Density of water | 997 | $kgm^{-3}$ |
| $\sigma_w$ | Surface tension of water at 37° C. | 0.0701 | $Nm^{-1}$ |
| $\mu_w$ | Dynamic viscosity of water at 37° C. | $6.92 \times 10^{-4}$ | $kgm^{-1}s^{-1}$ |
| $u_g$ | Velocity of gas flow | | $ms^{-1}$ |
| $u_w$ | Velocity of water flow | | $ms^{-1}$ |
| $d_w$ | Outer diameter of water outlet | | m |
| h | Radial width of water outlet | | m |
| L | Axial length of annular water flowpath | | m |

The aerodynamic or gaseous Weber number $We_g$ is based on the relative velocity between the gas and water flows and represents the ratio between the inertial or momentum forces of the gas and the surface tension force of the water at the water/gas interface. At higher aerodynamic Weber numbers inertial forces dominate and the system becomes more unstable.

The liquid Reynolds number $Re_w$ represents the ratio between inertial or momentum forces and viscous fluid forces within the annular water sheet, and is a measure of turbulence.

The surface tension $\sigma_w$ and dynamic viscosity $\mu_w$ of the water are defined at a standard temperature of 37° C., although of course the water temperature may vary, e.g. responsive to a user operated mixer valve or other temperature control.

Annular Flowpath Length

For reliable operation the water should exhibit a smooth, laminar flow at the water outlet. This may be achieved by providing an annular flowpath which opens at the water outlet. Thus, in such arrangements, the or each flow emitter 11 includes a respective, annular water flowpath 16 carrying the flow of water to the respective water outlet 13.

The annular flowpath 16 may be coaxial with the emitter axis X, and the cross-section of the annular flowpath 16 may define the cross-section of the water outlet 13 in the plane P of the water outlet normal to the emitter axis X. Thus, where the water outlet 13 is circular, the annular flowpath 16 is preferably cylindrical with radially inner and outer walls defined as surfaces of rotation about the emitter axis X.

The annular flowpath defines a region of length L (FIG. 2) having a constant cross-section in the flow direction (which preferably is the direction of the emitter axis X towards the water outlet).

The minimum length L of an annular flowpath required to achieve a fully developed laminar flow may be determined by a conventional formula as well known in the art:

$$L = 0.05 \cdot \mathrm{Re}_w \cdot h$$

wherein $\mathrm{Re}_w$ is the liquid Reynolds number defined as $$\mathrm{Re}_w = (\rho_w \cdot u_w \cdot h) / \mu_w$$

The minimum value $u_{w\,(min)}$ for water velocity $u_w$ may be calculated as $$u_{w\,(min)} = \sqrt{(2 \cdot \sigma_w)/(\rho_w \cdot h)}$$

For a flow emitter with dimensions di=4.0 mm, do=6.0 mm, dw=7.5 mm, this gives a value $$u_{w(min)} = 0.44\mathrm{ms}^{-1}$$

For operation at $u_w = u_{w\,(min)}$ this yields a value L=14 mm for the expected minimum length L of the annular flowpath.

Surprisingly however it has been found that for these dimensional values, which are provided by way of example, bubbles can be produced reliably at a value of L=7.5 mm, much smaller than the expected length. This allows the emitter body (whatever its dimensional values) to be packaged in a relatively slim form factor which is suitable for use as a shower head of generally conventional appearance.

Thus, when configured as a shower head, each water outlet may be supplied with water via a respective annular flowpath having a length L and a constant cross-section along its length L, wherein the length L may be less than 0.75 or even less than 0.6 or even less than 0.5 of the expected minimum length L when calculated as defined above.

Parameter Space

In accordance with the invention an aerodynamic Weber number is defined as $$We_g = \left(\rho_g \cdot (u_g - u_w)^2 \cdot h\right) / \sigma_w$$

The novel apparatus is arranged to operate within a parameter space defined by $h/d_w$ and $We_g$, wherein $$(h/d_w) \leq 0.31 \text{ and}$$

$$\left(2.5 \cdot 10^{-3}\right) < We_g \leq We_{g(max)}$$

wherein $We_{g(max)}$ is defined by a function $$\left(h/d_w = 0.04 \cdot We_g^{0.5}\right)$$

Referring now to FIG. 6, the defined parameter space includes the regions A and A (T-II). When the apparatus is configured and operated within this parameter space, the gas flowing from the gas outlet is encapsulated in a series of bubbles formed by the water 40 flowing from the water outlet.

FIG. 6 maps the parameter spaced characterised by $We_g$ and $h/d_w$, which is divided into three breakup regimes as identified in Zhao et al (referred to herein as Zhao):

H. Zhao, J. L. Xu, J. H. Wu, W. F. Li and H. F. Lui, "Breakup morphology of annular liquid sheet with an inner round air stream," Chemical Engineering Science 137, pp. 412-422, 2015.

Regions A and A (T-II) form a part of the larger parameter space to the left of the curve defining $We_{g(max)}$. This larger parameter space is identified in Zhao as the "shell" or "bubble" breakup regime within which a coaxial nozzle may be expected to produce liquid breakup in the form of bubbles or shells of liquid encapsulating the gas flowing from the centre of the nozzle.

When operated to the right of the $We_{g(max)}$ curve, the liquid can be expected to break up with a characteristic "cellular" or "Christmas tree" pattern (region B) as shown in FIG. 20, or, at higher values of $h/d_w$, with a "fibre" pattern (region C), as described by Zhao.

When operated in the defined parameter space of regions A and A (T-II), the water supplied to the flow emitter is divided into individual, gas filled macro-bubbles, substantially increasing its total external surface area compared with that obtained by dividing the water into droplets, to distribute a limited volume of water more effectively over a larger area of the user's body. As shown in FIG. 11 and further discussed below, the large, macro-bubbles of pure water may be produced to travel separately through the ambient air in parallel streams with negligible stream divergence, producing a more voluminous appearance and an improved tactile sensation compared with a conventional shower of droplets or prior art "foaming" showers that produce an aerated, continuous liquid phase.

The macro-bubbles produced by embodiments of the novel apparatus may be distinguished by their relatively large size, which may be for example greater than 5 mm in diameter, or greater than 10 mm in diameter, or greater than 15 mm in diameter, up to 50 mm or even 100 mm or more in diameter.

By way of example, in the test presented in Table 2, bubbles with a diameter of 20 mm were produced at a water flow rate of 0.39 l/m (litres per minute) and a frequency of 52 bps, equating to 0.0001251 per bubble. Thus, a volume of 11 of water will produce 8000 bubbles with a combined cross-sectional area of 2.48 $m^2$, whereas the same volume of water divided into conventional droplets of 1.5 mm diameter would produce a total cross-sectional area of 1 $m^2$. The appearance of the bubble shells is enhanced by refraction of light and may be further enhanced by lighting integrated into the shower apparatus.

The large, individual bubbles are suspended in free (ambient) air as they travel towards the point of impact with the user's body surface, and present a voluminous appearance as light is refracted through the transparent shell, as shown in FIG. 11 where parallel streams of separate bubbles flow from a plurality of flow emitters.

The novel shower head may be configured with relatively few, large outlets to produce bubbles of very large diameter, for example, up to about 100 mm or more in diameter. Very large bubbles are visually appealing. However, more numerous, smaller bubbles emitted from a larger number of outlets are found to produce an equally satisfactory, voluminous appearance, and an improved tactile sensation.

A larger number of smaller bubbles, emitted from a larger number of outlets, may distribute the water more evenly over the body surface. Moreover, it has been found that a distinct sensation is produced when a bubble bursts against the user's skin, which may be optimised by a relatively larger number of outlets producing relatively smaller bubbles, for example, in a range of bubble diameter from about 5 mm to about 50 mm, e.g. from about 10 mm to about 40 mm, e.g. from about 15 mm to about 30 mm.

In tests it has been found that this sensation will vary with frequency, as further discussed below.

The Type II Breakup Regime

Although water and air are commonly used for experimental work in characterising the breakup regimes obtained from a coaxial nozzle, in practical applications where bubbles of water are required they will usually be produced by means of surfactants. Coaxial nozzles are used in practical applications with other fluids to encapsulate one fluid within another; however, a coaxial nozzle carrying a flow of water and air is typically used to produce droplets rather than bubbles.

One particular difficulty in producing bubbles of pure water (i.e. water without surfactants) for use in bathing or washing the body is that bubbles of pure water tend to be unstable and so will burst at a relatively short distance from the nozzle. The burst produces a spray of fine droplets which does not deliver a satisfactory sensation on impact with the user's skin, nor the desired, voluminous appearance if only a small volume of water is used.

The "shell" or "bubble" type breakup regime obtained within the parameter space to the left of the $We_{g(max)}$ curve in FIG. 6 was further characterised by Vu et al, referred to herein as Vu:

T. V. Vu, H. Takamura, J. C. Wells and T. Minemoto, "Breakup modes of a laminar hollow water jet," J Vis, vol. 14, pp. 307-309, 2011.

Vu identified three breakup regimes within the broader, "shell" or "bubble" type breakup regime, identified respectively as Types I, II and III. In tests it is found that embodiments of the novel apparatus can produce bubbles in any of the Types I, II and III flow regimes, as shown respectively in the photographs of FIG. 7*a* (showing operation in the Type I or T-I regime), FIG. 7*b* (Type II or T-II) and FIG. 7*c* (Type III or T-III). The flow emitter dimensions and flow parameters used in the tests were as shown in the figures.

The Type I regime is characterised by relatively small bubbles connected together by a relatively large, continuous ligature, while in the Type III regime the water is substantially entirely formed into bubbles, but the bubbles are produced in connected groups.

The Type II regime is characterised by individual bubbles which are separated in space, which is to say, the individual bubbles are produced and travel separately in a disconnected series in ambient air.

In order to avoid operation in the less preferred, Type I (T-I) breakup regime, preferably $u_g \geq u_w$.

However, it is preferred to configure and operate the apparatus within the Type II (T-II) regime, to ensure that all or substantially all of the available water is converted into bubbles.

This can be achieved by further defining the parameter space such that $$u_g > u_w \text{ and}$$

$$(We_{g(min)} \leq We_g),$$

wherein $We_{g(min)}$ is defined by a function $$(h/d_w) = \left(0.02 \cdot (35 \cdot We_g)^{0.5} + 0.11\right).$$

The parameter space defining the preferred, Type II (T-II) breakup regime is indicated in FIG. 6 as region A (T-II) and delimited between the two curves represented the functions $We_{g(min)}$ and $We_{g(max)}$, respectively.

The Type II-B Sub-Regime

Referring now to FIGS. 8*a*-8*d*, further tests were carried out on an experimental flow emitter in accordance with an embodiment of the invention operating within the preferred, Type II breakup regime, with results as shown.

The tests show that the Type II breakup regime may be divided into three distinct sub-regimes, referred to herein as the Type II-A (T-II-A) sub-regime (FIGS. 8*a* and 8*b*), the Type II-B (T-II-B) sub-regime (shown in FIG. 8*c*), and the Type II-C sub-regime (shown in FIG. 8*d*).

It is known that under certain flow conditions a series stream of bubbles produced from a coaxial nozzle may be connected together by ligatures, as shown in Zhao. When the ligatures are broken, they may form small droplets which are located in-between the separate bubbles of the stream.

The Type II-A sub-regime (FIGS. 8*a*, 8*b*) represents a transition between the Type I and Type II bubble regimes, and is characterised by the presence of these small, intervening droplets.

In the Type II-B sub-regime (FIG. 8*c*) these intervening droplets are substantially absent, and substantially all of the water is produced as a stream of individual, separate bubbles.

The Type II-C sub-regime (FIG. 8*d*) represents a transition between the Type II and Type III regimes and is characterised by the production of bubbles in connected pairs or short groups, with intervening, individual bubbles and intervening droplets.

The intervening droplets in the Type II-A and Type II-C sub-regimes represent only a small proportion of the water, and in the Type II-A sub-regime are barely visible in the stream of bubbles, so that the appearance of the flow is substantially identical.

However, the tests using high speed photography showed that these small, intervening droplets tend to move at a higher velocity than the adjacent bubbles, possibly due to their relatively greater density. This can be seen by comparing the position of the intervening droplets relative to their respective, leading bubbles along the length of the stream of bubbles in the Type II-A sub-regime as shown in FIGS. 8*a* and 8*b*.

It is observed that when the bubbles are required to travel a substantial distance to the target surface, such as when the emitter body is configured as a shower head for showering the user's whole body, these intervening droplets can catch up and collide with the bubble immediately in front of the droplet in the moving stream, causing the leading bubble to disintegrate. This phenomenon can be seen at the bottom of FIG. 8*b* which captures the moment at which the final bubble is burst by contact with the following droplet.

In comparison, the bubbles of pure water produced in the Type II-B sub-regime remain intact for a distance which can exceed 0.5 m or even 1 m, as shown in FIG. 8*c*.

In order to extend the distance over which the intact bubbles can travel before impacting on the user's body, it is therefore preferred to configure and operate the apparatus to produce bubbles in the Type II-B breakup regime, so as to avoid the production of ligatures which form intermediate droplets. That is to say, preferably the apparatus is operated to produce substantially all of the water as a stream of separate bubbles without intervening droplets. Occasional intervening droplets are acceptable as long as the large majority of the bubbles are not produced with intervening droplets.

Operation in the Type II-B regime is particularly preferred when the emitter body is configured as a shower head including a plurality of said flow emitters arranged as a spaced array on an outlet side of the emitter body, to produce streams of bubbles in which the user may bathe their whole body, and so requires the bubbles to remain intact for an extended distance of travel.

It is found that only a small adjustment to the relative velocity of the water and air is required in order to adjust the operation of the apparatus between the Types II-A, II-B and II-C sub-regimes, and this can be accomplished for example by adjusting either air or water velocity without changing any other parameters. Thus, for example, when the apparatus is configured to operate in the preferred, Type II regime, the more preferred Type II-B regime can be obtained simply by adjusting the power to the air pump without adjusting the water flow rate, or by adjusting the water flow rate without adjusting the air pump.

In order to obtain Type II-B operation, if the apparatus is found to be operating in the Type II-A regime then the Weber number is increased, while if it is operating in the Type II-C regime, then the Weber number is decreased until Type II-B operation is observed.

Once the desired flow regime has been obtained for a prototype apparatus, the parameter settings can be saved as a permanent parameter value, for example as software settings of the controller which determine the relative values of $u_g$ and $u_w$.

Angled Emitter

FIG. 9A shows a test carried out on a single flow emitter in accordance with an embodiment of the invention, operating in the Type II breakup regime. The emitter body is configured to be mounted, as shown, in a use position wherein the emitter axis X is inclined at an angle of at least 20° from vertical. In the example shown, the emitter axis X is close to horizontal.

Surprisingly it is found that a stream of bubbles are produced reliably at this angle, and moreover, the produced bubbles remain intact for a long distance up to 0.5 m or even 1 m or more, as shown. In the photograph it can be seen that the bubbles remain intact in a continuous stream which is captured in a funnel (bottom left corner of the photograph) in which they burst to form the stream of water issuing from the bottom of the funnel.

It is observed that the bubbles produced along an inclined trajectory may remain intact for an extended distance as shown, even when the apparatus is operated in the Type II regime but outside the preferred, Type II-B sub-regime. This suggests that on a trajectory inclined by 20° or more from vertical, the difference in density between the intervening droplets and the bubbles may cause them to follow slightly different trajectories, which prevents the droplets from impacting and bursting their leading bubbles as shown in the vertical axis configuration of FIG. 8*b*.

Thus, when the apparatus is operated in the Type II regime, a flow emitter inclination of 20° or more may represent an alternative to tuning the apparatus to the preferred, Type II-B sub-regime as a way to obtain an extended distance of travel of the intact bubbles.

In one approach using an inclined emitter axis, the apparatus may be tuned to operate at a point somewhere within the Type II-A and Type II-B sub-regime parameter space.

An inclined emitter axis may be particularly convenient when it is desired to position the emitter body for use in an otherwise conventional shower enclosure, which may require the bubbles to travel for an extended distance to the user's target body surface.

Thus, in such axially inclined configurations, the emitter body may be configured for example as a shower head including a plurality of flow emitters arranged in a spaced array on an outlet side of the emitter body, to produce streams of bubbles in which the user may shower (i.e. bathe) their whole body. In such arrangements, the emitter body is preferably configured so that all of the emitter axes X are inclined at an angle $\alpha$ of 20° or more relative to vertical, as shown in the example of FIGS. 10*a* and 10*b*. This can be achieved by making all the emitter axes X parallel.

Flow Emitter Spacing

In order to distribute the water more evenly over the wetted body surface, and in order to optimise the sensory experience produced by the bursting bubbles, the shower head may include a plurality of flow emitters which may be arranged as a spaced array on the outlet side of the shower head. The flow emitter axes X may be equally spaced apart.

By way of example, an emitter body configured as a shower head for showering the whole body may include six or more flow emitters, up to twelve or more, or even eighteen or more flow emitters. An emitter body configured as a tap could include only one flow emitter or a smaller number of flow emitters, for example, up to three flow emitters, or up to five flow emitters, although more could be provided if desired.

The diameter of a bubble produced from a flow emitter of any given water outer diameter $d_w$ will be proportional to the frequency at which bubbles are produced from the flow emitter, which varies with the velocity $u_g$ of the gas flow, as discussed in Kendall:

J. M. Kendall, "Experiments on annular liquid jet stability and on the formation of liquid shells," Physics of fluids, vol. 29, no. 2086, 1986.

Thus, for any given water outlet diameter $d_w$, the gas velocity $u_g$ may be adjusted to obtain the desired frequency and bubble diameter.

The maximum bubble diameter is produced at minimum gas velocity $u_g$, which is to say, at the lower end of the Weber number range as shown in the parameter space map of FIG. 6.

The maximum obtainable bubble diameter is determined by the water outlet diameter $d_w$ and the gas and water velocity $u_g$, $u_w$. In tests, the maximum bubble diameter in the preferred Type II-B operating regime is found to be approximately $2.8 \cdot d_w$.

In tests, it has been observed that when the emitter body includes a spaced array of flow emitters, consecutive bubbles in a train of bubbles produced from each flow emitter will tend to move or oscillate around the emitter axis, so that the centre point of each bubble may be offset radially from the emitter axis by a radial distance $r_o$. While the direction of this radial offset varies from bubble to bubble, it is found in tests that when operating in the preferred Type II-B operating regime, the maximum value of the radial offset $r_{o(max)}$ tends not to exceed half of the maximum bubble diameter, which is to say, $r_{o(max)} \leq 1.4 \cdot d_w$.

The emitter axes X of the plurality of emitters 11 of the emitter body 10 may therefore be spaced apart by at least a minimum separation distance $S_{min}$ to ensure that the bubbles emitted from adjacent emitters in the worst-case condition do not collide and burst, wherein $$S_{min} > 5.6 \cdot d_w.$$

Although the bubbles tend to follow a constant trajectory, this minimum spacing $S_{min}$ also accommodates any relative off-axis movement that may occur between the trains of bubbles as they travel from the emitter body to the user's body surface, ensuring that the bubbles remain separate up until the point of impact.

For a more compact spacing which maintains separation based on a worst-case position on one bubble and a neutral, on-axis position for an adjacent bubble (which may prevent a majority of potential conflict events), the value $S_{min}$ can be reduced to $$S_{min} > 4.2 \cdot d_w.$$

Flow Resistors

The emitter body 10 may include more than one group of flow emitters 11, wherein the emitters of one group may have different dimensions and be supplied with air and water at relatively different velocities compared with those of another group. Alternatively, all of the flow emitters 11 of the emitter body 10 may be identical.

For reliable operation it is further preferred that the air and water velocity are as nearly equal as possible between different ones of the flow emitters 11, or of a group of identical flow emitters 11.

The novel apparatus may be configured to produce bubbles of pure water, which is to say, of water without surfactant. This is reflected by the tabulated values of the operating parameters, notably the value of surface tension which for pure water is much higher than it would be for a solution of surfactant. For this reason the novel apparatus operates in a parameter space defined, inter alia by a relatively low Weber number and hence a relatively small differential velocity between the gas flow and water flow, and for reliable operation it is preferred for the gas and water to flow smoothly and continuously at relatively low pressure and with minimal turbulence.

The gas supply means may include an air pump 5 which supplies the air under a small positive pressure; the air velocity can then be equalised by means of a plenum chamber 31 (FIG. 10*c*) from which the air is distributed to each gas outlet 12 at equal velocity and flow rate, controlled by the small pressure drop from the plenum chamber 31 to each gas outlet 12.

The low pressure water supply minimises turbulence so as to ensure a smooth, continuous and laminar flow of water to each water outlet.

Where a plurality of flow emitters 11 are spaced apart over the outlet side 15 of the emitter body 10, the outlet side 15 may be approximately flat so as to produce a broad flow in which the user can bathe a substantial area of their body. The outlet side 15 may then be arranged in a horizontal plane so that each emitter axis X extends vertically downwardly, with the bubbles being emitted in vertical streams as shown in FIG. 11.

However, if the emitter body 10 having this configuration is tilted (FIG. 10*a*) so that the emitter axes X are inclined away from vertical, the spacing between the emitters 11 will result in a difference, between different ones of the emitters 11, in the vertical height from the emitter 11 to the main water inlet 20 to the emitter body, from which the water 40 is distributed to each of the flow emitters 11. When the apparatus is operated at low water pressure, this height difference can result in a significant difference in water pressure between different ones of the flow emitters 11, which in turn moves different ones of the emitters 11 away from their target operating parameter range.

In order to overcome this problem, where a plurality of flow emitters 11 are provided, the apparatus may include a plurality of flow resistors 60. The water supply means is then arranged to distribute the water 40 between the flow resistors 60. Each flow resistor 60 is arranged to supply a flow of water to the water outlet 13 of a different respective one of the flow emitters 11. Each flow resistor 60 is arranged to develop a pressure drop in the flow of water 40 along the flow resistor 60.

The flow resistance may be selected to ensure that the additional effect of axis inclination on water pressure and flow rate is relatively small, thus ensuring that each water outlet 13 receives water at substantially the same pressure.

As explained above, this may particularly assist in providing reliable operation when the emitter body is configured to be mounted in a use position wherein each emitter axis X is inclined at an angle of 20° or more from vertical, e.g. as a shower head.

As shown in the example of FIG. 10*c*, each flow emitter 11 may include an annular water flowpath 16 carrying the flow of water 40 from a respective one of the flow resistors 60 to the respective water outlet 13. In such arrangements, the pressure drop along each flow resistor 60 may be selected to be greater than a pressure drop in the flow of water 40 along the respective annular water flowpath 16 from the flow resistor 60 to the respective water outlet 13.

As further exemplified by the embodiment of FIG. 10*c*, the flow of water 40 may be axisymmetric from each flow resistor 60 to the respective annular water flowpath 16. This ensures that the water flows evenly and smoothly to the water outlet 13.

As illustrated in FIG. 10*c*, each flow resistor 60 may includes a body 61 of porous material, e.g. a block of sintered particles or granular or fibrous material. As shown, the body of porous material may be annular and may have cylindrical inner and outer surfaces, and may be arranged to surround an annular inlet of the annular flowpath 16. Water flows radially inwardly all around the body 61 into its cylindrical outer surface and exits into the inlet to the annular flowpath 16 via its cylindrical inner surface.

In this and other embodiments, the apparatus may be arranged to reduce the formation of limescale in order to prevent deposits from changing the flow section area of the water pathways. For example, the apparatus may include a magnetic or electromagnetic limescale prevention arrangement as known in the art, which may be selectively energised by the controller 6, or may be arranged for easy disassembly and cleaning. A cleaning tool (not shown) may also be provided, for example, comprising a cleaning head that fits simultaneously, slidingly and rotatably into both the air and water outlets of each flow emitter. Alternatively, parts of the flow emitter, e.g. the annular walls defining the water and air outlets, may be formed from elastomeric materials which can flex to remove limescale deposits.

Instead of a porous body, each flow resistor might alternatively be configured to divide the flow of water between a plurality of channels. The channels may be arranged radially and may branch along their length, as shown in the examples of FIG. 12 where the channels exhibit changes in flow direction in a two dimensional plane.

FIG. 13 shows an alternative arrangement where a serrated disc can be mated with another, corresponding disc (not shown) to define channels which exhibit changes in flow direction in the axial dimension, out of the plane of the drawing.

FIG. 14 shows an internal water flow distributor plate for an emitter body, comprising an array of flow resistors similar to those of FIG. 12.

Figure 14A:
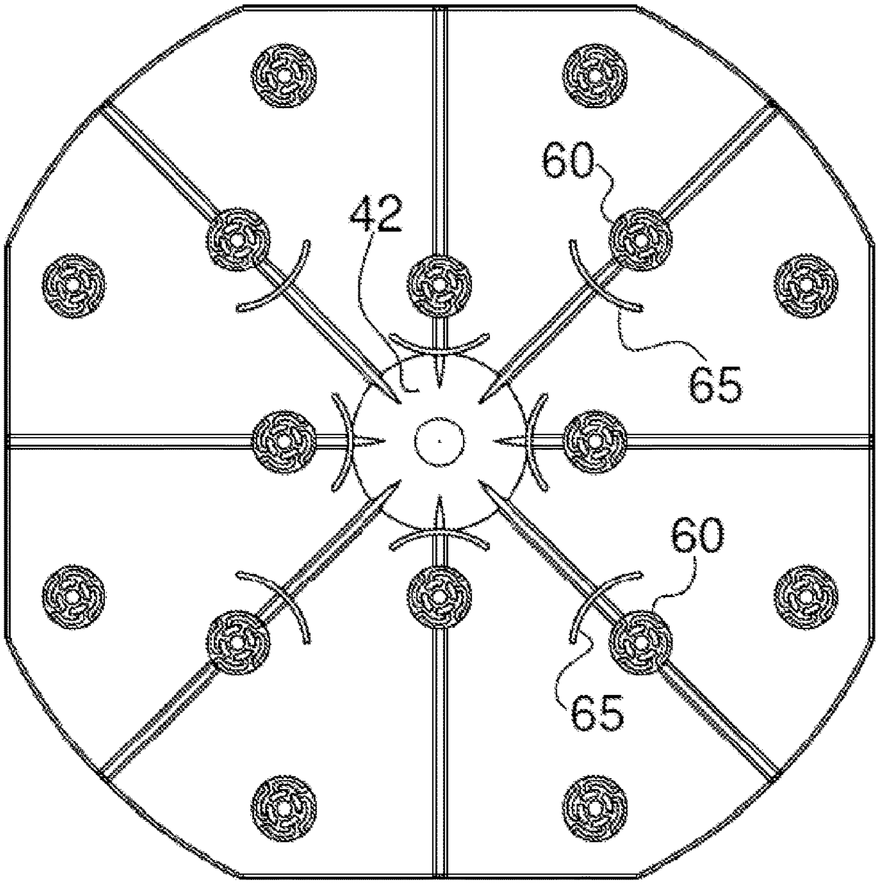

FIG. 14A shows another internal water flow distributor plate with an array of flow resistors 60 and including shields 65 which are arranged in the water distribution chamber to divert higher velocity flows from the water inlet 20 opposite the water deflection surface 42 (further discussed below), so as to equalise water pressure between the flow emitters.

In yet further alternative arrangements, exemplified by FIGS. 15-19, each flow resistor 60 may define a flow resistor flowpath and include a valve element 62 movable by the flow of water 40 through the flow resistor flowpath to increase or reduce a section area of the flow resistor flowpath. The valve element may be annular, and may be elastomeric, and may define an annular flow resistor flowpath which opens into the inlet of a downstream, annular flowpath 16 opening at the water outlet 13. An elastomeric valve element may be configured for example as a duckbill valve, as shown in the example of FIGS. 15 and 16. The valve may be arranged to remain closed in the absence of water pressure. This may help to reduce or prevent dripping from the emitter body when the water supply is turned off, e.g. after showering.

The elastomeric valve element may be positioned upstream of the annular flowpath, e.g. as shown, or in alternative arrangements, could be positioned at the water outlet.

FIGS. 15 and 16 show one such arrangement wherein the valve element 62 is an annular, elastomeric element and is movable by upstream pressure applied by the water flow, from the closed position of FIG. 15 to the open position of FIG. 16, to increase the section area of the annular flow resistor flowpath.

FIGS. 17 and 18 show another such arrangement wherein the valve element 62 is an annular O-ring and is movable by upstream pressure applied by the water flow, from the open position of FIG. 17 to the partly closed position of FIG. 18, to reduce the section area of the annular flow resistor flowpath.

FIGS. 15-18 exemplify how the water may flow radially inwardly through the flow resistor 60 towards the axis of the annular flowpath 16.

FIG. 19 exemplifies how, alternatively, the water may flow through the flow resistor 60 in the axial direction of the annular flowpath 16, and further exemplifies how the flow resistor 60 may be configured as a conventional flow control insert, e.g. an O-ring type flow regulator. The insert comprises an annular body 63, which is inserted sealingly into a recess 64 in fluid communication with the annular flowpath 16, and the O-ring or valve element 62 which is movably received in the body 63 so that the flow k controlled between the valve element 62 and the body 63. Such inserts are well known in the art and are commercially available in different flow rates, so the total flow rate of the shower head or other emitter body 10 can be adjusted by selecting appropriate inserts during assembly. Providing an individual insert for each flow emitter ensures proper tolerances between the insert components while allowing more relaxed tolerances on the larger emitter body parts or parts (e.g. mouldings).

FIG. 19 also exemplifies how the wall defining the outer diameter $d_w$ of the water outlet 13 may be defined by a nozzle 18 that extends along the emitter axis X fora short distance from the front surface 17 defining the outlet side 15 of the emitter body 10. This helps the annular water column to detach from the emitter body.

In yet further alternative arrangements (not shown) each flow resistor may be actively controlled, e.g. by the controller 6. Such flow resistors may comprise valves which are controlled hydraulically or pneumatically or by an electromagnetic or piezoelectric actuator, and may be controlled individually or as a group.

Where flow resistors are provided for each flow emitter, a main, upstream pressure or flow controller may also be provided as described above to regulate the flow of water to the emitter body.

Frequency—Breakup Length

The apparatus may include a frequency control operable by a user to vary a frequency at which the series of bubbles are produced from the flow emitter by adjusting at least one of the velocity $u_g$ of the gas and the velocity $u_w$ of the water. The frequency control may be implemented as a function of the controller 6 responsive to user control input via user controls 7.

FIG. 11 shows tests conducted on a shower head comprising an array of eighteen flow emitters and operating within the preferred Type II-B regime in accordance with an embodiment of the invention. The dimensions of each flow emitter were di=3.5 mm, do=5.5 mm, dw=7.5 mm.

The shower head has an overall diameter of 20 cm and was supplied with water at a flow rate of 7 l/m, or 0.39 l/m per flow emitter. The gas was air, and the air flow rate was 125 l/m for the test shown in photograph "a", and increased to 155 l/m for the test shown in photograph "b".

The test was repeated at different air flow rates using a single flow emitter with the same water flow rate and dimensions as those in the test shower head. The frequency and diameter of the bubbles were measured, and the results are shown in Table 2.

TABLE 2

| Air flow rate (l/m) | Corresponding air flow rate for emitter body with eighteen flow emitters (l/m) | Bubble size (cm) | Frequency (bps) |
|---|---|---|---|
| 5 | 90 | 1.9 | 42 |
| 6 | 108 | 2 | 48 |
| 7 | 126 | 2 | 52 |
| 8 | 144 | 2.1 | 57 |
| 9 | 162 | 2.1 | Most bubbles burst too soon |

It is found that for a given value of dw and uw, increasing $u_g$ will increase the frequency at which bubbles are produced. However, as can be seen from the measured values and the photographs, there is little or no increase in the diameter of the bubbles. Thus, calculations indicate that the bubble wall thickness decreases as $u_g$ increases.

These results were generally in agreement with the bubble frequency/diameter/flow rate relationships predicted in papers by Kendall and by Sevilla et al:

J. Kendall, "Experiments on annular liquid jet instability and on the formation of liquid shells", Physics of Fluids, vol. 29, no. 7, p. 2086, 1986. Available: 10.1063/1.865595

A. SEVILLA, J. GORDILLO and C. MARTÍNEZ-BAZÁN, "Bubble formation in a coflowing air-water stream", Journal of Fluid Mechanics, vol. 530, pp. 181-195, 2005. Available: 10.1017/5002211200500354x At the same time, it was observed that the distance over which the bubbles will travel before they burst also decreases. In the test of photograph "b" most of the bubbles burst within a distance of 36 cm, while in the test of photograph "a" all or most of the bubbles remained intact beyond this distance.

It is believed that the reduction in bubble wall thickness is at least partially responsible for the reduction in the breakup distance observed in the tests, although the exact mechanism is not clear.

Thus, when operating within the preferred Type 2B regime, and particularly in applications such as shower heads, in order to extend the distance over which the intact bubbles can travel, it is preferred to produce bubbles at relatively lower gas flow rate and relatively lower frequency.

Frequency—Tactile Sensation

It is further observed that the frequency at which bubbles are produced, and hence the frequency at which the intact bubbles burst on the same area of a user's body surface, has an effect on the tactile perception of the shower experience.

Table 2 presents the results of a tactile sensation test wherein a test user held their hand at a distance of 5 cm or 40 cm vertically below the air and water outlet plane of a single, downwardly pointing flow emitter producing bubbles in the preferred Type II-B breakup regime.

The 5 cm distance was selected to represent a typical distance when washing the hands beneath an emitter body configured as a tap, while the 40 cm distance represents a typical distance to the point of impact on the user's body when the emitter body is configured as a shower head for showering the whole body.

The tactile sensation was stronger at the 40 cm distance than at the 5 cm distance due to the effect of gravity on the downwardly moving bubbles.

The power input to the blower was adjusted to alter the gas velocity $u_g$ to produce bubbles at a frequency from 20 bps (bubbles per second) up to 100 bps. At a distance of 40 cm and a frequency of 20 bps the impact of each bubble was individually distinguishable, becoming a strongly defined pulse at 40 bps. At a 5 cm distance a frequency of 20 bps produced a strongly defined pulse. Increasing the frequency to 60 bps at the 40 cm distance, or 40 bps at the 5 second distance, caused the pulse sensation to change to a less strongly defined vibration. At higher frequencies the impact of individual bubbles was experienced as a smooth, continuous flow.

Based on this test, in order to optimise the tactile user experience when the emitter body is configured as a shower head, the apparatus may be operated to produce bubbles from each flow emitter at a frequency f<80 bps, preferably f<60 bps, more preferably f<40 bps. When configured as a tap, in order to optimise tactile experience, the apparatus may be operated to produce bubbles from each flow emitter at a frequency f<60 bps, preferably f<40 bps. However, since a smooth, continuous flow may be more appropriate when configured as a tap, and tactile experience may be more significant when configured as a shower head, it may be preferred to operate when configured as a shower head at a relatively lower frequency f<60 bps, preferably f<40 bps, and when configured as a tap at a relatively higher frequency f<80 bps.

TABLE 3

| Distance from outlet | 20 bps | 40 bps | 60 bps | 80 bps | 100 bps |
|---|---|---|---|---|---|
| 5 cm | Pulse | Vibration | Smooth | Smooth | Smooth |
| 40 cm | Individually distinguish-able | Pulse | Vibration | Smooth | Smooth |

Higher frequencies may be used if it is not desired to optimise tactile experience.

Moreover, the apparatus may be adjustable by the user to operate to produce bubbles outside the preferred Type II-B or the Type II breakup regime, or even to operate alternatively in the cellular breakup or Christmas tree regime (parameter space B, FIG. 6).

In tests it is found that when the apparatus is configured to optimise breakup in the preferred, Type II-B breakup regime, it is difficult to adjust the apparatus to produce cellular or Christmas tree breakup by altering only the gas velocity. Therefore, in order to obtain optimal breakup in more than one regime, the apparatus may be configured to adjust both gas and water velocity, e.g. by adjusting a valve to change the supply pressure or flow rate of the water, and simultaneously adjusting power to the air pump.

When configured for optimal performance in the preferred, Type II-B breakup regime, in order to adjust the frequency at which bubbles are produced in this regime by about +/−10 bps it is found sufficient to alter gas velocity without changing the water velocity. For larger adjustments in frequency, both gas and water velocity may be adjusted.

Where the gas is air, the air velocity can be adjusted by adjusting the power supply to the air pump. Thus, if the user wishes to alter the frequency at which bubbles are produced to change the tactile experience, the user controls may be configured to achieve this simply by increasing or reducing the power to the air pump so as to increase or reduce its speed of rotation.

When operating in the Type II regime it is found that the flow emitter will produce a pleasant, random sound reminiscent of a babbling stream, which further enhances the total sensory experience, particularly when used as a shower.

In use, it is preferred to supply water to the flow emitters 11 at a temperature of not less than 20° C.-25° C. Surprisingly it is found that bubbles form and persist more reliably when the water is at this temperature than with cold water, although the reason is not fully understood.

Applications

In embodiments, the emitter body may be configured as a shower head for use in bathing the entire human body, or as a shower head adapted for bathing specific portions of the human body. In alternative embodiments, the novel apparatus may be configured for applications other than bathing the body or parts of the body.

In one configuration, the emitter body may be held in the hand or mounted on a wall or other surface to produce a flow in which the user can bathe their entire body, optionally also to wash their hair. Preferably in such configurations the novel emitter body includes a plurality of flow emitters, although it could include only one, large flow emitter.

Further surprisingly, it is found that the novel flow emitters can project bubbles of plain water along an upward trajectory, as illustrated by the experimental example shown in FIG. 9B. This makes it possible to arrange the emitter body for example as a bidet or bidet toilet, or as an upwardly directed stream of bubbles for washing the body or face.

Thus, in another configuration, the emitter body may be configured to be held in the hand or mounted in a fixed position to wash a limited body portion, e.g. the hands, the feet, or the perineal area, e.g. as part of a bidet or a bidet toilet. In such configurations the emitter body may include a plurality of flow emitters, or only one, large flow emitter.

Thus, the emitter body may include a plurality of flow emitters 11 arranged as a spaced array on an outlet side 15 of the emitter body 10. In such arrangements, the emitter body may be configured as a shower head for bathing the whole or part of a user's body; and when so configured, the apparatus may be operable to produce the series of bubbles from the flow emitter at a frequency f<80 bps, preferably f<60 bps, more preferably f<40 bps.

Multiple emitter bodies 10, each having one or more flow emitters 11, may be arranged as a spaced array in a shower cubicle to bathe the body from different directions simultaneously.

Alternatively, the emitter body may be configured as a tap to be mounted over a basin or sink for washing a user's hands. When so configured, the apparatus may be operable to produce the series of bubbles from the flow emitter at a frequency f<80 bps or f<60 bps.

The tap could also be used in a kitchen, for example, for rinsing delicate glassware or washing vegetables.

The tap may be arranged over a basin with a waste water connection, to provide a flow particularly for washing the hands. In such a configuration the emitter body may include only one flow emitter, or may include only a small number of flow emitters, e.g. from 2-5 flow emitters.

In such a configuration the emitter body may be configured as a spout extending from a pillar or body similar to that of a conventional tap, while the user controls may be mounted on the pillar or body. The user controls 7 may include a hand operated valve which controls the flow of water, while the flow of gas is controlled by the controller 6 responsive to the sensed flow of water. Alternatively the user controls 7 may include an electrical switch which initiates the flow of water and of gas, the water flow being controlled for example by a valve, such as a solenoid operated valve, responsive to operation of the switch. In each case the user control 7 may be configured in the manner of a handwheel or lever or proximity sensor as found on a conventional tap for controlling the flow of water from the spout.

In this specification, a tap is synonymous with a faucet.

In each configuration (e.g. as a shower head or as a tap or a bidet or bidet toilet), the apparatus may be controllable alternatively to produce a flow of air without water for drying the body, hands etc. after washing in the stream of bubbles, wherein the flow of air may be heated. In each configuration (e.g. as a shower head or as a tap), the apparatus may be controllable to operate alternatively in the bubble regime or the Christmas tree regime as shown in FIG. 20. For example, the Christmas tree regime could be selected for rinsing.

In yet further arrangements, a surfactant may be introduced into the water supply to provide a different mode of operation or a cleaning cycle. Light sources may be incorporated into or proximate the emitter body. The airflow could be produced by an air pump incorporated into the emitter body. Such an air pump could be powered inductively, optionally by a battery releasably mounted proximate the pump, e.g. on or proximate the emitter body.

Apparatus Including an Emitter Body

Turning now to embodiments of the apparatus in accordance with the second aspect of the invention, the emitter body 10 may be generally as described above with reference to FIGS. 2-6 and 10*a*-10*c*. It includes a water inlet 20 (FIG. 1), a gas inlet 30, and at least one flow emitter 11. The flow emitter 11 defines an emitter axis X and includes a gas outlet 12 in fluid communication with the gas inlet 30, an annular water outlet 13 surrounding the gas outlet 12, and an annular water flowpath 16 in fluid communication with the water inlet 20 and terminating at the water outlet 13, the annular water flowpath 16 being defined between radially inner and outer walls 71, 81 coaxial with the emitter axis X, which extends centrally through the gas outlet 12. The gas inlet 30 is arranged to receive a supply of gas 50 to flow in use from the gas outlet 12. The water inlet 20 is arranged to receive a supply of water 40 to flow in use from the water outlet 13 as an annular sheet of water surrounding the gas flowing from the gas outlet, to encapsulate the gas flowing from the gas outlet in a series of bubbles formed by the water flowing from the water outlet.

The apparatus may be configured for use as a shower head or tap or in any other application as previously discussed. The apparatus may be arranged to operate in the target parameter space to produce bubbles of pure (i.e. plain) water, in accordance with the first aspect of the invention. Alternatively, it may be arranged to produce bubbles in another way, for example, from water mixed with a surfactant, as known in the art. In this case the apparatus may be arranged to operate outside the target parameter space, either to produce less well formed bubbles, or to produce well formed bubbles relying on the much lower surface tension of the water (which is to say, the mixture of water and surfactant).

The annular water flowpath 16 may be cylindrical and may have the same radial width h as the water outlet 13. In practice, it is found that the small radial width h of the annular water outlet 13 (which may be e.g. 0.75 mm or even less, as discussed above) can make it difficult to mould the flow emitter 11 in one piece, since the annular water flowpath 16 must be formed by a thin, hence fragile tubular or cylindrical portion of the mould tool. This problem can be solved by forming the or each flow emitter 11 as an assembly wherein the radially inner wall (i.e. wall surface) 71 of the annular water flowpath 16 is defined by a first part 70, and the radially outer wall (i.e. wall surface) 81 of the annular water flowpath 16 is defined by a second part 80, the first and second parts 70, 80 being assembled together. The parts may be mouldings, e.g. plastics or rubber mouldings, and/or may be made from a metal, e.g. stainless steel. Where separate and individual parts are provided as inserts, the inserts can be tailored to define a desired radial width h of the annular water flowpath 16 so as to adjust the total water flow rate of the emitter body during manufacture. For example, a low range insert can be used to provide a total water flow rate from the emitter body of around 6-8 l/m, or a high range insert for around 8-10 l/m.

As exemplified by the arrangement of FIG. 19 and further by the arrangement of FIGS. 21 and 22, the first part 70 may be tubular, e.g. cylindrical as shown, with a radially outer wall surface that defines the radially inner wall 71 of the annular water flowpath 16, and a radially inner wall surface 72 that defines the gas flowpath 12' leading to the gas outlet 12, thus defining a cylindrical wall 14 separating the annular water flowpath 16 that terminates at the water outlet 13 from the gas flowpath 12' that terminates at the gas outlet 12.

In the example of FIG. 19, the tubular insert defining the first part 70 is sealingly engaged in a hole 101 in the separator plate 100 (further discussed below) in fluid communication with the plenum chamber 31 by means of a seal 90. The seal 90 may be for example an O-ring as shown, and may be arranged in radial compression between the separator plate 100 and the insert or first part 70.

FIG. 19 also shows how the tubular first part 70 may be supported by radial spacers 82 which extend through the radial thickness h of the annular water flowpath 16 between its radially inner and outer walls 71, 81. (It will be understood that the section of FIG. 19 is taken through two diametrically opposite spacers 82, which are relatively thin in the circumferential direction, hence the water flows uninterrupted between them.) The spacers 82 may form a portion of the second part 80 as shown, or could form a portion of the first part 70. The spacers 82 locate the first part 70 coaxially with the outer wall 81, and may also be somewhat elongate in the axial direction of the annular water flowpath 16 but terminating upstream of the water outlet 13, as shown, so that their flat surfaces (not visible in the figure) suppress any rotating flow and guide the water in smooth, laminar, axial flow to the water outlet 13.

In the example of FIGS. 21 and 22, the second part 80 defines a flow resistor 60 having multiple channels through which the water 40 flows axisymmetrically radially inwardly towards the emitter axis X, from the water distribution chamber 41 (further discussed below) to the annular water flowpath 16. The first part 70 forms a tubular insert or cylindrical wall 14, functioning in a similar way to that of FIG. 19, but is threadedly and sealingly engaged in the second part as shown, with its inner end protruding to sealingly engage in a hole 101 in the separator plate in fluid communication with the plenum chamber 31. The channels 60' may be bounded on one side by the separator plate 100.

The second part 80 may be assembled to a front plate of the emitter body, e.g. front plate 120 of the emitter body 10 as illustrated in FIGS. 23-31, further discussed below, to form for example a generally flat shower head with spaced array of flow emitters. Alternatively the second part 80 may be moulded as an integral part of the front plate 120.

In further alternative arrangements (not shown), the first part may be tubular with an inner wall that surrounds a tubular portion of the second part, or of another assembly component, which defines the gas flowpath 12', thus forming a radially inner lining of the annular water flowpath 16.

In yet further alternative arrangements, the second part may be formed as a tubular insert 80' which is received in an annular recess 70' defined within a tubular housing 70" of the first part 70 or of another assembly component, thus forming a radially outer lining of the annular water flowpath 16, as exemplified by the flow emitters of the emitter body of FIGS. 23-31, best seen in the enlarged views of FIGS. 32-36. The insert 80' may have a flange that defines the end of the emitter nozzle after assembly.

In each case, the first or second part configured as a tubular insert forming the respective, inner or outer wall of the annular water flowpath 16 will occupy a portion of the radial width of the recess in the other respective, second or first part into which it is assembled. Thus, that recess can be correspondingly wider in the radial direction, and so the portion of the mould tool that forms it can be correspondingly more thick and robust.

The emitter body 10 may include a plurality of flow emitters 11 arranged as a spaced array, with the gas and water outlets of each flow emitter opening through the outlet side of the emitter body, e.g. to form a shower head as previously described. In such arrangements (not shown), each of the first and second parts may define respectively the inner or outer walls of multiple ones of the flow emitters 11.

However, moulding limitations may dictate a minimum tolerance in the distance between the respective emitter axes X in each of the relatively large parts when formed as mouldings, which tolerance may be too large to ensure adequate concentricity of the inner and outer walls 71, 81 of each water flowpath 16 when the first and second parts are assembled together.

In order to ensure proper concentricity of the inner and outer walls 71, 81 of each annular water flowpath 16, the emitter body 10 may include a plurality of separate and individual said first parts 70 or a plurality of separate and individual said second parts 80, so that the respective, radially inner or outer wall 71, 81 of each annular water flowpath 16 is formed by a different respective one of those separate and individual parts. The emitter body 10 may include a unitary part defining respective portions of all of the flow emitters 11, e.g. a unitary front plate (such as the front plate 120 of FIG. 23) which may define either the second part 80, as shown in FIG. 19 and (optionally) in FIGS. 21 and 22, or the first part 70, as shown in the example of FIGS. 23-36 and best seen in FIGS. 32-36. The multiple, individual parts can then be assembled individually into the unitary part (e.g. a unitary moulding) to form the finished assembly 10, so that the concentricity of the inner and outer walls 71, 81 of each water flowpath 16 is not dependent on the exact position of the emitter axes X defined by the larger part or moulding, relative to one another.

Assembling the emitter body 10 in this way also makes it easier to apply a sufficient clamping force to sealingly engage each separate and individual part (which may be the first or second part 70, 80) with one or more larger, unitary parts or mouldings (which may be the second or first part 80, 70, or a separator plate 100 as further discussed below), for example, by placing each individual part in radial compression in one or more seals 90 (e.g. O-ring seals) arranged between the two respective parts, so that the water and gas flowpaths are properly separated.

This can be difficult to achieve when the emitter body 10 includes relatively large parts or mouldings, each defining different parts of multiple flow emitters 11. However, when individual inserts are assembled into one larger part or moulding, the larger part will dictate the exact position of each smaller insert so that the two parts are correctly aligned and sealed. Other possible sealing arrangements are press fitting, welding and gluing.

As exemplified by FIG. 19 and FIGS. 23-36, the emitter body 10 may include a unitary, front plate 120, a rear plate 110, and a separator plate 100 which is arranged sealingly between the front plate 120 and the rear plate 110 to divide the space in-between to define a plenum chamber 31 and a water distribution chamber 41. The front plate 120 may define the front surface 17 at the outlet side 15 of the emitter body 10. The plenum chamber 31 is arranged between the rear plate 110 and the separator plate 100 and is configured to convey the supply of gas 50 from the gas inlet 30 to each of a plurality of gas flowpaths 12', each gas flowpath 12' being arranged to convey the gas 50 to the gas outlet 12 of a respective one of the flow emitters 11. The water distribution chamber 41 is arranged between the front plate 120 and the separator plate 100 and is configured to convey the supply of water 40 to the annular water flowpath 16 of each flow emitter 11.

Alternatively, either or both of the water supply and the gas supply may be conducted to the individual flow emitters via individual channels rather than via a plenum chamber or water distribution chamber.

An arrangement without a water distribution chamber may be preferred for example where the emitter body is arranged with an array of flow emitters spaced apart in a vertical or inclined plane; in such arrangements, the individual water supply channels and/or flow resistors (further discussed below) may be configured to control (e.g. equalise) the water supply pressure to each of the flow emitters.

So, for example, the emitter body may include a plenum chamber for distributing the air, and individual water distribution channels for distributing the water to the flow emitters (or to the flow resistors upstream of the flow emitters). Or, the emitter body may include individual gas distribution channels for distributing the gas to the flow emitters, and a water distribution chamber for distributing the water. Or, the emitter body may include water distribution channels for distributing the water, and gas distribution channels for distributing the gas.

It will be understood that flow resistors, where present, may also be configured with channels that define the flow resistance, which however should not be confused with the distribution channels just discussed which may be provided for supplying the fluid to the flow resistor. However, the distribution channels may also be configured to present a defined flow resistance, and so may function as flow resistors as discussed herein.

As discussed above, in order to obtain the required concentricity in each flow emitter in a spaced array, and irrespective of whether a plenum chamber or water distribution chamber is provided, the radially inner and outer walls of the annular water flowpath of each flow emitter may be defined by different, first and second parts which are assembled together, wherein the emitter body includes a plurality of separate and individual first parts or a plurality of separate and individual second parts. The radially inner wall of the annular water flowpath is defined by the first part, and the radially outer wall of the annular water flowpath is defined by the second part.

In such arrangements, each of the plurality of separate and individual said first or second parts may be formed as a respective insert, wherein the emitter body includes a unitary part defining the other respective first or second part of all of the flow emitters, and each insert is received in the unitary part.

That is to say, either:

(a) the unitary part defines the first part (the radially inner wall of the annular water flowpath) of each flow emitter, and the second part of each flow emitter is formed as a separate and individual insert that is received in the unitary part; or (b) the unitary part defines the second part (the radially outer wall of the annular water flowpath) of each flow emitter, and the first part of each flow emitter is formed as a separate and individual insert that is received in the unitary part.

Such arrangements are further discussed and illustrated in examples with plenum chambers and water distribution chambers, as will now be described.

As shown in FIG. 14 and FIGS. 26 and 27, the front plate may include a plurality of flow resistors 60, each of which defines a plurality of channels 60' (as shown for example in FIGS. 12, 13, 21 and 33). Each flow resistor 60 is configured to supply a flow of water 40, via the plurality of channels 60', to develop a pressure drop in the flow of water, from the water distribution chamber 41 to the annular water flowpath 16 of a different respective one of the flow emitters 11.

As shown in the examples of FIG. 19 and FIGS. 21 and 22 and discussed above, the radially inner wall 71 of the annular water flowpath 16 of each respective flow emitter 11 may be defined by a different respective one of a plurality of separate and individual first parts 70, while the radially outer walls 81 of the annular water flowpaths 16 of all of the flow emitters 11 are defined by a single, second part 80, the second part 80 forming the front plate 120 (FIG. 23), wherein the first and second parts 70, 80 are assembled together.

As further exemplified by FIG. 19 and FIGS. 21 and 22, each first part 70 may define the gas flowpath 12' of a respective one of the flow emitters 11, while each first part 70 is sealingly connected to the separator plate 100 with the gas flowpath 12' in fluid communication with the plenum chamber 31.

Alternatively, as shown in the example of FIGS. 32-36 and discussed above, the radially outer wall 81 of the annular water flowpath 16 of each respective flow emitter 11 may be defined by a different respective one of a plurality of separate and individual second parts 80', while the radially inner walls 71 of the annular water flowpaths 16 of all of the flow emitters 11 are defined by a single, first part or moulding 70, the first part or moulding forming the front plate 120, wherein the first and second parts 70, 80' are assembled together.

As further illustrated by the example of FIGS. 32-36, the front plate 120 may define a plurality of tubular housings 70", wherein each of the second parts 80' is received in a respective one of the tubular housings 70".

As best seen in FIGS. 28 and 29, the emitter body may include an air pump in the form of a fan 32 which is arranged to urge ambient air to flow from the gas inlet 30 to the plenum chamber 31. The fan may be arranged as shown substantially (i.e. mostly or entirely) within the plenum chamber 31 (which is to say, within the space defined between the rear plate 110 and the separator plate 100, or the major planes thereof), conveniently with the air inlet 30 opening through the rear plate 100. The fan may operate at low voltage.

Where a fan is included in the emitter body, particularly in the plenum chamber, a favourable layout is found where the plurality of flow emitters consists of exactly twelve flow emitters 11 (in which case the front plate 120 may be arranged as shown in FIG. 27) or exactly sixteen flow emitters 11 (in which case the front plate 120 may be arranged as shown in FIG. 26). This allows an axisymmetric arrangement of flow emitters about a centrally located water inlet 20.

As best seen in FIG. 28, air guide surfaces 33 may be arranged to project into the plenum chamber 31 to redirect or diffuse the airflow induced by the fan, so that the fan can be arranged relatively close to the emitters without imbalancing the flow of gas between different ones of the emitters. Alternatively or additionally, for the same reason, since each gas flowpath 12' is in fluid communication with the plenum chamber 31 via a gas flowpath inlet 12", the gas flowpath inlets 12" of different respective ones of the flow emitters 11 may have different respective transverse section areas normal to the emitter axis X, which are selected to balance air pressure between different ones of the emitters 11 opening in different locations into the plenum chamber 31.

Optionally, different flow emitters 11 in the same emitter body 10 can have different flow rates; for example, four large central flow emitters 11 can be arranged to produce larger bubbles than eight surrounding, smaller flow emitters.

Since the novel emitter body may have far fewer flow emitters than the number of nozzles in a conventional spray type shower, the regions of the front surface 17 in-between the flow emitters 11 can be used for example to provide a backlit or side lit panel or a mirror for viewing or shaving.

Referring now to FIGS. 29-31, the water inlet 20 may be configured to define a central inflow axis Xwi along which the water 40 flows along an inflow direction Dwi into the water distribution chamber 41. It is found in practice that, particularly when the water distribution chamber has a wide, shallow form factor as shown, a recirculation zone can form in the region immediately opposite this axis Xwi, which can cause a pressure drop and/or generate undesired turbulence. In order to obtain an even radial water distribution at constant pressure, the water distribution chamber 41 may include a water deflection surface 42 which is a surface of rotation about the central inflow axis Xwi, facing the inflow direction Dwi and widening radially outwardly from the central inflow axis Xwi in the inflow direction Dwi, as shown.

Particularly even flow may be achieved where the water deflection surface 42 widens further radially outwardly against the water inflow direction (in region 42') and yet further radially outwardly in the inflow direction (in region 42") to define a raised annulus 43 facing the water inflow direction Dwi, as shown in FIG. 31. A similar water deflection surface 42 can be seen in FIG. 14A.

Referring now to FIG. 1, the apparatus may include a stroboscopic light source 150 which is arranged to illuminate the bubbles produced by the at least one flow emitter 11 at a light source frequency. The light source frequency is selected or selectable based on a frequency at which the bubbles are emitted to selectively illuminate the bubbles.

The light source may comprise an array of LEDs or other light emitters, which may be integrated into the emitter body (e.g. a showerhead), or an arm or bracket or other support element which supports the showerhead, e.g. extending from a wall or ceiling. Alternatively the light emitters could be positioned inside a shower cubicle, or integrated into a surface of a shower cubicle, e.g. a panel, or into a box containing elements of the apparatus. The light source (or the controller 6 that controls the light source) could be connected to or integrated into a room lighting control circuit so that the light source and other lighting in the room or shower cubicle containing the shower can both be controlled by the same user input or controller 6. For example, the LED array could be turned on and simultaneously the room lighting could be dimmed, responsive to turning on the air and/or water supply to operate the shower or responsive to a single user command.

Optionally, the light source frequency may be selected to render an appearance of the bubbles as static or as moving up or down at a speed less than an actual speed of travel of the bubbles.

Optionally, a flow sensor 4' may be arranged to sense the flow of water 40, and to control the light source 150 frequency (e.g. in cooperation with controller 6 and/or user controls 7), and optionally also the speed of an air pump (e.g. fan or blower) that supplies the flow of gas to the gas outlet 12 of each flow emitter 11 responsive to changes in the flow rate of the water 40 to the emitter body 10, which thus corresponds to the frequency at which bubbles are emitted.

The light source 150 may comprise one or more LEDs driven by pulse width modulation (PWM), wherein the frequency and also the duty cycle (which is to say, the proportion of time during each on/off cycle for which the light source is illuminated) are controlled to selectively illuminate the bubbles. The frequency may be selected from about 60 Hz or 70 Hz up to about 200 Hz or 300 Hz, and may be a multiple of the frequency f at which the bubbles are emitted, for example, up to about 4f or 5f. The duty cycle may be relatively low, for example, about 10%. The LEDs may be incorporated into the emitter body 10.

A motion sensor (e.g. a passive infra-red sensor) may be provided in the emitter body to control or enable the operation of the light source or change the mode of operation, optionally in combination with controller 6 and/or user controls 7.

Since the shower experience is a visual as well as a tactile experience, it is desirable for the user to observe the bubbles which, although moving too fast for the eye to capture, can create a captivating effect. This can be achieved by suitably selecting the frequency of the light source 150, for example, to create a number of different effects such as bubbles that appear to be stationary or moving slowly up or down, or as a column of overlapped bubbles, providing a more voluminous appearance at a total flow rate that may be much lower than a conventional (spray type) shower.

The flow sensor 4' (or controller 6 responsive to input from flow sensor 4') may be arranged to switch on the air pump 5 or fan 32, optionally also the light source 150, responsive to sensing a flow of water 40 to the emitter body 10. Thus, the apparatus can be controlled simply by turning on a tap or valve that supplies water to the water inlet 20.

The user may control the light source 150 via user controls 7, which may include for example buttons or a digital mixer, which may be controlled for example via an app running on a cellular telephone. The user controls 7 may incorporate various digital shower systems as known in the art, providing user control over a wired or wireless connection via any suitable digital protocol. For example, WiFi or Bluetooth control may be provided so that lighting or fan preference settings can be changed, and usage data can be viewed. Integration or communication may be provided with a digitally controlled thermostatic mixer with water flow volume control. Water volume, air volume and LED lights may all be modulated simultaneously to create different modes and effects. Individual ones of the multiple flow emitters 11 may have different, individual lighting regimes, e.g. by means of different ones of a plurality of LEDs incorporated into the front surface 17 of the emitter body 10.

Referring now to FIG. 37, the apparatus may include a power connector 160 for supplying electrical energy (preferably at low voltage) from an external conductor 165 to the emitter body 10, e.g. to the air pump 5 or fan 32 and/or LED or other light source 150 incorporated in the emitter body 10. The electrical energy may provide power and/or control signals. The power connector includes first and second connector bodies 161, 162 having cooperating contacts 163 for transmitting the electrical energy, at least one magnet (which may be integral with contacts 163) for releasably holding together the first and second connector bodies 161, 162, and at least one seal 164 configured to exclude water from the contacts 163 when the first and second connector bodies are held together by the at least one magnet.

FIG. 38 illustrates how the power connector 160 can be arranged to transfer power across (i.e. alongside) a ball joint 170 or other conventional connector between the emitter body 10 (configured for example as a shower head) and a supporting bracket or arm 171, to obviate the possibility of damage occurring, and to provide easy reconnection, if the shower head or other emitter body is disconnected from the water supply. Thus, the assembly may comprise a releasable water supply connector 170, e.g. a releasable ball joint, and the releasable power connector 160 which are arranged to supply water and electricity in parallel flow relation between a support element 171 and the shower head or other emitter body 10. In this example the power connector is illustrated with coaxial contacts 163.

Referring to FIG. 1, the apparatus may include a turbine 130 driven by the flow of water 40, and an air pump 5 driven by the turbine, the air pump 5 being arranged to supply a flow of gas 50 to the gas outlet 12 of each flow emitter 11. The turbine and air pump (e.g. fan 32) may be incorporated into the emitter body 10.

Alternatively or additionally, the apparatus may include a turbine 130 driven by the flow of water 40, and an electrical generator 140 driven by the turbine 130. Again, the turbine 130 and generator 140 may be incorporated into the emitter body 10. The generator 140 may supply power to the air pump 5 or fan 32, and/or to the light source 150. Optionally, the generator 140 may be arranged to power the air pump 5 or fan 32 with a separate battery being provided to power the light source 150.

The apparatus may be configured for applications as previously discussed.

In each of its embodiments, the emitter body when configured as a shower head may be mounted for example on a wall arm or ceiling arm with a thermostatic mixer concealed in the wall, or on a wall arm extending from an exposed or surface mounted thermostatic mixer.

Multiple emitter bodies, each having one or more flow emitters 11, may also be installed in a single shower cubicle or the like to provide emit bubbles in different directions.

The apparatus may include an electrical heating element for heating the water as it flows to the or each flow emitter; in such embodiments, the emitter body may be configured as a shower head, so that the apparatus forms an electric shower, or as a tap, so that the apparatus forms an instant or on-demand water heater.

For example, the emitter body may be configured as an electrically heated instant hot water bubble tap, i.e. a tap with an integral demand type electric heater responsive to water flow, for washing the hands or face over a basin. Such a tap may consume water at around 1 l/m compared with a minimum flow rate of around 3 l/m for a conventional aerated tap, which ceteris paribus allows faster heating of the water before it flows to the flow emitter, providing a better washing experience compared with conventional, so-called "instant" electric taps that actually are slow to heat.

Referring to FIG. 39, the apparatus may include a fill mode control 180 which is operable to connect the supply of water 40 to the gas outlet 12 so that the water 40 is emitted simultaneously from the water outlet 13 and the gas outlet 12.

The fill mode control 180 may be operable also to interrupt the supply of gas 50 to the gas outlet 12. The fill mode control 180 may include a valve, which may be operable to connect the gas outlet 12 to a selected one of the water supply and the gas supply, while simultaneously disconnecting it from the other supply. FIG. 39 illustrates schematically one such arrangement by way of example. The valve may be arranged at a higher position than the flow emitter and configured to prevent water from flowing back into the fan.

Alternatively or additionally, the fill mode control may be operable also to initiate the water supply to the water outlet 13 and the gas outlet 12 without initiating the gas supply to the gas outlet 12.

Thus, the fill mode control might be used when the flow emitter is not in use to initiate water flow from both outlets 12, 13. Or, it could be used to interrupt the normal function of the flow emitter so as to fill a vessel from the flow emitter, which may then resume normal operation.

As shown in the illustrated example, the emitter body 10 may be configured as a tap which discharges into a sink or basin 182, so that the fill mode control can be used when it is desired to fill a vessel with water. The emitter body might be configured for other applications, for example, as a hand held emitter on a hose, for use in washing part of the body (e.g. as in a bidet or bidet toilet) or for washing articles in a sink. In these and other applications, the fill mode control may be arranged on the emitter body or separately, e.g. mounted on a wall or beside a sink.

The fill mode control 180 may include electrical or mechanical user controls and/or control logic and/or output control signal components, e.g. embodied in user controls 7 and/or controller 6, for responding to user input and controlling the valve and/or the fan and/or a valve for regulating the water supply and/or other system components. The fill mode control may be configured to control the fan so as to prevent the operation of the fan, or to interrupt the supply of gas by stopping the fan. The fill mode control 180 may be operable manually or by an electrical or other control signal 181, and may include or cooperate with one or more valves (e.g. a water supply control valve 4 for initiating or controlling the water flow, and a fill mode control valve 180 as shown in FIG. 39 for diverting the water flow to the gas outlet 12) which may be controlled by a solenoid or other actuator.

Referring again to FIG. 39, the apparatus may include a drying outlet 184 and a drying control 183, the drying control 183 being operable to connect the supply of gas 50 to the drying outlet 184.

The drying control 183 may include a valve and/or electrical control components and/or logic, generally as described above with reference to the fill mode control, and may be operable also to prevent or interrupt the supply of gas to the gas outlet 12, or to prevent operation of the flow emitter, when connecting the gas to the drying outlet 184. As illustrated, this may be achieved by configuring the valve of the drying control 183 to connect the gas supply to the drying outlet 184 while simultaneously disconnecting it from the gas outlet 12.

The drying control 183 may include a manual or electrical user control. The drying control may include a valve operable by a control signal 181.

The drying control 183 may be arranged to connect the supply of gas 50 to the drying outlet 184, and optionally also to disconnect the supply of gas 50 from the gas outlet 12, responsive to an increase in the pressure or flow rate of the supply of gas 50. For example, the valve of the drying control 183 may be operable responsive to an increase in the the pressure or flow rate of the gas supply 50 above a threshold value to divert the flow from the gas outlet 12 to the drying outlet 184, and to restore the flow to the gas outlet 12 when the pressure or flow rate falls below the threshold value.

In this way the user can initiate flow from the drying outlet by increasing power to the fan. An electrical control component of the drying control 183, e.g. forming part of the controller 6, may be arranged to interrupt or prevent the flow of water to the flow emitter 11, e.g. by closing water flow control valve 4 (FIG. 1), when connecting the supply of gas 50 to the drying outlet 184.

The apparatus may include both a fill mode control and a drying control, or only one of them. In each case, the flow emitter may be arranged to operate in the defined parameter space as discussed above.

The drying outlet may be used for example to dry the hands or hair or the whole body or other body parts or other articles. It may be arranged proximate the emitter body 10 or elsewhere, in any desired configuration of the emitter body, e.g. as a tap or a showerhead or a bidet or bidet toilet.

For example, where the emitter body is arranged on a flexible hose, the drying outlet may be arranged proximate the emitter body at the end of the hose.

In these and other embodiments, the apparatus may include a flexible water hose for conducting the supply of water to the water inlet of the emitter body, and optionally also a flexible air hose for conducting the supply of air to the air inlet of the emitter body, in which case the air and water hoses may be arranged in parallel (juxtaposed) or coaxial relation. One or both of the hoses may be divided into multiple pathways; for example, the air hose could include a plurality of air passages arranged around the water hose.

In yet further embodiments, the emitter body 10 may include an air pump for generating the supply of gas, wherein the apparatus further includes a flexible hose for conducting the supply of water to the water inlet of the emitter body.

Optionally in such arrangements, the flow emitter 11 may be arranged to operate in the defined parameter space as discussed above.

The emitter body may form a handset including a head and a handle.

The air pump may be powered by a turbine powered by the flow of water.

The turbine may be arranged in the emitter body, or alternatively may be arranged upstream of the emitter body.

Alternatively, the air pump may be powered by an electric motor.

The electric motor may be powered by an electrical supply via a conductor which forms part of the flexible hose.

The electric motor may be powered by a turbine, the turbine being arranged in the emitter body and powered by the flow of water.

Alternatively, the electric motor may be powered by a battery, which is to say, any device for storing electrical energy.

The battery may be detachable for replacement or recharging.

Alternatively or additionally, the battery may be rechargeable by positioning the emitter body proximate a charging station, e.g. an inductive charging station, wherein the battery is provided with an inductive charging coil which is inductively coupled with a charging coil of the charging station. The apparatus may include a support for releasably supporting the emitter body, wherein the support includes the inductive charging station. The support may be for example a wall mounted bracket or other support, wherein the inductive charging station is connected to a fixed electrical supply.

The turbine or battery may also power a light source forming part of the emitter body or elsewhere, as discussed above.

The emitter body may be configured as a shower head, or a tap, or as part of a bidet or bidet toilet, or for other applications such as washing articles or watering delicate seedlings in the garden.

The battery and/or the air pump and/or the turbine may be arranged on the handle or on the head, i.e. the part of the emitter body that has the flow emitter or emitters.

The air pump may draw in air through air inlets that open through the head of the emitter body, or through a distal end of the handle remote from the head, so as to help protect the air pump against water ingress.

The battery may be mounted for example on one side of the handle, or concentric with the handle.

A quick release mechanism may be arranged to allow the flexible hose to be detached from the handle to allow the handset to be mounted on an inductive charger or plugged into a charger outside the bathroom, and/or to allow the battery to be removed for charging or replacement.

FIGS. 40-43 illustrate an example apparatus wherein the emitter body 10 is configured as a handset incorporating the air pump 32. The handset has a head 10' with an array of flow emitters 11 and a handle 10" through which the water supply flows to the head from a flexible water hose 190 with a releasable hose connector 191 for connecting it to the water inlet 20 of the handle 10".

The handle 10" is shown in FIG. 40 also in end view, illustrating how the air inlet 30 may be divided into a plurality of channels opening at the distal end of the handle so as to protect the air pump 32 against water ingress. (In this specification, reference numerals 5 and 32 are used interchangeably to indicate the air pump, with reference numeral 32 generally indicating the air pump when incorporated into the emitter body.)

FIG. 42 shows how the air pump 32 may be arranged in the form of a cartridge or insert 132 which is assembled into the casing forming the head of the handset as shown in FIG. 41. As shown, the cartridge 132 may define an air plenum chamber and water distribution chamber as previously described. The air pump 32 draws air from the air inlets 30 via the casing of the head 10' and the air channels in the handle 10".

FIG. 43 illustrates how a battery pack 192 may be attached to the handset to power the air pump 32 via a conductor (not shown). The battery pack may be releasable or rechargeable in-situ.

FIGS. 44-46 show another example embodiment wherein the emitter body is configured as a handset with the air pump 32 arranged in the head 10' to draw in air from air inlets 30 in the rear of the head and supply the air via a plenum chamber 31 to the flow emitters 11. The water inlet 20 can be connected to the water supply via a flexible hose 190 (FIG. 40).

In this arrangement the air pump 32 is powered mechanically by a turbine 34 which in turn is powered by the flow of water from the water inlet 20 through the handle 10' into the head 10" before the water flows via passage 35 and water distribution chamber 41 to the flow emitters 11. The water distribution chamber may be separated from the plenum chamber 31 by a plate, for example, as shown in FIG. 14A.

FIGS. 47-49 show how the emitter body 10 may be configured as a handset and supplied with air and water via concentric flexible hoses. In the illustrated example, the water hose 190 is arranged inside the air hose 194.

FIGS. 50-53 show how the emitter body 10 may be configured as a handset and supplied with air and water via flexible hoses arranged in juxtaposed (side-by-side parallel) relation. The air and water hoses are not shown but can be of conventional design and are connected to the air inlet 30 and water inlet 20 respectively. In the illustrated example, the water inlet 20 communicates with a water distribution chamber 41 in the head 10' via a water passage 20' that extends concentrically within an air passage 30' inside the handle 10". The air passage 30' communicates with a plenum chamber 31 as earlier described.

Yet further applications of the novel apparatus are conceivable in zero gravity or low gravity environments. The produced bubbles may be more stable in reduced gravity due to lower acceleration and more stable wall thickness, and so may travel further before they break. Moreover, since the bubbles can be created with lower nozzle fluid exit velocities than conventional droplets, they may give better control and less splashing which may be helpful in washing or cleaning in such environments.

Shower Head with Magnetic Power Connector

It will be appreciated that the magnetic power connector can be used also in a conventional shower head to provide the same advantage, i.e. to facilitate removal and reconnection of the shower head without damage.

Accordingly, as illustrated by the examples above with reference to FIGS. 37 and 38, embodiments in accordance with the third aspect of the invention provide a shower head 10 including a power connector 160 for supplying electrical energy from an external conductor 165 to the shower head 10. The power connector 160 includes first and second connector bodies 161, 162 having cooperating contacts 163 for transmitting the electrical energy, at least one magnet (which may form part of contacts 163) for releasably holding together the first and second connector bodies, and at least one seal 164 configured to exclude water from the contacts when the first and second connector bodies are held together by the at least one magnet. Such power connector may be arranged to transmit power in parallel flow relation with a releasable water connector such as a conventional releasable ball joint 170 (FIG. 38).

In summary, embodiments provide an apparatus which produces bubbles of pure water from a flow emitter 11 comprising an annular water outlet 13 surrounding a gas outlet 12 and operating within a defined parameter space. One or more flow emitters may be incorporated into an emitter body 10 configured as a shower head or a tap. In another aspect, an apparatus 5 produces bubbles of water from coaxial, gas and annular water flowpaths. In another aspect, a magnetic power connector is arranged to supply electrical energy to a shower head.

Many further adaptations are possible within the scope of the claims.

The invention claimed is:

1. An apparatus including:

a gas supply means, a water supply means, and an emitter body, the emitter body including at least one flow emitter;

the flow emitter defining an emitter axis and including:

a gas outlet, and a water outlet;

the emitter axis extending centrally through the gas outlet;

the water outlet being annular and surrounding the gas outlet, and having an outer diameter $d_w$ and a radial width h;

the gas supply means being arranged to supply gas having a density $\rho_g$ to flow at a velocity $u_g$ from the gas outlet;

the water supply means being arranged for connection to a supply of water having a surface tension $\sigma_w$ to supply the water to flow at a velocity $u_w$ from the water outlet as an annular sheet of water surrounding the gas flowing from the gas outlet;

wherein an aerodynamic Weber number is defined as $$We_g = \left(\rho_g \cdot (u_g - u_w)^2 \cdot h\right) / \sigma_w$$

and wherein the apparatus is arranged such that, in use, $$(h/d_w) \leq 0.31 \text{ and}$$

$$\left(2.5 \cdot 10^{-3}\right) < We_g \leq We_{g(max)}$$

wherein $We_{g(max)}$ is defined by a function $$\left(h/d_w = 0.04 \cdot We_g^{0.5}\right)$$

whereby the apparatus is arranged to encapsulate the gas flowing from the gas outlet in a series of bubbles formed by the water flowing from the water outlet.

2. An apparatus according to claim 1, wherein the apparatus is arranged such that, in use, $u_g > u_w$, and $We_{g(min)} \leq We_g$), wherein $We_g$ (min) is defined by a function $$(h/d_w) = \left(0.02 \cdot (35 \cdot We_g)^{0.5} + 0.11\right).$$

3. An apparatus according to claim 2, wherein the apparatus is arranged to produce substantially all of the water as a stream of separate bubbles without intervening droplets.

4. An apparatus according to claim 3, wherein the emitter body is configured as a shower head and includes a plurality of said flow emitters arranged as a spaced array on an outlet side of the emitter body.

5. An apparatus according to claim 2, wherein the emitter body is configured to be mounted in a use position wherein the emitter axis is inclined at an angle of at least 20° from vertical; wherein the emitter body is configured as a shower head and includes a plurality of said flow emitters arranged as a spaced array on an outlet side of the emitter body, and each emitter axis is inclined at an angle of at least 20° from vertical in the use position.

6. An apparatus according to claim 2, wherein the emitter body includes a plurality of said flow emitters arranged as a spaced array on an outlet side of the emitter body; and the emitter axes are spaced apart by at least a minimum separation distance $S_{(min)}$, wherein $$S_{(min)} > 4.2 \cdot d_w.$$

7. An apparatus according to claim 1, wherein the emitter body is configured as a tap to be mounted over a basin or sink for washing a user's hands.

8. An apparatus according to claim 7, wherein the apparatus is operable to produce the series of bubbles from the flow emitter at a frequency of fewer than 80 bubbles per second.

9. An apparatus according to claim 1, wherein the emitter body includes a plurality of said flow emitters arranged as a spaced array on an outlet side of the emitter body.

10. An apparatus according to claim 9, wherein the emitter body is configured as a shower head for bathing a user's body.

11. An apparatus according to claim 10, wherein the apparatus is operable to produce the series of bubbles from the flow emitter at a frequency of fewer than 60 bubbles per second.

12. An apparatus according to claim 9, further including a plurality of flow resistors, the water supply means being arranged to distribute the water between the flow resistors; each flow resistor being arranged to supply a flow of water to the water outlet of a different respective one of the flow emitters; each flow resistor being arranged to develop a pressure drop in the flow of water along the flow resistor.

13. An apparatus according to claim 12, wherein the emitter body is configured to be mounted in a use position wherein each emitter axis is inclined at an angle of at least 20° from vertical.

14. An apparatus according to claim 12, wherein each flow resistor includes a body of porous material; or wherein each flow resistor is configured to divide the flow of water between a plurality of channels.

15. An apparatus according to claim 12, wherein each flow resistor defines a flow resistor flowpath and includes a valve element movable by the flow of water through the flow resistor flowpath to increase or reduce a section area of the flow resistor flowpath.

16. An apparatus according to claim 12, wherein each flow emitter includes an annular water flowpath carrying the flow of water from a respective one of the flow resistors to the respective water outlet; wherein, in use, the pressure drop along each flow resistor is greater than a pressure drop in the flow of water along the respective annular water flowpath from the flow resistor to the respective water outlet.

17. An apparatus according to claim 16, wherein the flow of water is axisymmetric from each flow resistor to the respective annular water flowpath.

18. An apparatus according to claim 1, including a frequency control operable by a user to vary a frequency at which the series of bubbles are produced from the flow emitter by adjusting at least one of the velocity $u_g$ of the gas and the velocity $u_w$ of the water.

19. An apparatus according to claim 1, wherein the flow emitter is arranged to project the bubbles along an upward trajectory.

20. A method including:

providing an apparatus, the apparatus including:

a gas supply means, a water supply means, and an emitter body, the emitter body including at least one flow emitter;

the flow emitter defining an emitter axis and including:

a gas outlet, and a water outlet;

the emitter axis extending centrally through the gas outlet;

the water outlet being annular and surrounding the gas outlet, and having an outer diameter $d_w$ and a radial width h;

supplying gas from the gas supply means, the gas having a density $\rho_g$, to flow at a velocity $u_g$ from the gas outlet;

connecting the water supply means to a supply of water having a surface tension Ow to supply the water to flow at a velocity $u_w$ from the water outlet as an annular sheet of water surrounding the gas flowing from the gas outlet;

wherein an aerodynamic Weber number is defined as $$We_g = \left(\rho_g \cdot (u_g - u_w)^2 \cdot h\right) / \sigma_w$$

and further including operating the apparatus within a parameter space defined by $h/d_w$ and $We_g$, wherein $$(h/d_w) \leq 0.31 \text{ and}$$

$$\left(2.5 \cdot 10^{-3}\right) < We_g \leq We_{g(max)}$$

wherein $We_g$ (max) is defined by a function $$\left(h/d_w = 0.04 \cdot We_g^{0.5}\right)$$

to encapsulate the gas flowing from the gas outlet in a series of bubbles formed by the water flowing from the water outlet.

* * * * *